(12) United States Patent
Kim et al.

(10) Patent No.: US 8,508,687 B2
(45) Date of Patent: Aug. 13, 2013

(54) DISPLAY DEVICE

(75) Inventors: Yunjoo Kim, Seoul (KR); Moungyoub Lee, Seoul (KR); Jonghyun Byeon, Seoul (KR); Deogjin Lee, Seoul (KR); Sangdon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 13/077,111

(22) Filed: Mar. 31, 2011

(65) Prior Publication Data

US 2012/0062815 A1 Mar. 15, 2012

Related U.S. Application Data

(60) Provisional application No. 61/381,173, filed on Sep. 9, 2010, provisional application No. 61/384,459, filed on Sep. 20, 2010.

(30) Foreign Application Priority Data

Sep. 9, 2010 (KR) .......................... 10-2010-0088496
Sep. 9, 2010 (KR) .......................... 10-2010-0088497
Sep. 20, 2010 (KR) .......................... 10-2010-0092577

(51) Int. Cl.
*G02F 1/1333* (2006.01)
(52) U.S. Cl.
USPC .............................................. 349/60; 349/58
(58) Field of Classification Search
USPC ........................................................ 349/58–60
See application file for complete search history.

(56) References Cited

U.S. PATENT DOCUMENTS

| 6,222,597 | B1 | 4/2001 | Muramatsu | 349/58 |
|---|---|---|---|---|
| 7,808,586 | B2 | 10/2010 | Mochizuki | 349/110 |
| 8,319,912 | B2 | 11/2012 | Byeon et al. | 349/58 |
| 8,416,361 | B2 * | 4/2013 | Kim et al. | 349/58 |
| 2003/0128307 | A1 * | 7/2003 | Ito et al. | 349/58 |
| 2003/0223249 | A1 | 12/2003 | Lee et al. | |
| 2005/0151894 | A1 * | 7/2005 | Katsuda et al. | 349/58 |
| 2009/0225252 | A1 | 9/2009 | Jeong | |
| 2009/0237583 | A1 | 9/2009 | Chol | |

(Continued)

FOREIGN PATENT DOCUMENTS

EP 2058693 5/2009
EP 2058693 A1 * 5/2009

(Continued)

OTHER PUBLICATIONS

International Search Report dated Apr. 13, 2012 issued in Application No. PCT/KR2011/008166.

(Continued)

*Primary Examiner* — Rhonda Peace
(74) *Attorney, Agent, or Firm* — KED & Associates LLP

(57) ABSTRACT

A display device has a display panel, a backlight adjacent a first surface of the panel, a blocker adjacent a second surface of the panel, and at least one bracket between the panel and backlight. An edge of the second surface of the panel is exposed, the first and second surfaces are substantially parallel, at least one bracket is coupled to the first surface without overlapping an active region of the panel that displays an image, and the blocker does not overlap the active region of the panel and overlaps the bracket along an axis passing through the panel. The blocker is visible at a position in front of the panel.

25 Claims, 61 Drawing Sheets

(56) References Cited

U.S. PATENT DOCUMENTS

| | | | |
|---|---|---|---|
| 2009/0268121 A1 | 10/2009 | Hisada | 349/58 |
| 2012/0050639 A1* | 3/2012 | Kim et al. | 349/58 |
| 2012/0062815 A1 | 3/2012 | Kim et al. | 349/61 |
| 2012/0092585 A1* | 4/2012 | Byeon et al. | 349/58 |
| 2012/0105761 A1 | 5/2012 | Lee et al. | 349/58 |
| 2012/0106048 A1 | 5/2012 | Byeon et al. | 361/679.01 |
| 2012/0106121 A1 | 5/2012 | Lee et al. | 362/19 |
| 2012/0106122 A1 | 5/2012 | Ryu et al. | 362/19 |
| 2012/0182700 A1 | 7/2012 | Byeon et al. | 361/749 |
| 2013/0038559 A1* | 2/2013 | Byeon et al. | 345/173 |

FOREIGN PATENT DOCUMENTS

| | | |
|---|---|---|
| JP | 2001-183628 | 7/2001 |
| JP | 2002-108238 | 4/2002 |
| JP | 2004-133098 A | 4/2004 |
| JP | 2004-133099 A | 4/2004 |
| JP | 2005-077557 A | 3/2005 |
| JP | 2007-101938 A | 4/2007 |
| JP | 2008-216814 A | 9/2009 |
| KR | 1998-015704 | 5/1998 |
| KR | 1998-022417 | 7/1998 |
| KR | 10-2002-0031895 A | 5/2002 |
| KR | 10-2002-0056704 | 7/2002 |
| KR | 10-2003-0074628 | 9/2003 |
| KR | 10-2004-0033818 A | 4/2004 |
| KR | 10-0480822 B1 | 4/2005 |
| KR | 10-0487435 B1 | 5/2005 |
| KR | 10-2005-0099692 A | 10/2005 |
| KR | 10-0517136 B1 | 1/2006 |
| KR | 10-2006-0133651 A | 2/2006 |
| KR | 10-0570647 B1 | 4/2006 |
| KR | 10-2008-0106604 A | 12/2008 |
| KR | 10-2009-0016971 | 2/2009 |
| KR | 10-2009-0042452 A | 4/2009 |
| KR | 10-0931583 B1 | 12/2009 |
| KR | 10-2010-0077279 A | 7/2010 |

OTHER PUBLICATIONS

International Search Report dated Apr. 27, 2012 issued in Application No. PCT/KR2011/008142.
European Search Report dated May 22, 2012 issued in Application No. 11009073.5-1228.
European Search Report dated May 29, 2012 issued in Application No. 11008668.3-1228.
United States Notice of Allowance dated Sep. 24, 2012 issued in U.S. Appl. No. 13/283,738.
United States Notice of Allowance dated Dec. 6, 2012 issued in U.S. Appl. No. 13/288,122.
International Search Report dated Dec. 22, 2011.
Korean Notice of Allowance dated Feb. 20, 2012 issued in Application No. 10-2010-0106196.
Korean Office Action dated Apr. 12, 2012 issued in Application No. 10-2010-0092577.
International Search Report dated Apr. 16, 2012 issued in Application No. PCT/KR2011/009077.
U.S. Office Action dated Feb. 13, 2013 issued in U.S. Appl. No. 13/652,616.
U.S. Office Action dated Mar. 18, 2013 issued in U.S. Appl. No. 13/284,142.

* cited by examiner

FIG. 29
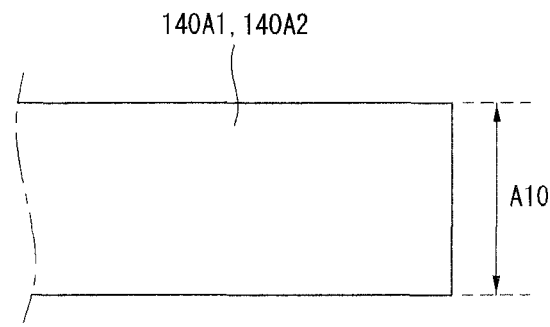
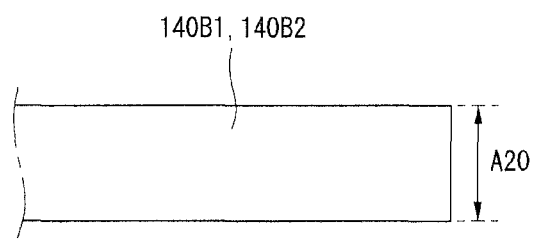
FIG. 30
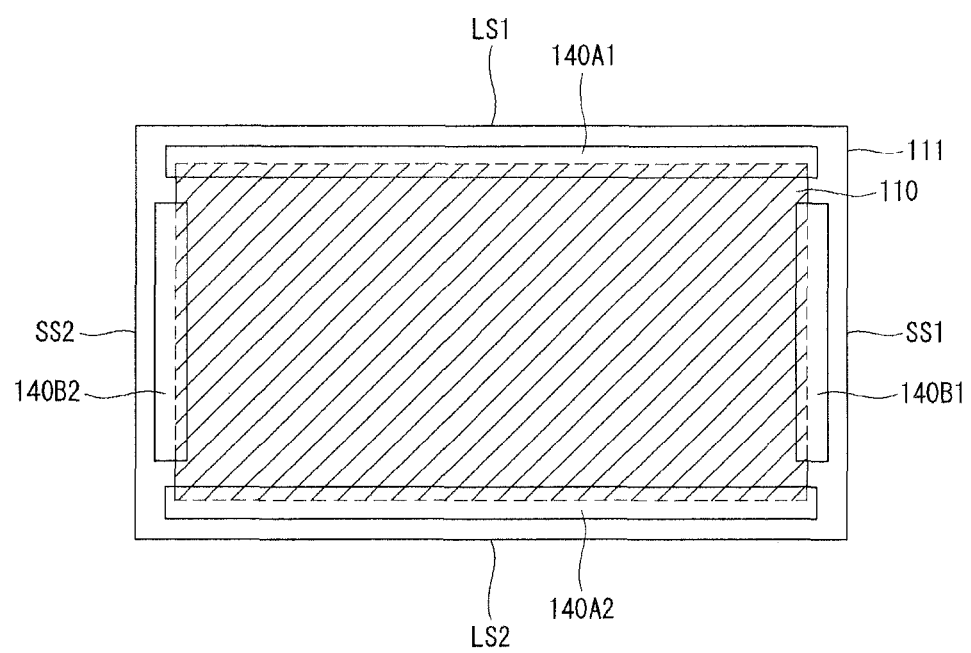

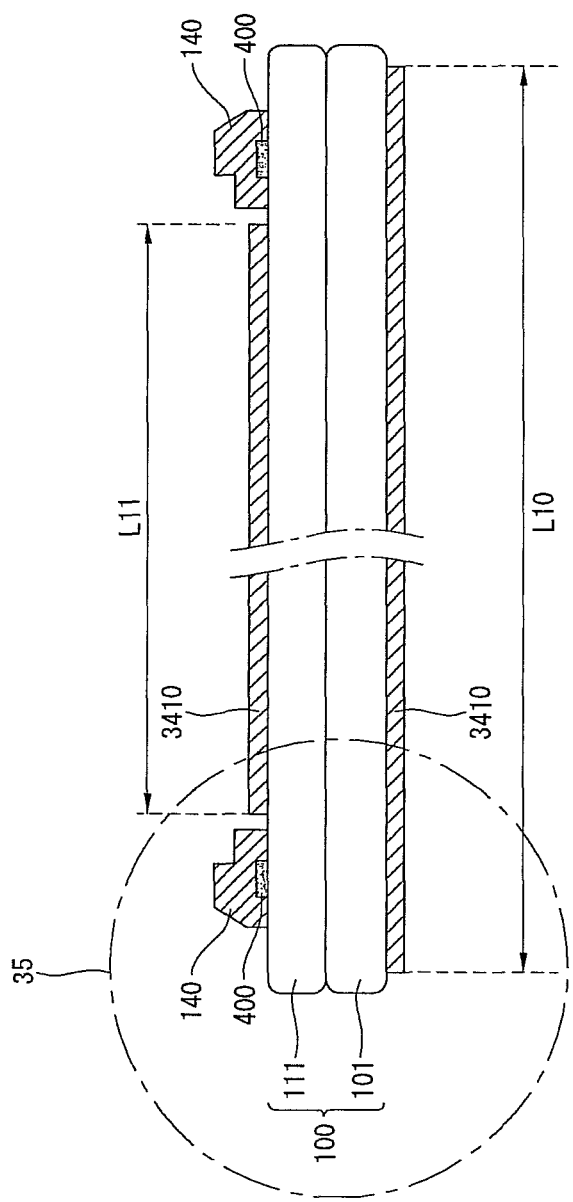

DISPLAY DEVICE

CROSS-REFERENCE TO RELATED APPLICATION(S)

This application claims priority to U.S. Provisional Application Nos. 61/381,173 filed Sep. 9, 2010 and 61/384,459 filed Sep. 20, 2010, and Korean Application Nos. 10-2010-0088497 and 10-2010-0088496 filed Sep. 9, 2010 and Korean Application No. 10-2010-0092577 filed Sep. 20, 2010 under 35 U.S.C. §119, whose entire disclosure(s) is/are hereby incorporated by reference.

BACKGROUND

1. Field

One or more embodiments described herein relate to a display device.

2. Background

Various display devices such as liquid crystal displays (LCDs), plasma display panels (PDPs), electroluminescent displays (ELDs), and vacuum fluorescent display (VFDs) have been developed to meet consumer demand. These devices have drawbacks which relate to size and power requirements. Also, many of them are not visually pleasing.

BRIEF DESCRIPTION OF THE DRAWINGS

FIGS. 4 to 48 show additional features of a display device which correspond to the aforementioned embodiment or other embodiments described herein;

DETAILED DESCRIPTION

Figure 1:
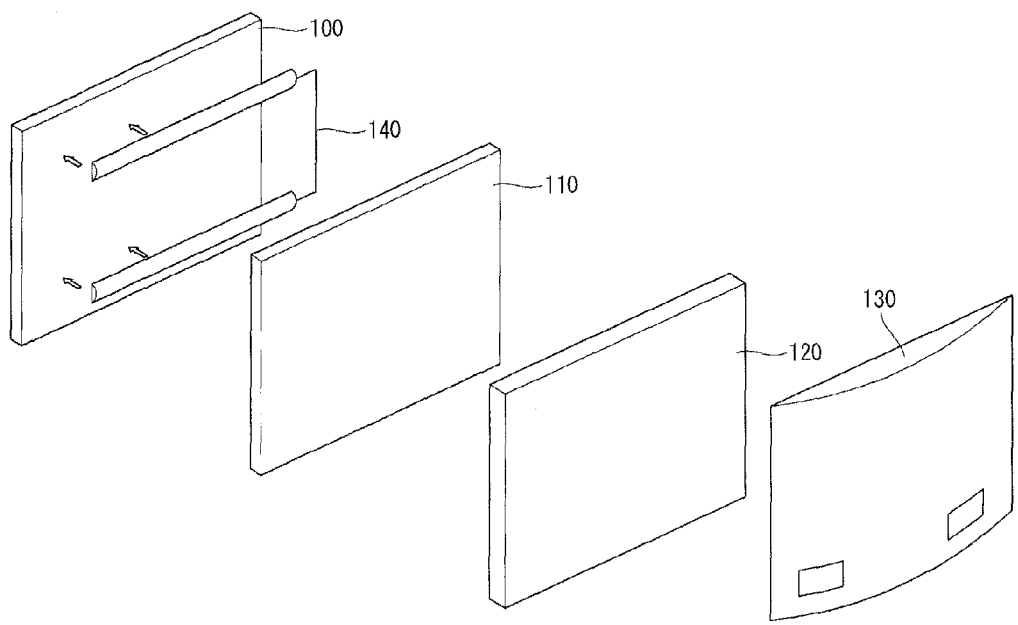
FIGS. 1 to 3 show one embodiment of a display device.
Figure 2:
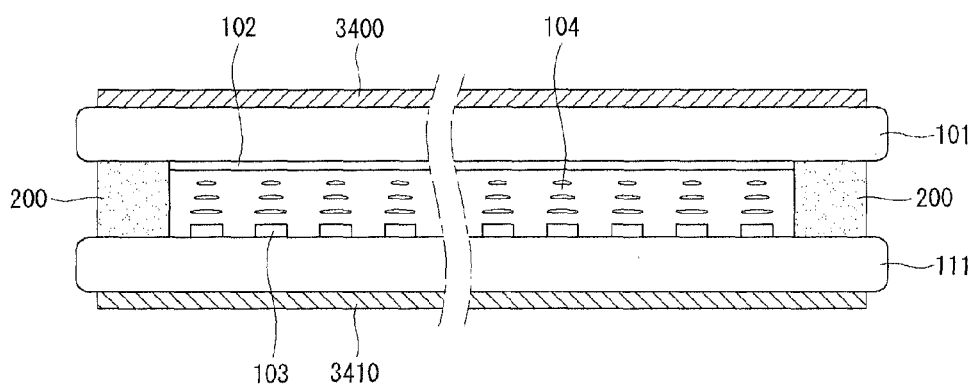
Figure 3:
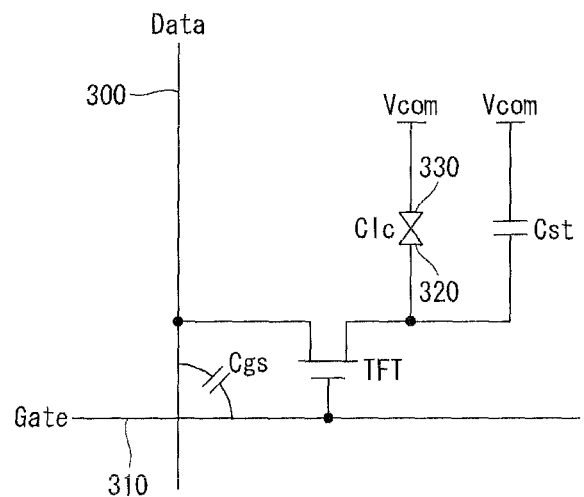

FIGS. 1 to 3 show one embodiment of a display device which includes a display panel 100, a bracket 140, an optical layer 110, a backlight unit 120, and a back cover 130. Although not shown, the display panel 100 may include a front substrate and a back substrate that are positioned opposite each other. The bracket 140 may be attached to a back surface of the back substrate of the display panel 100.

The optical layer 110 may be fixed to the bracket 140. The optical layer 110 may include a plurality of sheets. For example, although it is not shown, the optical layer 110 may include at least one of a prism sheet and a diffusion sheet.

The backlight unit 120 may be positioned in the rear of the optical layer 110. Although it is not shown, the backlight unit 120 may include at least one light source. Various types of light sources may be used in the embodiment disclosed herein. For example, the light source may be one of a light emitting diode (LED) chip and a light emitting diode package having at least one light emitting diode chip. In this case, the light source may be a colored LED emitting one of red, green, and blue light or white LED.

The back cover 130 may be positioned in the rear of the backlight unit 120. The back cover 130 may protect backlight unit 120 and optical layer 110 from the outside.

The optical layer 110 may be closely attached to display panel 100. Alternatively, backlight unit 120 may be closely attached to the optical layer 110. In this case, a thickness of the display device according to the embodiments herein may be reduced.

As shown in FIG. 2, the display panel 100 may include a front substrate 101 and a back substrate 111 opposite the front substrate 101, that are attached to each other to form a cell gap therebetween. A liquid crystal layer 104 may be formed between the front substrate 101 and the back substrate 111. A seal portion 200 may be formed between the front substrate 101 and the back substrate 111 to seal the liquid crystal layer 104.

A color filter 102 may be positioned on the front substrate 101 to implement red, green, and blue colors. The color filter 102 may include a plurality of pixels each including red, green, and blue subpixels. Other configurations of the subpixels may be used for the pixel. For example, each pixel may include red, green, blue, and white subpixels. When light is incident on the color filter 102, images corresponding to the red, green, and blue colors may be displayed.

A predetermined transistor 103, for example, a thin film transistor (TFT) may be formed on the back substrate 111. The transistor 103 may turn on or off liquid crystals in each pixel. Thus, the front substrate 101 may be referred to as a color filter substrate, and the back substrate 111 may be referred to as a TFT substrate.

A front polarizing film 3400 may be positioned on a front surface of the front substrate 101 to polarize light passing through the display panel 100. A back polarizing film 3410 may be positioned on a back surface of the back substrate 111 to polarize light passing through the optical layer 110 positioned in the rear of the back substrate 111.

The liquid crystal layer 104 may be formed of a plurality of liquid crystal molecules, and the arrangement of the liquid crystal molecules may change in response to a driving signal supplied by the transistor 103. Hence, light provided by the backlight unit 120 may be incident on the color filter 102 in response to the molecular arrangement of the liquid crystal layer 104.

As a result, the color filter 102 may implement red, green, and blue light, and thus a predetermined image may be displayed on the front substrate 101 of the display panel 100.

As shown in FIG. 3, each pixel of the display panel 100 may include data lines 300, gate lines 310 crossing the data lines 300, and the TFT 103 connected to crossings of the data lines 300 and the gate lines 310.

The TFT 103 supplies a data voltage supplied through the data lines 300 to a pixel electrode 320 of a liquid crystal cell Clc in response to a gate pulse from the gate lines 310. The liquid crystal cell Clc is driven by an electric field generated by a voltage difference between a voltage of the pixel electrode 320 and a common voltage Vcom applied to a common electrode 330, thereby controlling an amount of light passing through a polarizing plate. A storage capacitor Cst is connected to the pixel electrode 320 of the liquid crystal cell Clc and holds a voltage of the liquid crystal cell Clc.

Figure 4:
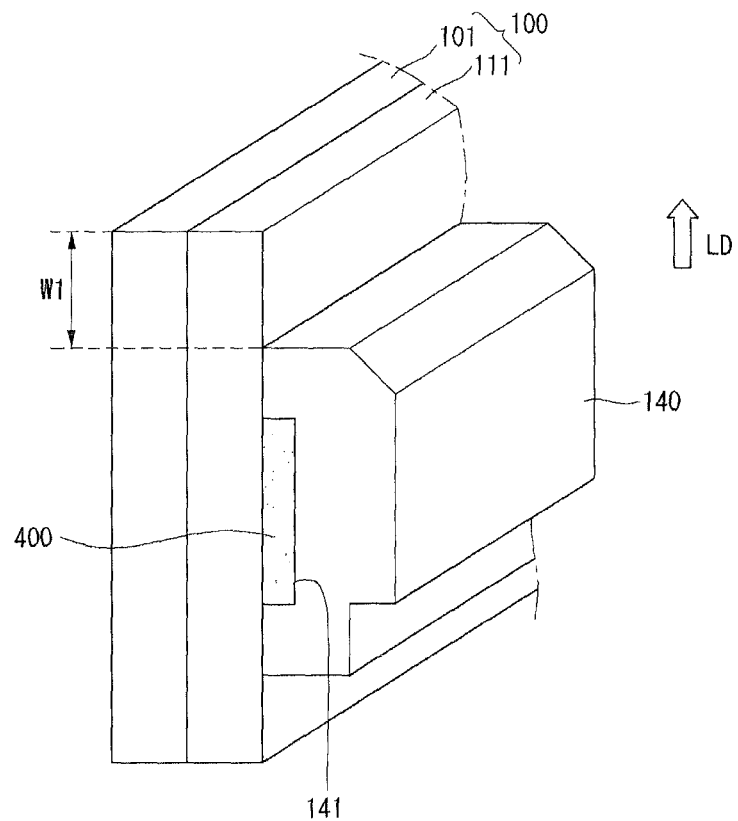

FIGS. 4 to 48 show additional features of a display device according to the aforementioned or other embodiments. As shown in FIG. 4, an adhesive layer 400 may be formed between the back surface of the back substrate 111 of the display panel 100 and the bracket 140. The bracket 140 may be attached to the back surface of the back substrate 111 using the adhesive layer 400.

When the bracket 140 is attached to the back surface of the back substrate 111 using the adhesive layer 400, a supporting part such as a pem nut and a boss and a fastening part such as a screw are not used. Therefore, a fixing process may be simply performed, the manufacturing cost may be reduced, and the thickness of the display device may be reduced.

A plurality of grooves 141 are formed in one surface of the bracket 140 facing the back substrate 111, so as to improve an adhesive strength between the bracket 140 and the back substrate 111. The adhesive layer 400 may be formed in the grooves 141. The grooves 141 of the bracket 140 used to form the adhesive layer 400 may be referred to as first grooves. Because the grooves 141 may prevent from an adhesive material from being discharged to the outside of the bracket 140, an attaching process may be easily performed.

When the bracket 140 is attached to the back surface of the back substrate 111, the display panel 100 may include a portion W1 extending further than the bracket 140 in a longitudinal direction of the display panel 100.

Figure 5:
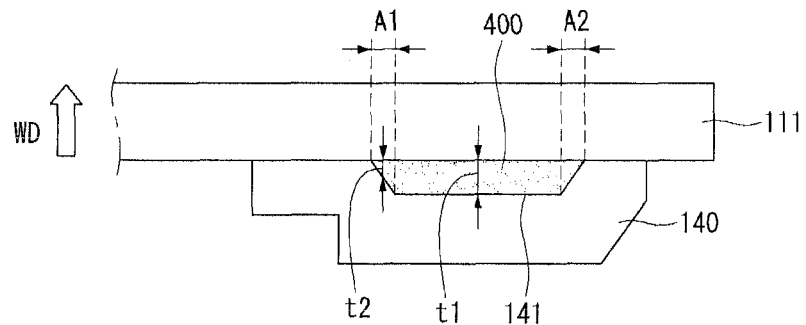

As shown in FIG. 5, the groove 141 may include portions having each a different depth. More specifically, the bracket 140 may include portions A1 and A2 each having a gradually decreasing or increasing depth in a width direction WD, so as to further improve the adhesive strength between the bracket 140 and the back substrate 111 while efficiently injecting the adhesive material of the adhesive layer 400 into the groove 141.

For example, a depth t1 of a middle portion of the groove 141 may be different from a depth t2 of an edge portion of the groove 141. A length of the groove 141 in the edge portion of the groove 141 may gradually decrease.

In other words, the adhesive layer 400 formed in the groove 141 may include portions having each a different thickness. For example, a width of a middle portion of the adhesive layer 400 may be greater than a width of an edge portion of the adhesive layer 400.

Figure 6:
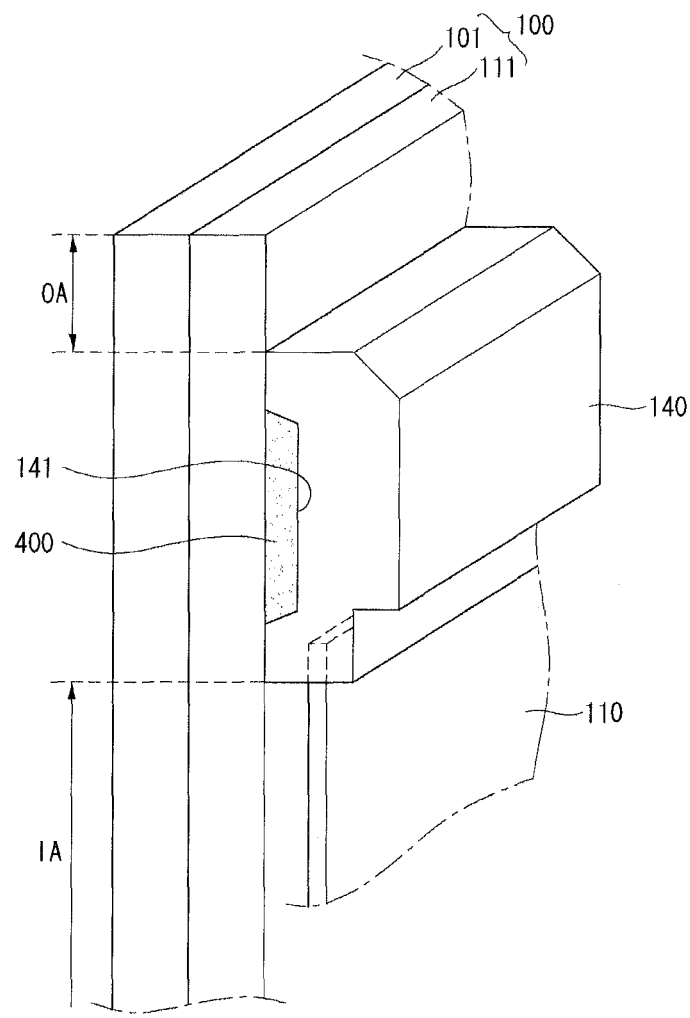

As shown in FIG. 6, the optical layer 110 may be positioned in an inner area IA of the bracket 140. The display panel 100 may extend in an outer area OA of the bracket 140. Preferably, the optical layer 110 may be fixed to the bracket 140 in the inner area IA of the bracket 140. When the optical layer 110 is fixed to the bracket 140, a portion of the optical layer 110 may overlap the bracket 140. In other words, the portion of the optical layer 110 may be positioned inside the bracket 140 or contact the bracket 140.

Figure 7:
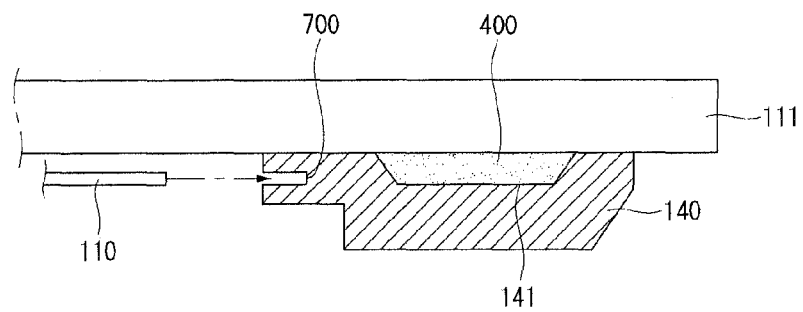

As shown in FIG. 7, a groove 700 may be formed in the bracket 140, so as to fix the optical layer 110 to the bracket 140. The optical layer 110 may be fixed to the bracket 140 by inserting the optical layer 110 into the groove 700. The groove 700 of the bracket 140 used to fix the optical layer 110 may be referred to as a second groove. The second groove 700 may be formed on the side of the bracket 140 and may be depressed in a direction parallel to the longitudinal direction of the display panel 100.

Figure 8:
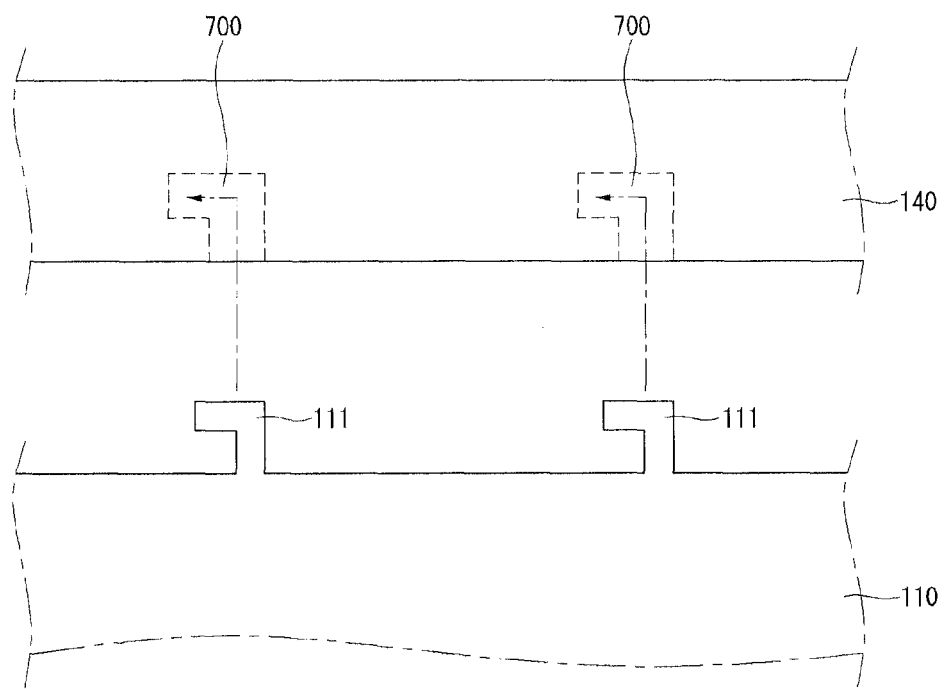

As shown in FIG. 8, the second groove 700 may have a hook shape, so as to improve a fixation strength between the optical layer 110 and the bracket 140. In this case, a protrusion 701 corresponding to the second groove 700 may be formed in the optical layer 110. The optical layer 110 may be fixed to the bracket 140 by inserting the protrusion 701 into the second groove 700.

Figure 9:
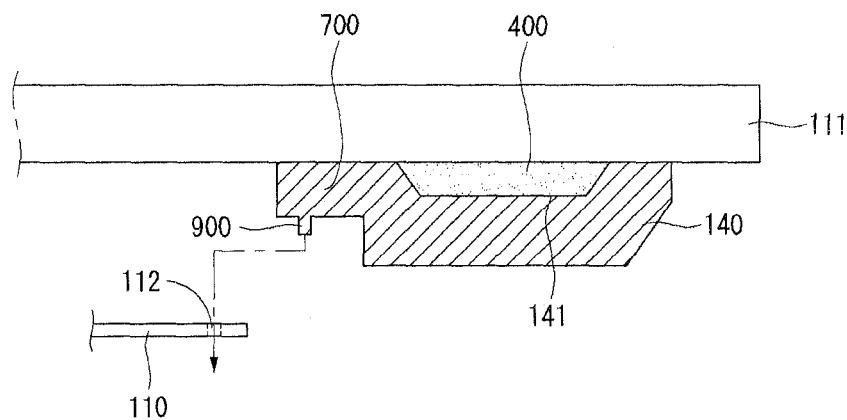

Alternatively, as shown in FIG. 9, a protrusion 900 may be formed in the bracket 140, a hole 112 may be formed in the optical layer 110, and the protrusion 900 of the bracket 140 may pass through the hole 112 of the optical layer 110. Hence, the optical layer 110 may be fixed to the bracket 140.

Figure 10:
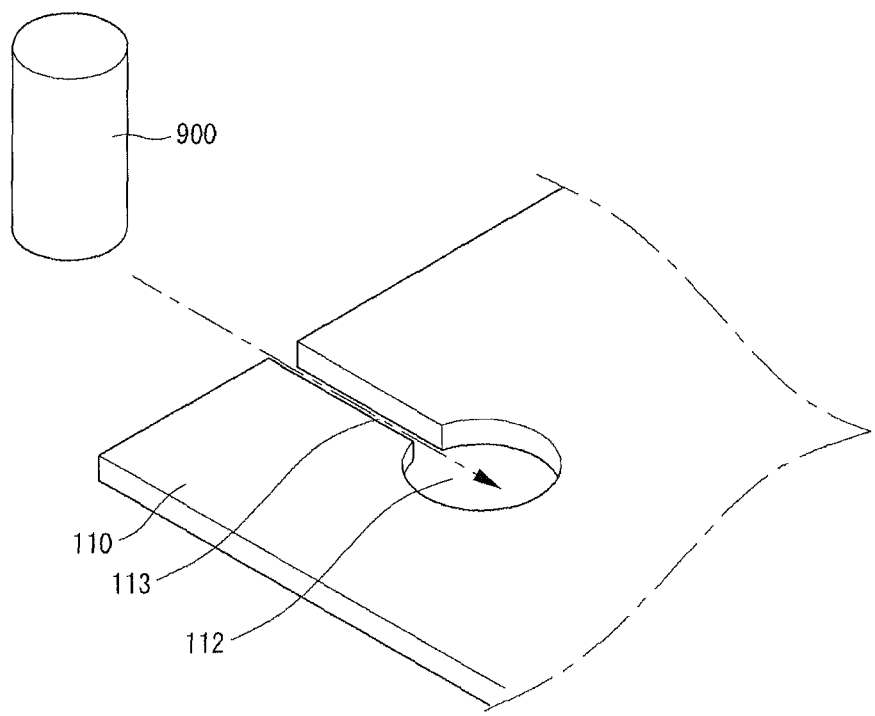

Alternatively, as shown in FIG. 10, a guide part 113 capable of passing the hole 112 and the protrusion 900 may be formed in the optical layer 110, and the protrusion 900 of the bracket 140 may pass through the guide part 113. In this case, the protrusion 900 may be positioned in the hole 112 of the optical layer 110.

Figure 11:
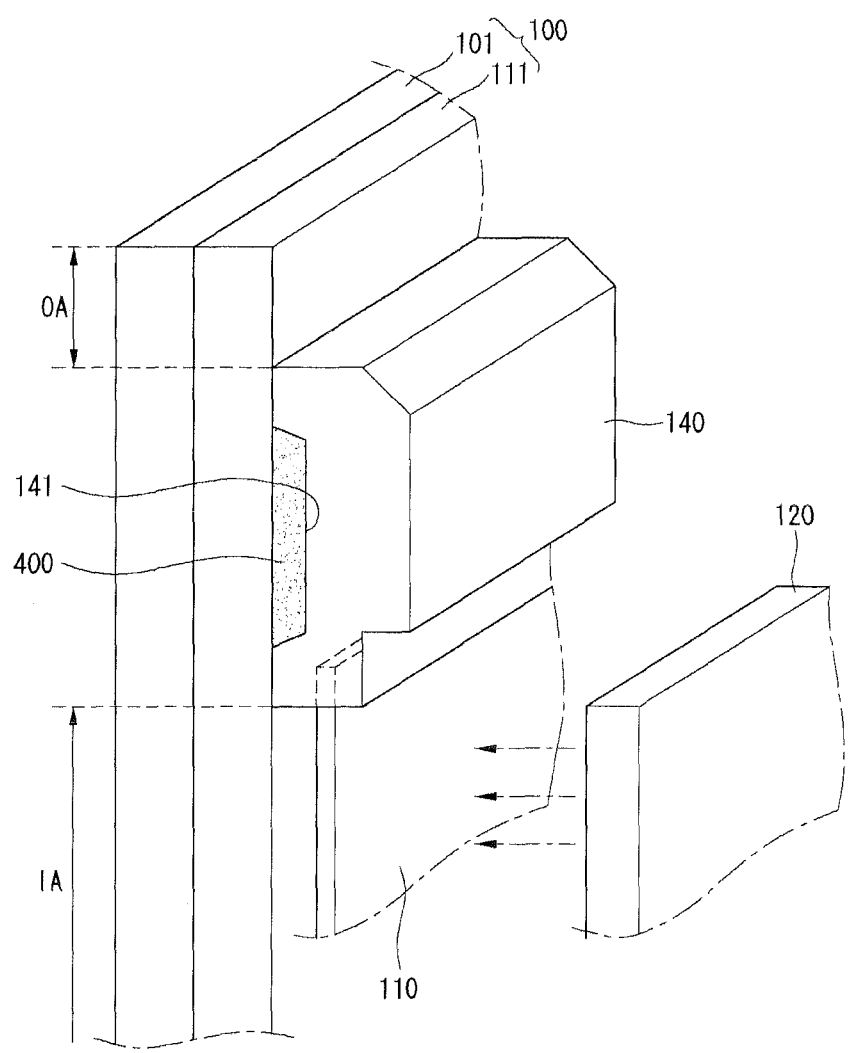

As shown in FIG. 11, the backlight unit 120 may be positioned in the rear of the optical layer 110.

Figure 12:
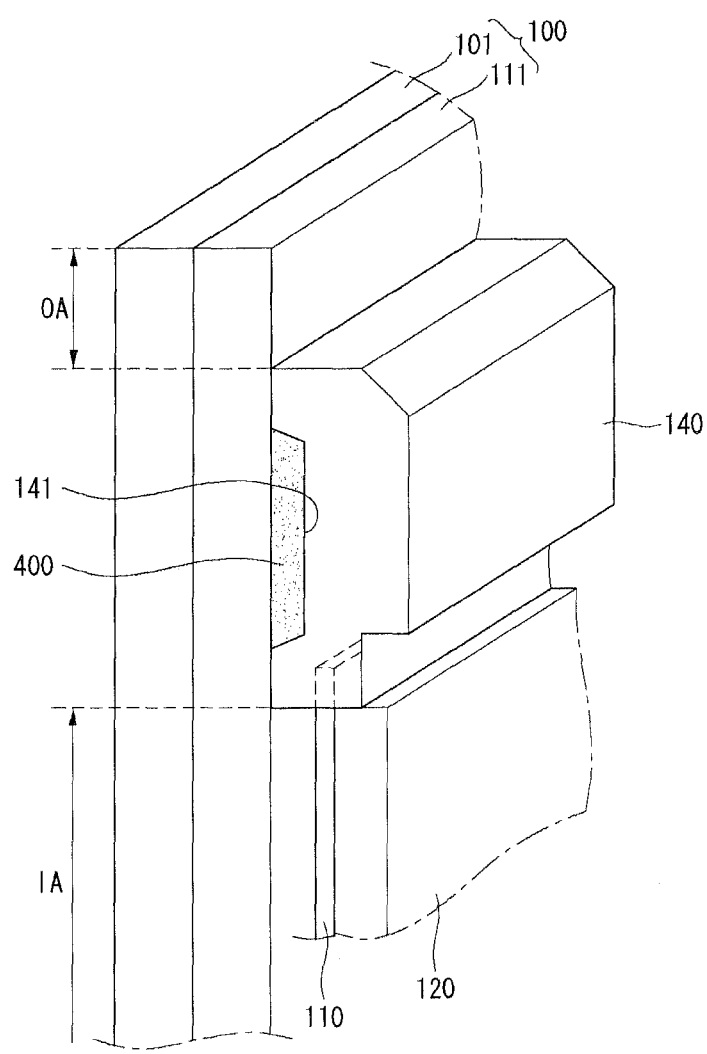

As shown in FIG. 12, the backlight unit 120 may be attached to a back surface of the optical layer 110. For this, an adhesive layer (not shown) may be formed between the optical layer 110 and the backlight unit 120. Alternatively, unlike the structure illustrated in FIG. 12, the backlight unit 120 may be positioned to be spaced apart from the optical layer 110 at a predetermined distance.

Figure 13:
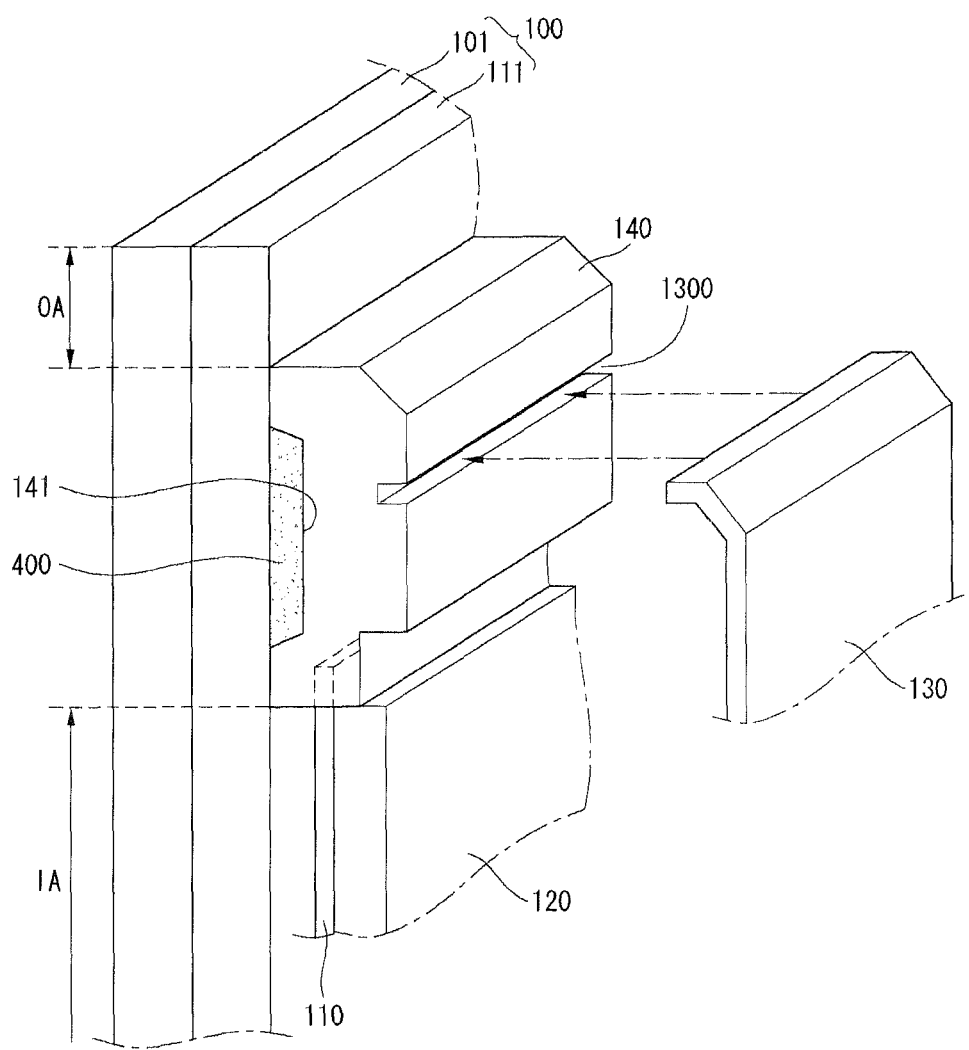

As shown in FIG. 13, the back cover 130 may be positioned in the rear of the backlight unit 120 and may be fixed to the bracket 140. For this, a groove 1300 is formed in the bracket 140 and is depressed in a direction facing the display panel 100. The back cover 130 may be fixed to the bracket 140 by inserting an edge of the back cover 130 into the groove 1300. The groove 1300 of the bracket 140 used to fix the back cover 130 may be referred to as a third groove.

Figure 14:
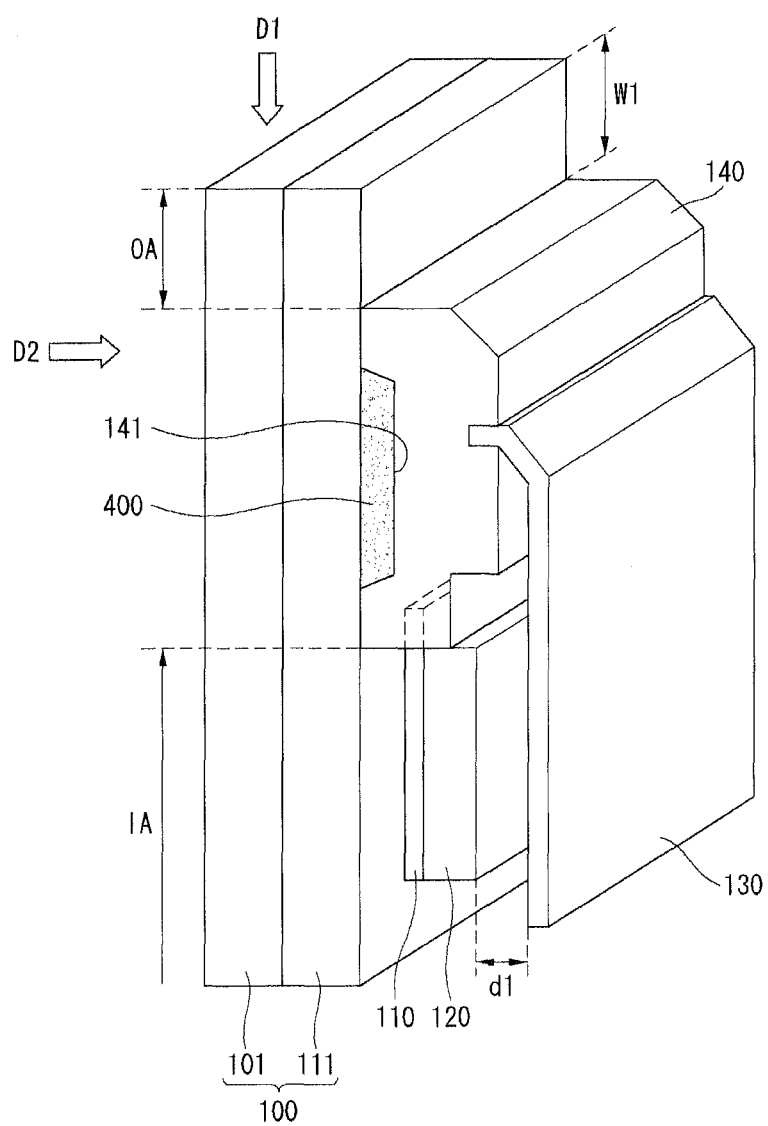

As shown in FIG. 14, when the back cover 130 is fixed to the bracket 140, the back cover 130 and the backlight unit 120 may be spaced apart from each other a predetermined distance d1.

An edge of the front surface of the front substrate 101 or an edge of a side of the front substrate 101 may be exposed even in a state where the back cover 130 is fixed to the bracket 140.

The exposure of the edge of the front surface of the front substrate 101 may indicate that an observer can view the edge of the front surface of the front substrate 101 when the observer in the front of the display panel 100 views the front surface of the front substrate 101, i.e., when the observer in the front of the display panel 100 views the display panel 100 in a direction D2. The exposure of the edge of the side of the front substrate 101 may indicate that the observer can view the edge of the side of the front substrate 101 when the observer in the side of the display panel 100 views the front surface of the front substrate 101, i.e., when the observer in the side of the display panel 100 views the display panel 100 in a direction D1.

As above, when the edge of the front surface of the front substrate 101 or the edge of the side of the front substrate 101 is exposed after the back cover 130 is fixed to the bracket 140, the front substrate 101 maybe formed of a tempered glass. In this case, even if the edge of the front surface of the front substrate 101 or the edge of the side of the front substrate 101 is exposed, the front substrate 101 may be prevented from being damaged by an external impact.

Figure 15A:
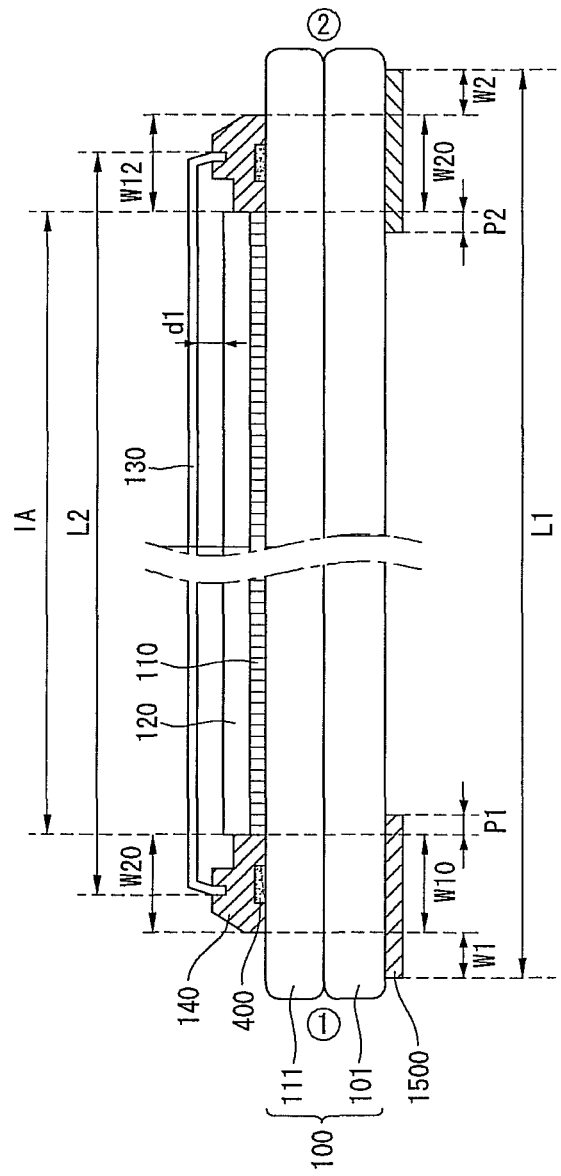

As shown in FIG. 15A, a width L2 of the back cover 130 may be less than a width L1 of the display panel 100. In other words, the width L2 of the back cover 130 may be less than a width of at least one of the front substrate 101 and the back substrate 111 of the display panel 100.

In this case, when the observer in the front of the display panel 100 views the display panel 100, the observer may observe almost the entire area of the display panel 100. Hence, an attractive appearance of the display panel 100 may be provided. Further, because another edge of the side of the display panel 100 may not be showed to the observer, a visual effect, in which the observer may feel that the screen size of the display panel 100 is greater than the real screen size of the display panel 100, may be obtained.

In this case, the edge of the front surface of the front substrate 101 and the edge of the side of the front substrate 101 in each of an upper part (□) and a lower part (□) of the display panel 100 may be exposed. It can be seen from FIG. 15A that the optical layer 110 is positioned in the inner area IA of the bracket 140.

A blocking member 1500 may be positioned at the edge of the front surface of the front substrate 101. Preferably, the blocking member 1500 may be attached to the edge of the front surface of the front substrate 101. Because the blocking member 1500 hides a dummy area positioned outside an active area of the display panel 100 on which an image is displayed, the image displayed on the active area may be more prominently showed.

The blocking member 1500 may have lightness lower than ambient lightness. For example, the lightness of the blocking member 1500 may be lower than lightness of the display panel 100. For this, the blocking member 1500 may be substantially black. For example, the blocking member 1500 may be substantially a black tape and may be formed by attaching a black tape to the front surface of the front substrate 101. Thus, the blocking member 1500 may be referred to as a black layer.

Figure 15B:
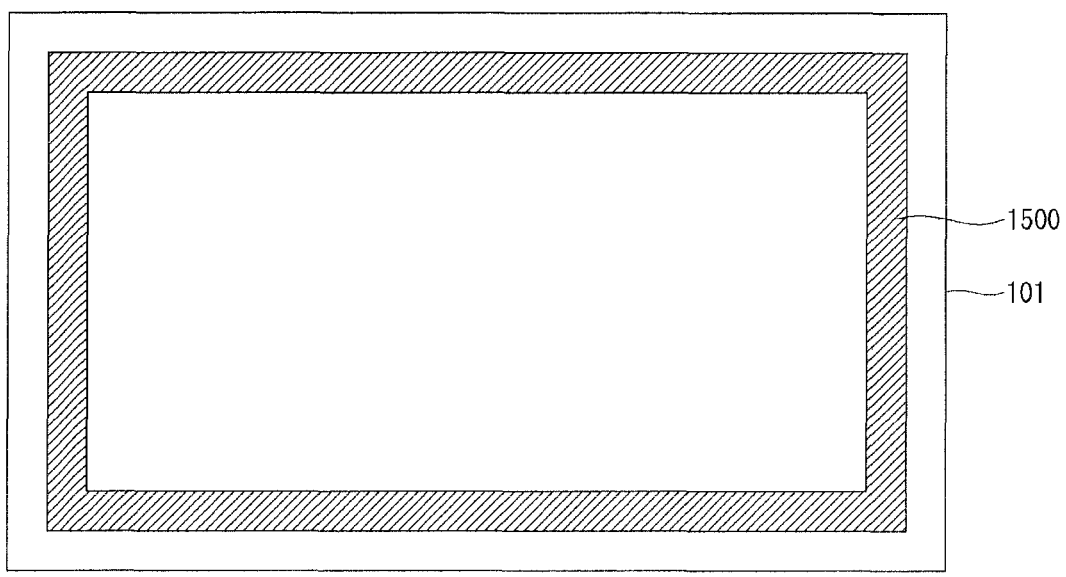

Because the blocking member 1500 is positioned on the front surface of the front substrate 101 and the edge of the front surface of the front substrate 101 is exposed, almost the entire portion of the blocking member 1500 may be exposed as shown in FIG. 15B. In other words, when the observer in the front of the display panel 100 views the display panel 100, the observer may view almost the entire portion of the blocking member 1500. Namely, the observe may observe almost the entire portion of the blocking member 1500.

Because the bracket 140 does not display the image, it may be preferable that the bracket 140 is positioned in the dummy area outside the active area. Further, it may be preferable that the bracket 140 is hidden by the blocking member 1500. Hence, as shown in FIG. 15A, the blocking member 1500 may overlap the bracket 140. Preferably, the bracket 140 may entirely overlap the bracket 140.

More preferably, widths W10 and W20 of the blocking member 1500 may be greater than widths W11 and W12 of the bracket 140. In this case, the blocking member 1500 may include portions P1 and P2 extending further than the bracket 140 in a middle direction of the front substrate 101. Further, the blocking member 1500 may include portions W1 and W2 extending further than the bracket 140 in a direction opposite the middle direction of the front substrate 101.

The widths W10 and W20 of the blocking member 1500 and the widths W11 and W12 of the bracket 140 may be a width in a cross section of the display panel 100.

Figure 16:
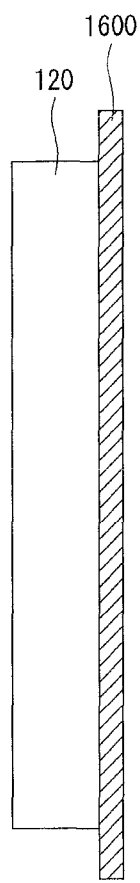

As shown in FIG. 16, a frame 1600 may be positioned in the rear of the backlight unit 120. The frame 1600 may improve a structural stability of the backlight unit 120 and the uniformity of light. Preferably, the frame 1600 may be attached to a back surface of the backlight unit 120.

Figure 17:
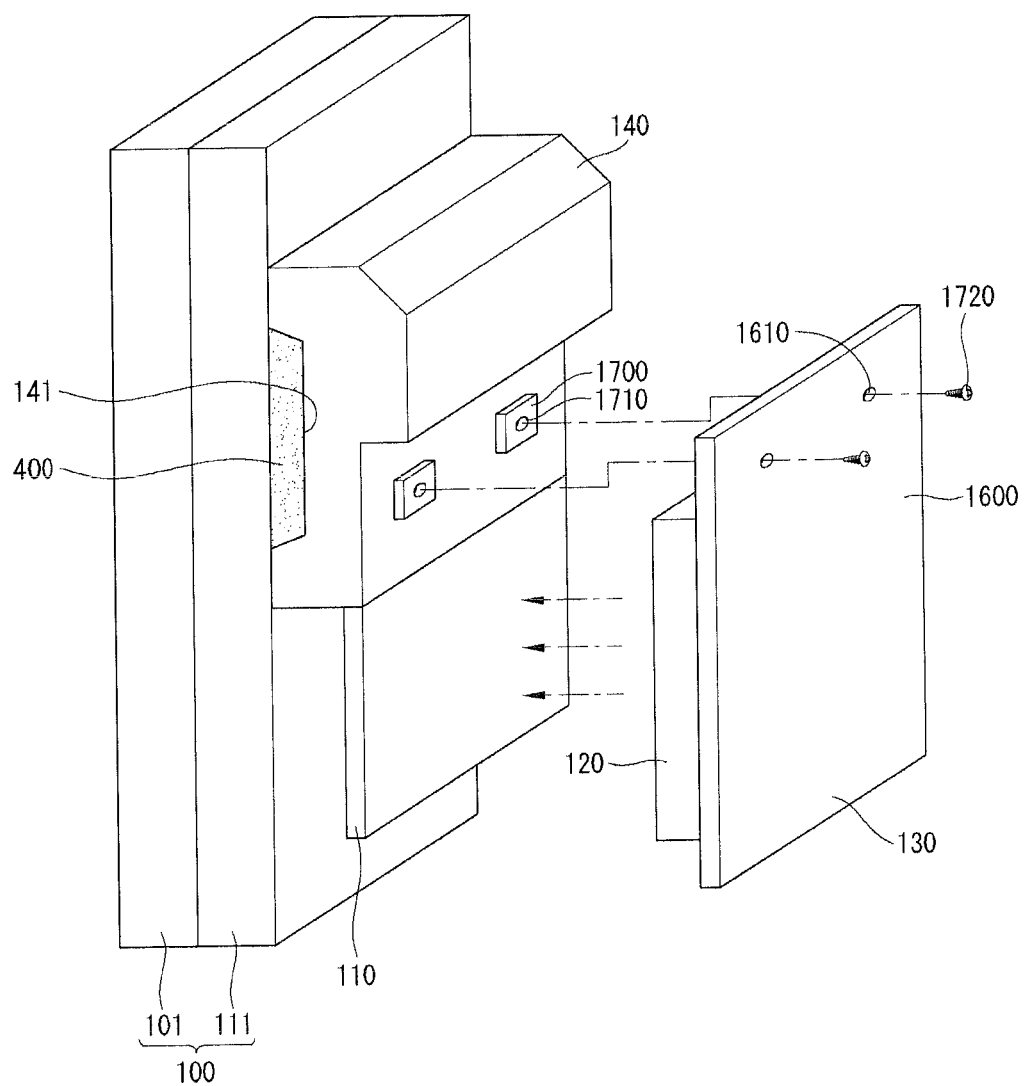

In this case, the frame 1600 may be fixed to the bracket 140. More specifically, as shown in FIG. 17, a receiving part 1700 may be formed on the bracket 140, a coupling hole 1610 may be formed in the frame 1600, and a coupling member 1720 may pass through the coupling hole 1610 of the frame 1600. Hence, the coupling member 1720 may be fixed to the receiving part 1700 of the bracket 140. As a result, the frame 1600 may be fixed to the bracket 140.

Figure 18:
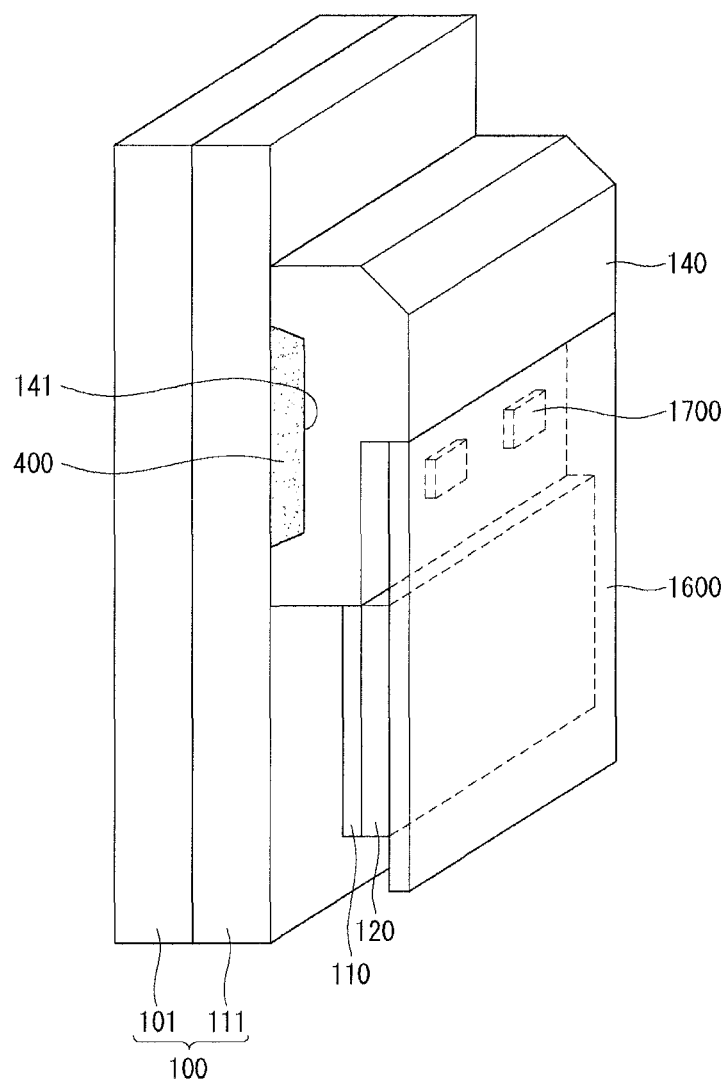

Even in this case, as shown in FIG. 18, the backlight unit 120 and the optical layer 110 may be closely attached to each other. Alternatively, unlike the structure illustrated in FIG. 18, the backlight unit 120 and the optical layer 110 may be separated from each other.

When the frame 1600 is positioned in the rear of the backlight unit 120, the back cover 130 may be omitted. Alternatively, when the frame 1600 is positioned in the rear of the backlight unit 120, the size of the back cover 130 may be reduced.

Figure 19:
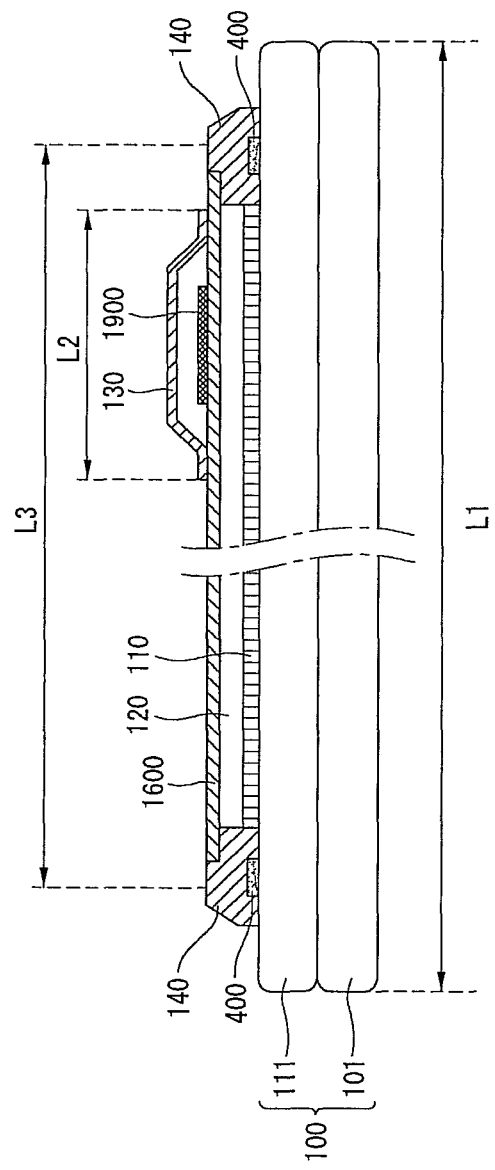

As shown in FIG. 19, the back cover 130 may be positioned on a portion of a back surface of the frame 1600. A driving board 1900 may be positioned between the back cover 130 and the frame 1600 to supply a driving signal to the display panel 100. In this case, the width L2 of the back cover 130 may be less than a width L3 of the frame 1600. The width of the display panel 100, for example, the width L1 of the front substrate 101 may be greater than the width L2 of the back cover 130 and the width L3 of the frame 1600.

Figure 20:
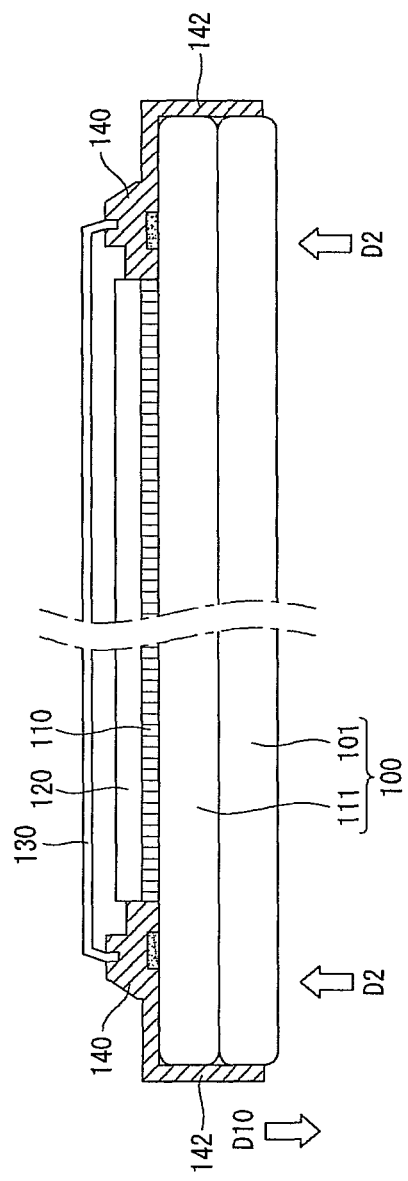

As shown in FIG. 20, the bracket 140 may extend to the side of the display panel 100. Hence, the bracket 140 may include a portion 142 positioned on the side of the display panel 100. For example, the bracket 140 may extend to the side of the back substrate 111 of the display panel 100 and thus may include a portion positioned on the side of the back substrate 111. Alternatively, the bracket 140 may extend to the side of the front substrate 101 of the display panel 100 and thus may include a portion positioned on the side of each of the front substrate 101 and the back substrate 111. In FIG. 20, "D10" indicates an extending direction of the bracket 140.

In this case, the edge of the front surface of the front substrate 101 may be exposed, and the edge of the side of the front substrate 101 may not be exposed. Hence, the edge of the side of the front substrate 101 may be efficiently protected from the external impact.

As shown in FIG. 20, the fact that the edge of the side of the front substrate 101 is hidden by the bracket 140 may mean that when the observer in the side of the display panel 100 views the front surface of the front substrate 101, the observer may recognize that the entire side or the partial side of the front substrate 101 (or the entire side or the partial side of the back substrate 111) is hidden by the bracket 140.

In other words, the fact that the edge of the side of the front substrate 101 is hidden by the bracket 140 may mean that the bracket 140 overlaps the entire side or the partial side of the display panel 100 (for example, the entire side or the partial side of the back substrate 111 or the entire side or the partial side of the front substrate 101) in the longitudinal direction of the display panel 100.

Figure 21A:
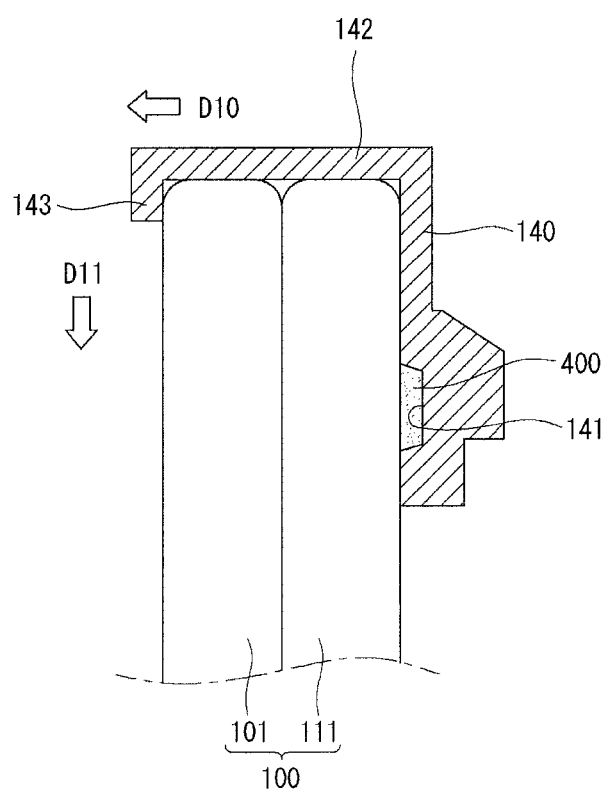

Further, as shown in FIG. 21A, the bracket 140 may extend to the side of the display panel 100 and the front surface of the front substrate 101. Hence, the bracket 140 may include the portion 142 positioned on the side of the display panel 100 and a portion 143 positioned on the front surface of the front substrate 101. In FIG. 21A, "D10" and "D11" indicate an extending direction of the bracket 140. In this case, a portion of the edge of the front surface of the front substrate 101 may be hidden by the bracket 140, but almost the entire front surface of the front substrate 101 may be exposed.

Figure 21B:
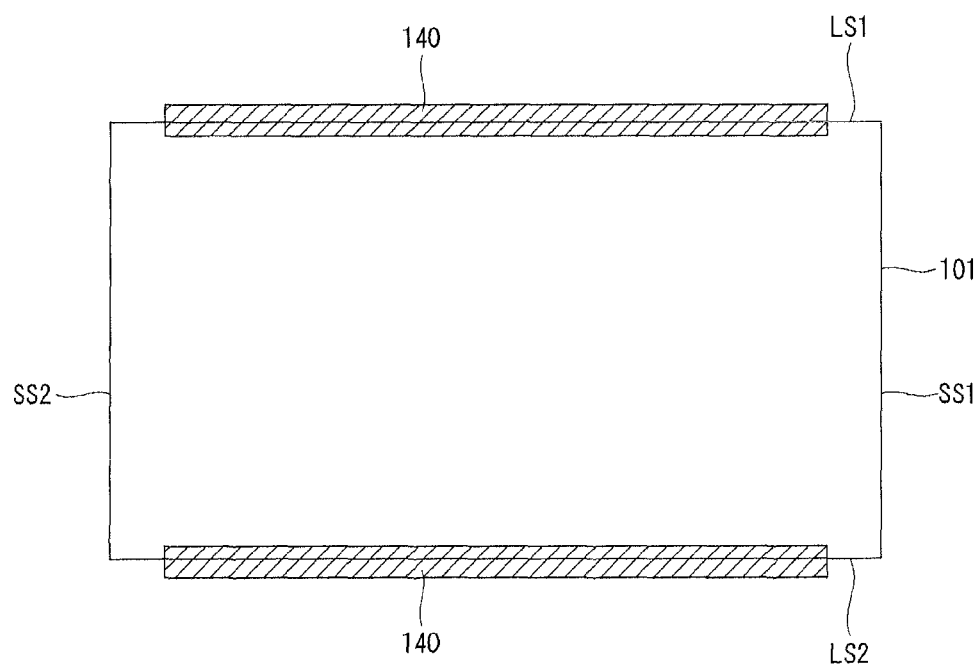

Even if the bracket 140 hides the portion of the edge of the front surface of the front substrate 101, the bracket 140 may not hide the entire edge of the front surface of the front substrate 101. For example, as shown in FIG. 21B, the bracket 140 may hide a portion of an edge of each of a first long side LS1 and a second long side LS2 of the front substrate 101. However, edges of a first short side SS1 and a second short side SS2 of the front substrate 101 may be exposed.

Figure 21C:
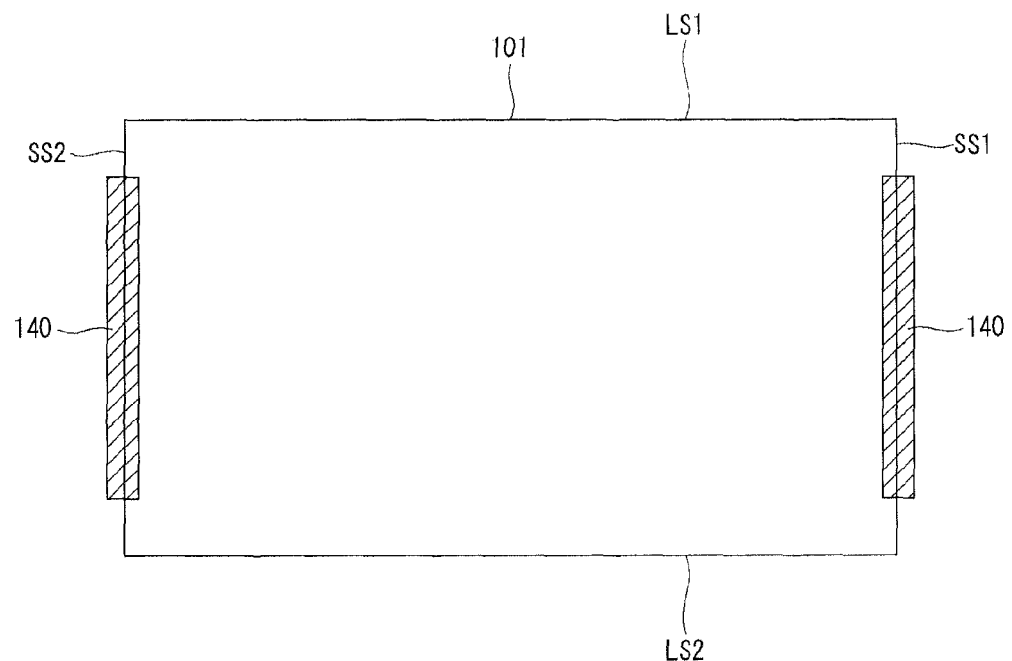

Alternatively, as shown in FIG. 21C, the bracket 140 may hide a portion of the edge of each of the first short side SS1 and the second short side SS2 of the front substrate 101. However, the edges of the first long side LS1 and the second long side LS2 of the front substrate 101 may be exposed.

Figure 21D:
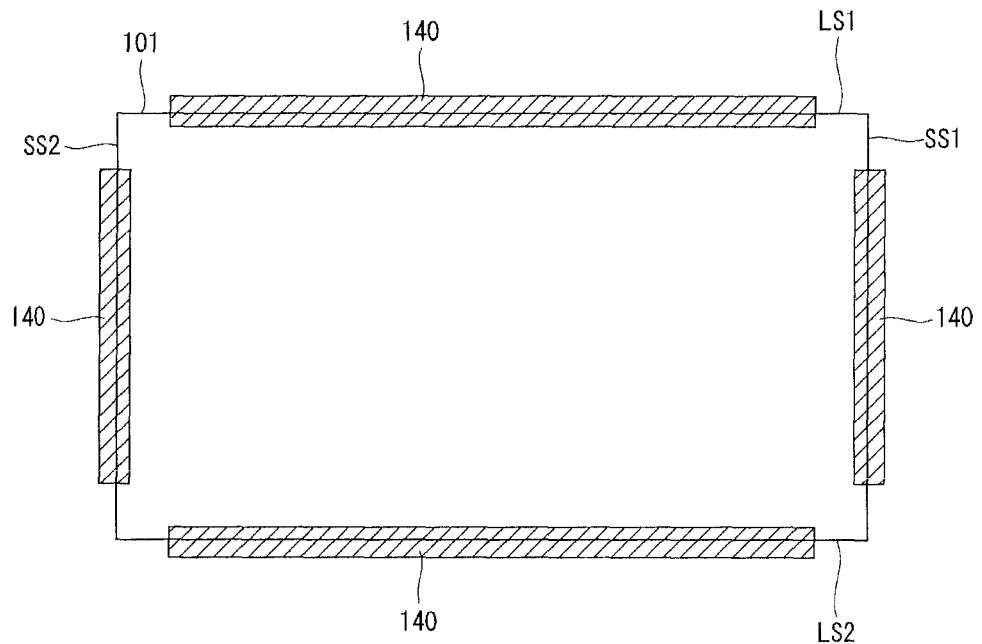

Alternatively, as shown in FIG. 21D, the bracket 140 may hide a portion of the edge of each of the first long side LS1, the second long side LS2, the first short side SS1, and the second short side SS2 of the front substrate 101. However, even in this case, almost the entire front surface of the front substrate 101 may be exposed.

The above-described structure illustrated in FIGS. 21A to 21D may be applied to the structure of the display device in which an auxiliary bracket 2300 is added. Namely, the auxiliary bracket 2300 may replace the bracket 140 in the structure illustrated in FIGS. 21A to 21D.

Figure 22A:
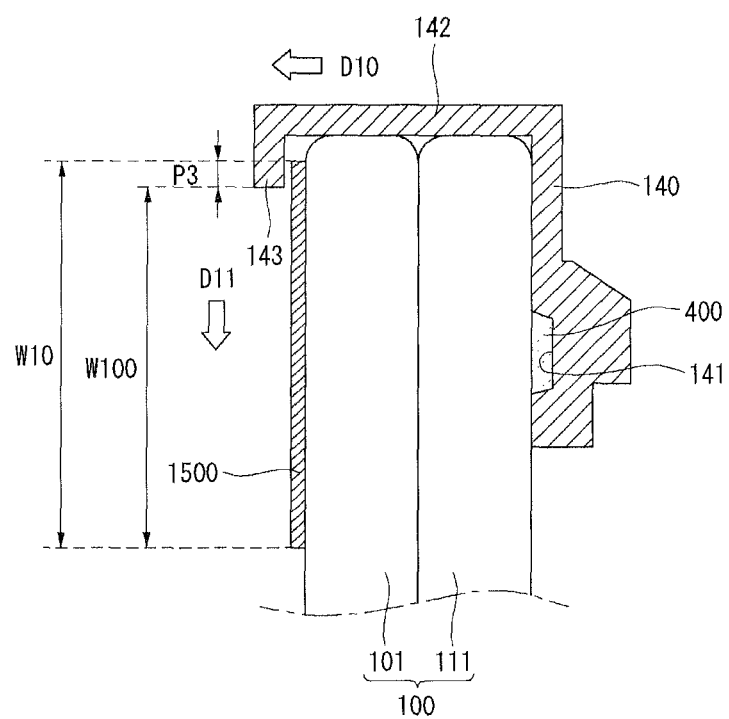

As shown in FIG. 22A, when the bracket 140 extends to the front surface of the front substrate 101, the bracket 140 may include a portion P3 overlapping the blocking member 1500 on the front surface of the front substrate 101. In this case, the bracket 140 may hide a portion of the blocking member 1500. The overlap portion P3 between the bracket 140 and the blocking member 1500 may contact the blocking member 1500.

Even when the bracket 140 hides the portion of the blocking member 1500, a size of the overlap portion P3 between the bracket 140 and the blocking member 1500 may be less than a size of a non-overlap portion between the bracket 140 and the blocking member 1500. For example, a size of the portion P3 of the blocking member 1500 hidden by the bracket 140 may be less than a size of a portion W100 of the blocking member 1500 that is not hidden by the bracket 140 and is exposed.

Figure 22B:
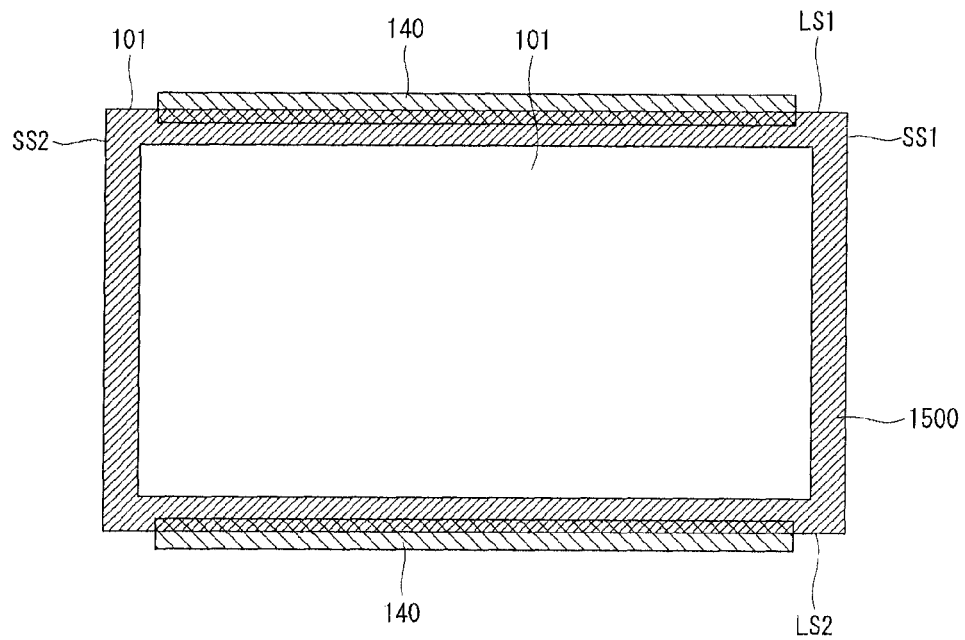

Further, as shown in FIG. 22B, the bracket 140 may hide a portion of the blocking member 1500 in the first long side LS1 and the second long side LS2 of the front substrate 101. However, the blocking member 1500 may not be hidden by the bracket 140 and may be exposed in the first short side SS1 and the second short side SS2 of the front substrate 101.

Figure 22C:
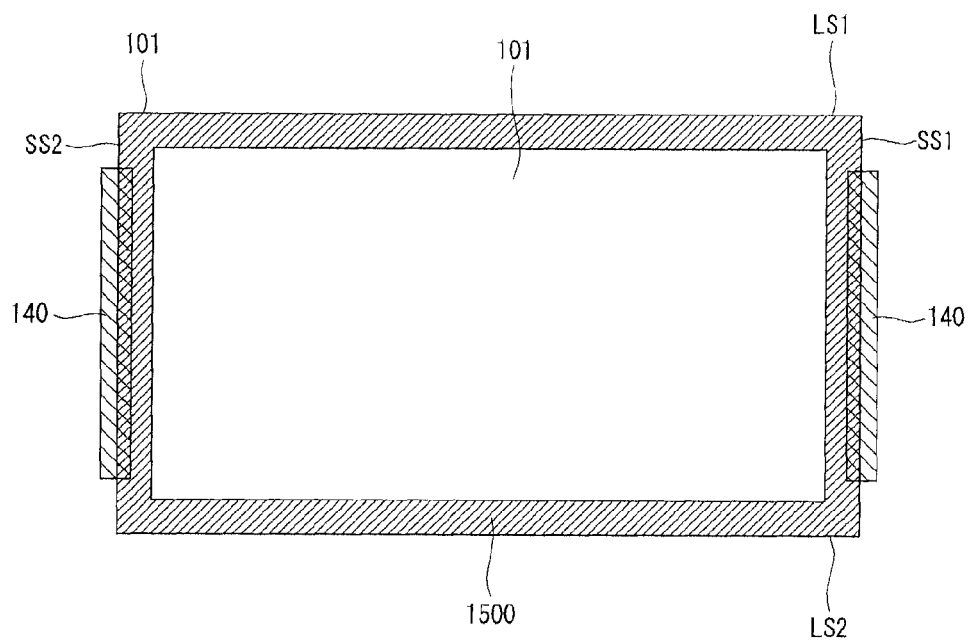

Alternatively, as shown in FIG. 22C, the bracket 140 may hide a portion of the blocking member 1500 in the first short side SS1 and the second short side SS2 of the front substrate 101. However, the blocking member 1500 may not be hidden by the bracket 140 and may be exposed in the first long side LS1 and the second long side LS2 of the front substrate 101.

Figure 22D:
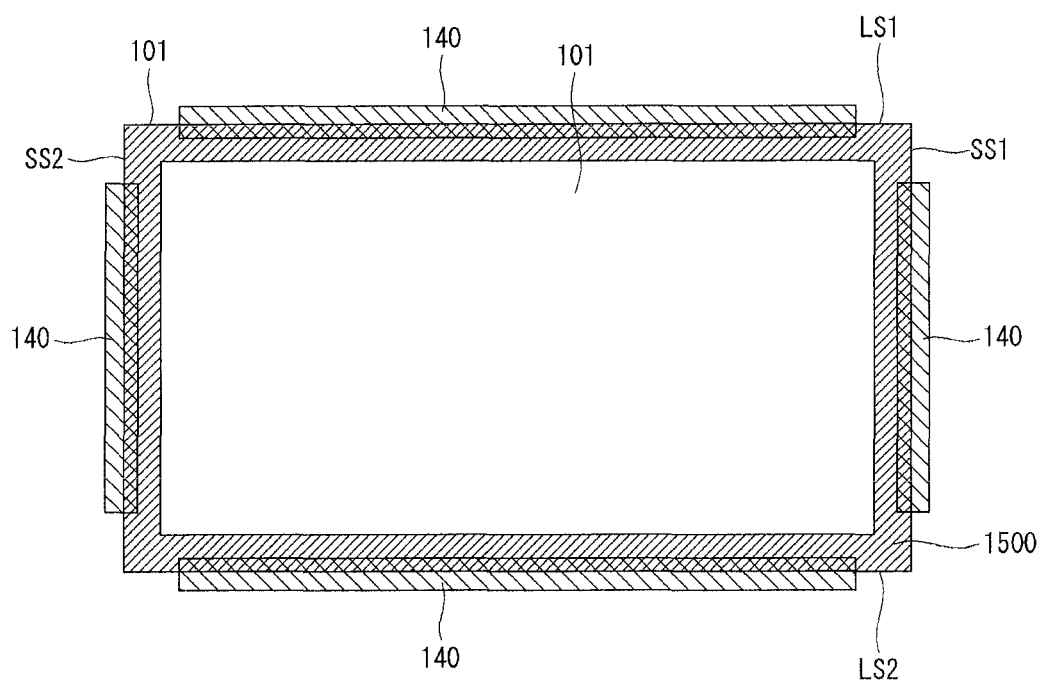

Alternatively, as shown in FIG. 22D, the bracket 140 may hide a portion of the blocking member 1500 in the first long side LS1, the second long side LS2, the first short side SS1, and the second short side SS2 of the front substrate 101. However, even in this case, most of the blocking member 1500 may be exposed.

The above-described structure illustrated in FIGS. 22A to 22D may be applied to the structure of the display device in which the auxiliary bracket 2300 is added. Namely, the auxiliary bracket 2300 may replace the bracket 140 in the structure illustrated in FIGS. 22A to 22D.

Figure 23A:
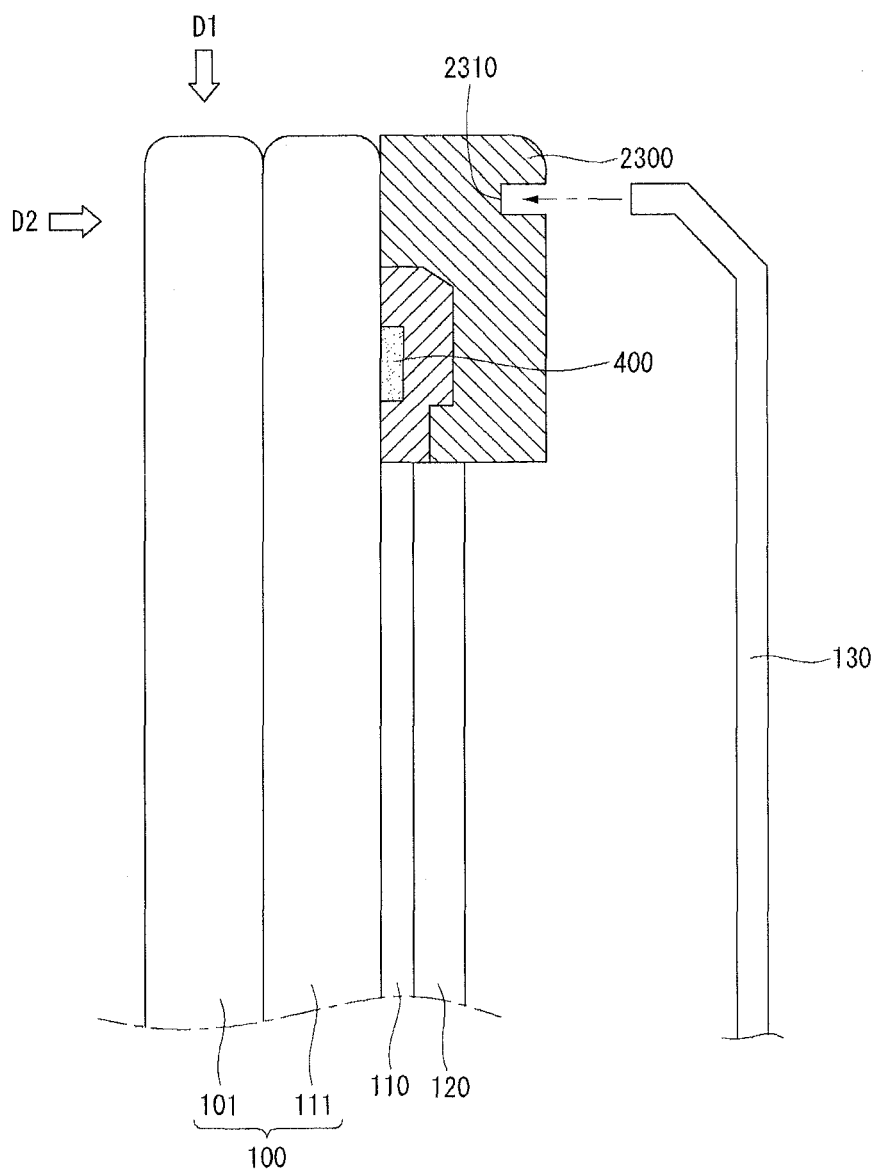

As shown in FIG. 23A, the auxiliary bracket 2300 may be positioned between the bracket 140 and the back cover 130. When the auxiliary bracket 2300 is used, a design of the display device may be easily changed by changing the shape of the auxiliary bracket 2300 exposed to the outside without changing the shape of the bracket 140. More specifically, the connection structure of the back cover 130 may be easily changed using the auxiliary bracket 2300 without changing the location structure of the optical layer 110 or the backlight unit 120. Namely, the external shape such as the connection structure of the back cover 130 may be easily changed without changing the basic structure of the display device.

One side of the auxiliary bracket 2300 may be fixed to the bracket 140, and the other side of the auxiliary bracket 2300 may be fixed to the back cover 130.

The auxiliary bracket 2300 may have a groove 2310, that is depressed in a direction facing the bracket 140, so as to fix the back cover 130 to the auxiliary bracket 2300. An end of the back cover 130 may be inserted into the groove 2310. The groove 2310 of the auxiliary bracket 2300 used to fix the back cover 130 may be referred to as a fourth groove.

When the back cover 130 is fixed to the auxiliary bracket 2300, the back cover 130 and the backlight unit 120 may be spaced apart from each other at a predetermined distance. This structure may be substantially the same as the structure illustrated in FIGS. 14 and 15, in which the back cover 130 fixed to the bracket 140 and the backlight unit 120 are spaced apart from each other at the predetermined distance.

Even when the back cover 130 is fixed to the auxiliary bracket 2300, the edge of the front surface of the front substrate 101 or the edge of the side of the front substrate 101 may be exposed. This structure was described above with reference to FIGS. 14 and 15.

Figure 23B:
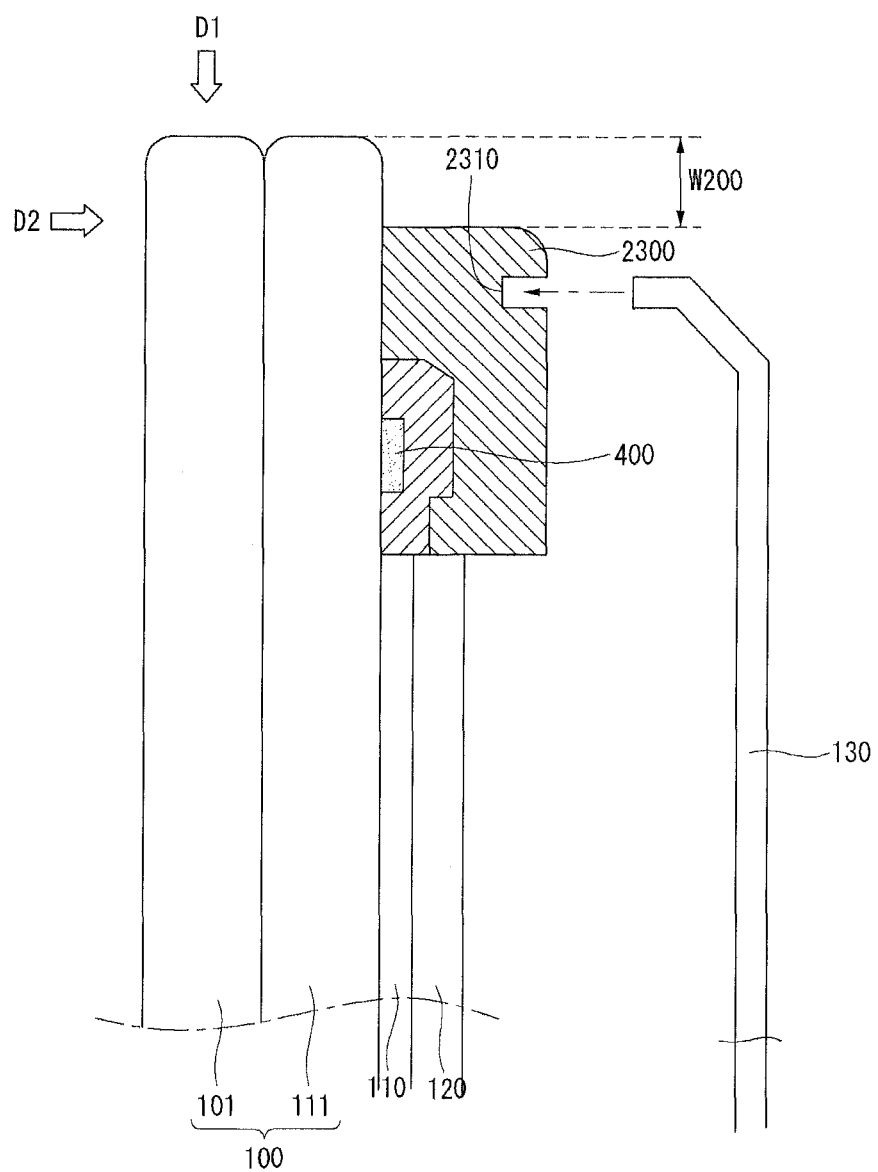

As shown in FIG. 23B, the display panel 100 may include a portion W200 extending further than the auxiliary bracket 2300 in the longitudinal direction.

Figure 24:
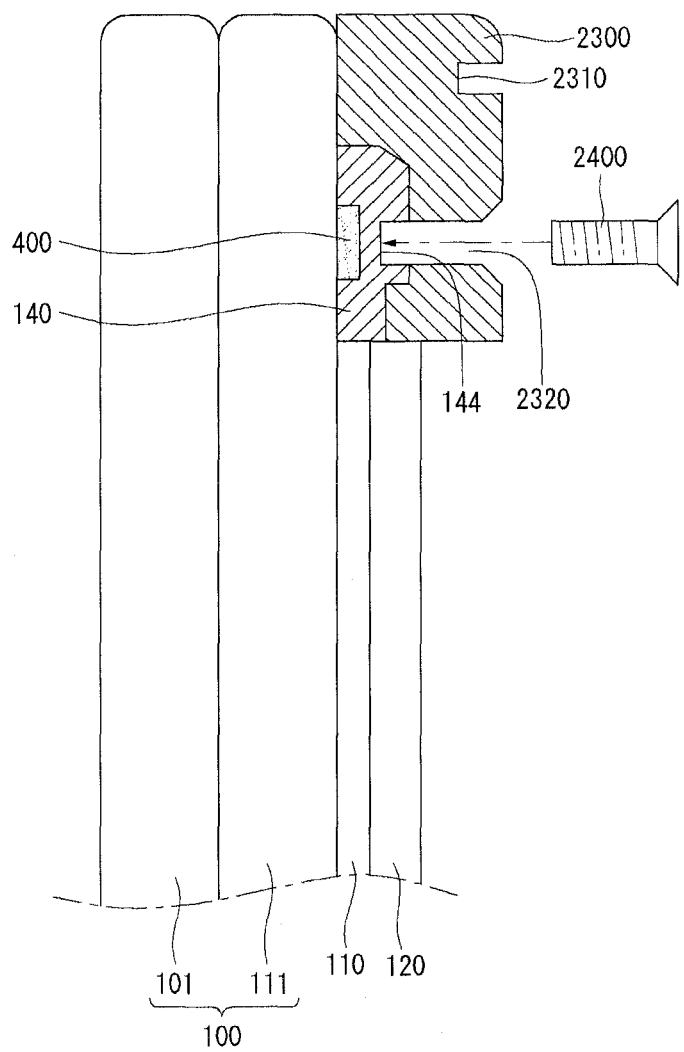

The bracket 140 and the auxiliary bracket 2300 may be coupled with each other using a predetermined coupling member. For example, as shown in FIG. 24, the bracket 140 may have a groove 144 used to couple with the auxiliary bracket 2300, and the auxiliary bracket 2300 may have a hole 2320 for a coupling member 2400. In this case, the coupling member 2400 such as a screw may pass through the hole 2320 of the auxiliary bracket 2300 and may be fixed to the groove 144 of the bracket 140. The groove 144 of the bracket 140 may be referred to as a fifth groove.

Figure 25:
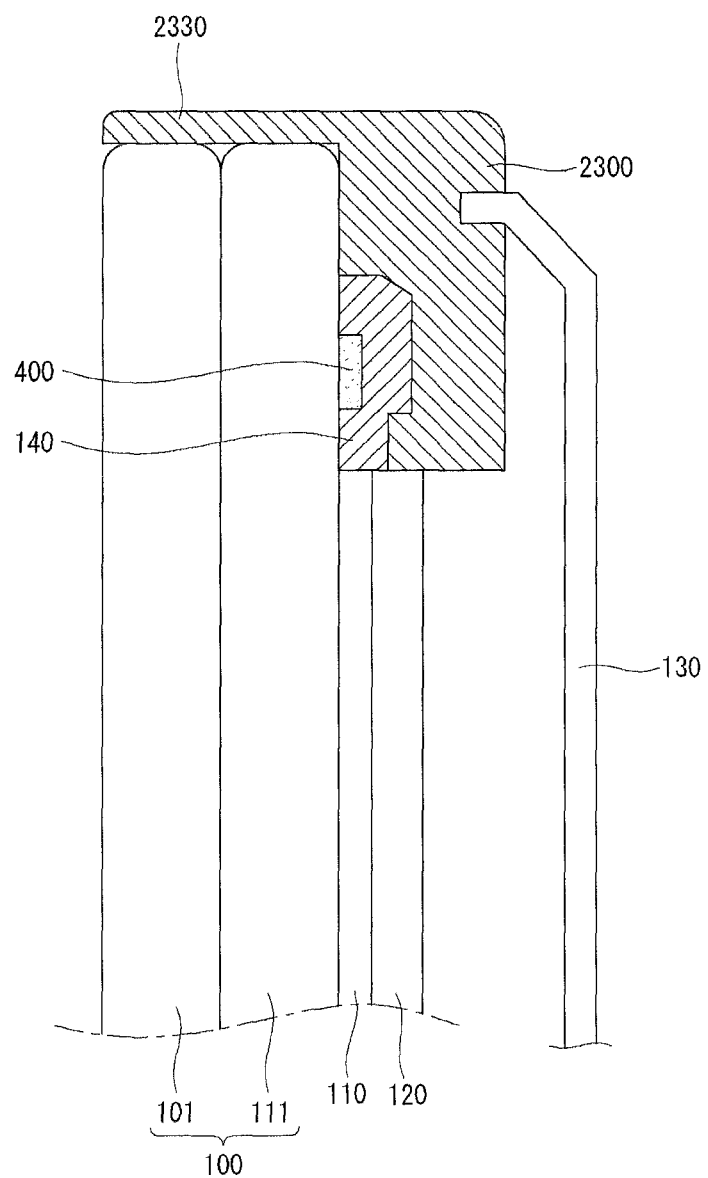

As shown in FIG. 25, the auxiliary bracket 2300 may include a portion 2330 positioned on the side of the display panel 100.

More specifically, the auxiliary bracket 2300 may extend to the side of the display panel 100. For example, the auxiliary bracket 2300 may extend to the side of the back substrate 111 of the display panel 100 and thus may include a portion positioned on the side of the back substrate 111. Alternatively, the auxiliary bracket 2300 may extend to the side of the front substrate 101 of the display panel 100 and thus may include a portion positioned on the side of the front substrate 101.

Figure 26:
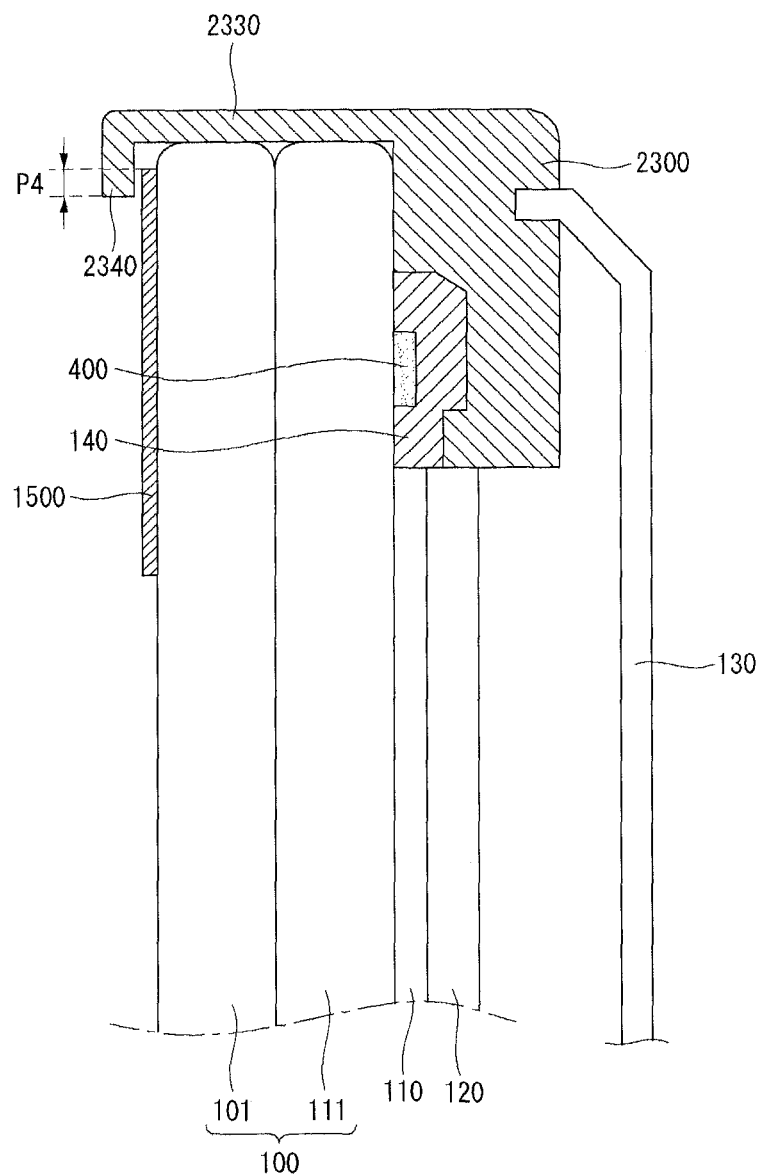

As shown in FIG. 26, the auxiliary bracket 2300 may extend to the side of the display panel 100 and the front surface of the front substrate 101. Hence, the auxiliary bracket 2300 may include the portion 2330 positioned on the side of the display panel 100 and a portion 2340 positioned on the front surface of the front substrate 101.

In this case, the partial edge of the front surface of the front substrate 101 may be hidden by the auxiliary bracket 2300, but almost the entire front surface of the front substrate 101 may be exposed.

Even when the auxiliary bracket 2300 hides the partial edge of the front surface of the front substrate 101, all of the edges of the front surface of the front substrate 101 may not be hidden by the auxiliary bracket 2300. This structure may be substantially the same as the structure illustrated in FIGS. 21B to 21D.

Further, when the auxiliary bracket 2300 extends to the front surface of the front substrate 101, the auxiliary bracket 2300 may include a portion P4 overlapping the blocking member 1500 on the front surface of the front substrate 101. In this case, the auxiliary bracket 2300 may hide a portion of the blocking member 1500. The overlap portion P4 between the auxiliary bracket 2300 and the blocking member 1500 may contact the blocking member 1500.

Even when the auxiliary bracket 2300 hides the portion of the blocking member 1500, a size of the overlap portion P3 between the auxiliary bracket 2300 and the blocking member 1500 may be less than a size of a non-overlap portion between the auxiliary bracket 2300 and the blocking member 1500. The structure of the auxiliary bracket 2300 may be substantially the same as the structure illustrated in FIGS. 22B to 22D.

Figure 27:
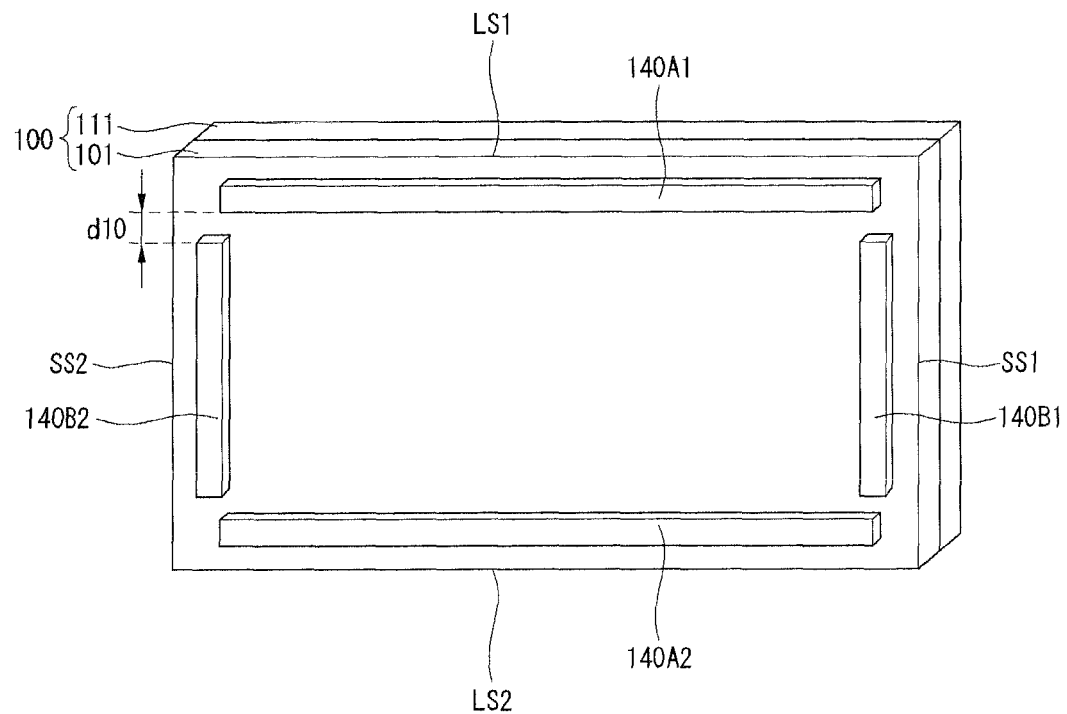

The bracket 140 may be divided into a plurality of parts. For example, as shown in FIG. 27, the bracket 140 may include first brackets 140A1 and 140A2 and second brackets 140B1 and 140B2.

The first brackets 140A1 and 140A2 may be respectively attached to long sides LS1 and LS2 of the back surface of the back substrate 111 of the display panel 100. The second brackets 140B1 and 140B2 may be respectively attached to short sides SS1 and SS2 of the back surface of the back substrate 111.

The first brackets 140A1 and 140A2 may be spaced apart from the second brackets 140B1 and 140B2 at a predetermined distance d10. Preferably, the first brackets 140A1 and 140A2 and the second brackets 140B1 and 140B2 may be spaced apart from each other in the corner of the back surface of the back substrate 111. In this case, a process for attaching the first brackets 140A1 and 140A2 and the second brackets 140B1 and 140B2 to the back substrate 111 may be easily performed, and the manufacturing cost of the bracket 140 may be reduced. Hence, the manufacturing cost of the display device may be reduced.

Figure 28:
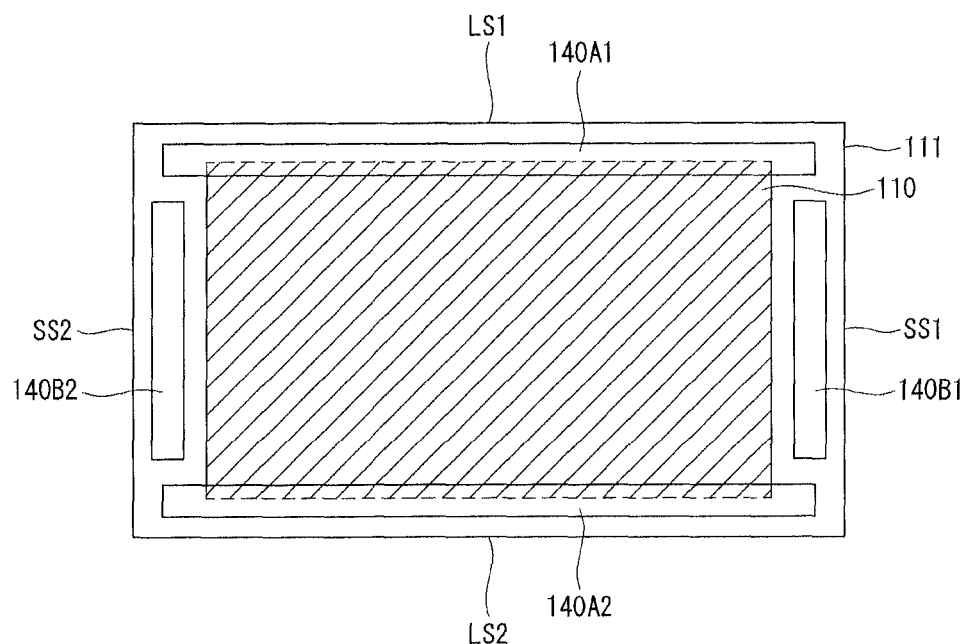

The optical layer 110 may be fixed to the first brackets 140A1 and 140A2, the second brackets 140B1 and 140B2, or both. For example, as shown in FIG. 28, the optical layer 110 may be fixed to the first brackets 140A1 and 140A2 and may not be fixed to the second brackets 140B1 and 140B2. In other words, the optical layer 110 may overlap or contact the first brackets 140A1 and 140A2. The optical layer 110 may not overlap the second brackets 140B1 and 140B2 and may be spaced apart from the second brackets 140B1 and 140B2 at a predetermined distance.

In this case, widths A10 of the first brackets 140A1 and 140A2 may be different from widths A20 of the second brackets 140B1 and 140B2. Preferably, as shown in FIG. 29, the widths A10 of the first brackets 140A1 and 140A2 fixed to the optical layer 110 may be greater than the widths A20 of the second brackets 140B1 and 140B2. Because the optical layer 110 is not fixed to the second brackets 140B1 and 140B2, the widths A20 of the second brackets 140B1 and 140B2 may be less than the widths A10 of the first brackets 140A1 and 140A2.

Alternatively, as shown in FIG. 30, the optical layer 110 may be fixed to the first brackets 140A1 and 140A2 and the second brackets 140B1 and 140B2. Even in this case, the widths A10 of the first brackets 140A1 and 140A2 may be greater than the widths A20 of the second brackets 140B1 and 140B2. Hence, the first brackets 140A1 and 140A2 longer than the second brackets 140B1 and 140B2 may mainly support the optical layer 110.

Figure 31:
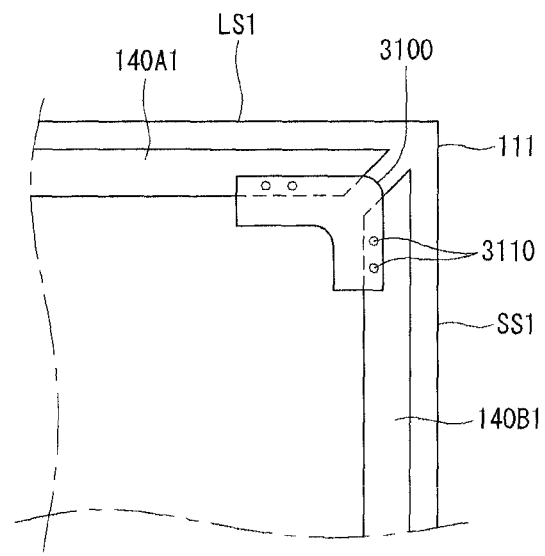

The first brackets 140A1 and 140A2 may be connected to the second brackets 140B1 and 140B2 using a predetermined connecting part. For example, as shown in FIG. 31, a connecting part 3100 may be positioned between the first brackets 140A1 and 140A2 and the second brackets 140B1 and 140B2 and may be connected to the first brackets 140A1 and 140A2 and the second brackets 140B1 and 140B2 using a predetermined coupling member 3110. Hence, the first brackets 140A1 and 140A2 may be connected to the second brackets 140B1 and 140B2.

Figure 32:
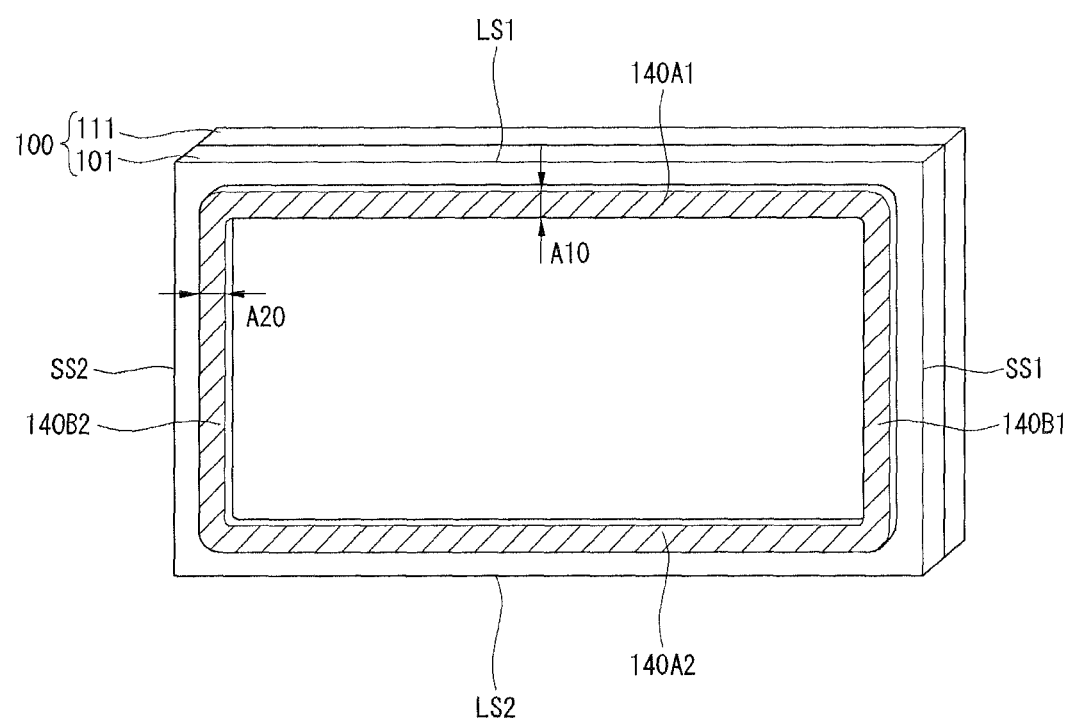

As shown in FIG. 32, the first brackets 140A1 and 140A2 and the second brackets 140B1 and 140B2 may form an integral body. In this case, a portion of the bracket 140 positioned at the long sides LS1 and LS2 of the back substrate 111 may be referred to as a first bracket, and a portion of the bracket 140 positioned at the short sides SS1 and SS2 of the back substrate 111 may be referred to as a second bracket. Even in this case, the widths A10 of the first brackets 140A1 and 140A2 may be greater than the widths A20 of the second brackets 140B1 and 140B2.

Figure 33:
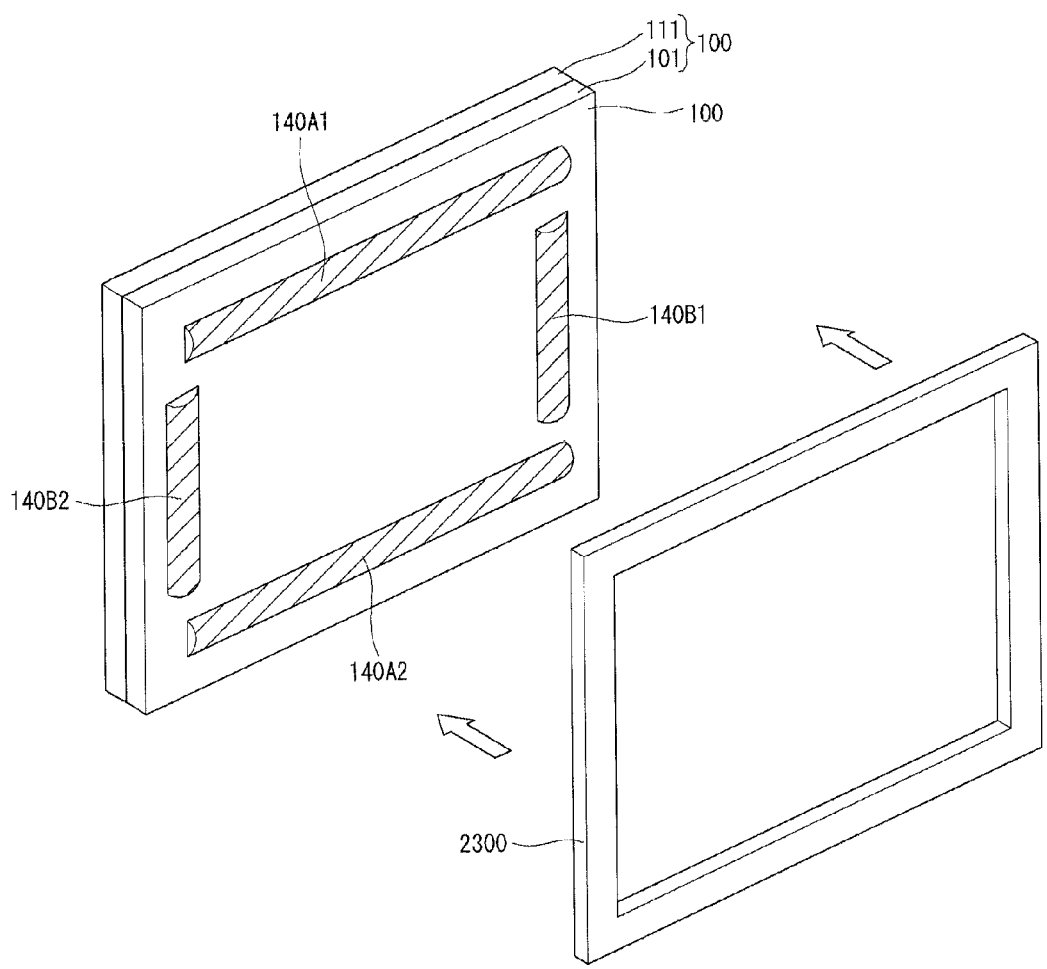

As shown in FIG. 33, the single auxiliary bracket 2300 may be connected to the first brackets 140A1 and 140A2 and the second brackets 140B1 and 140B2. In this case, an empty space may be provided between the first brackets 140A1 and 140A2 and the second brackets 140B1 and 140B2 in a state where the single auxiliary bracket 2300 is connected to the first brackets 140A1 and 140A2 and the second brackets 140B1 and 140B2.

As shown in FIG. 34, a width L10 of the front polarizing film 3400 positioned on the front surface of the front substrate 101 may be different from a width L11 of the back polarizing film 3410 positioned on the back surface of the back substrate 111. The width L10 of the front polarizing film 3400 and the width L11 of the back polarizing film 3410 may be a width in the cross section of the display panel 100. Preferably, the width L10 of the front polarizing film 3400 may be greater than the width L11 of the back polarizing film 3410.

Figure 35A:
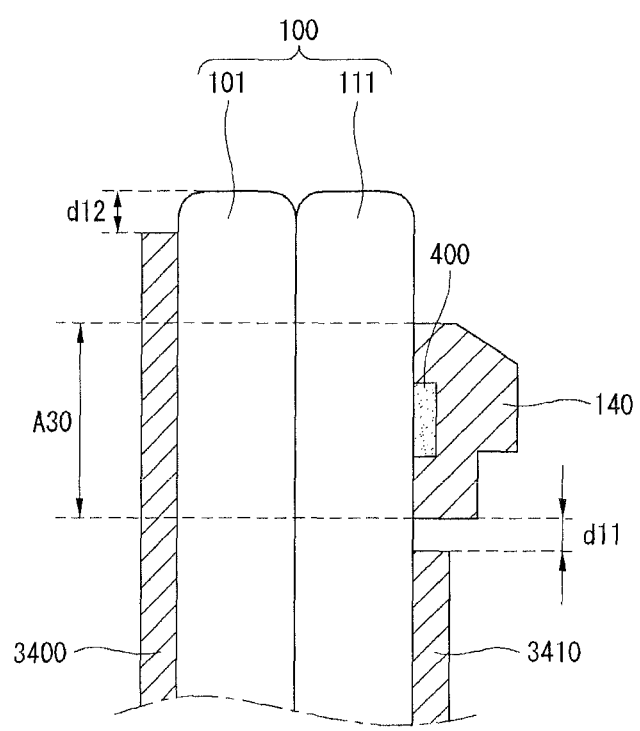

More specifically, as shown in FIG. 35A, the front polarizing film 3400 may include a portion A30 overlapping the bracket 140. The bracket 140 may be spaced apart from the back polarizing film 3410 at a predetermined distance d11 in a direction parallel to the longitudinal direction of the back substrate 111. In this case, the bracket 140 may be directly attached to the back substrate 111. Hence, an adhesive strength between the bracket 140 and the back substrate 111 may be improved.

Further, the front polarizing film 3400 may be spaced apart from an end of the front surface of the front substrate 101 at a predetermined distance d12. In this case, a process for attaching the front polarizing film 3400 to the front substrate 101 may be easily performed, and the production yield may be improved.

Figure 35B:
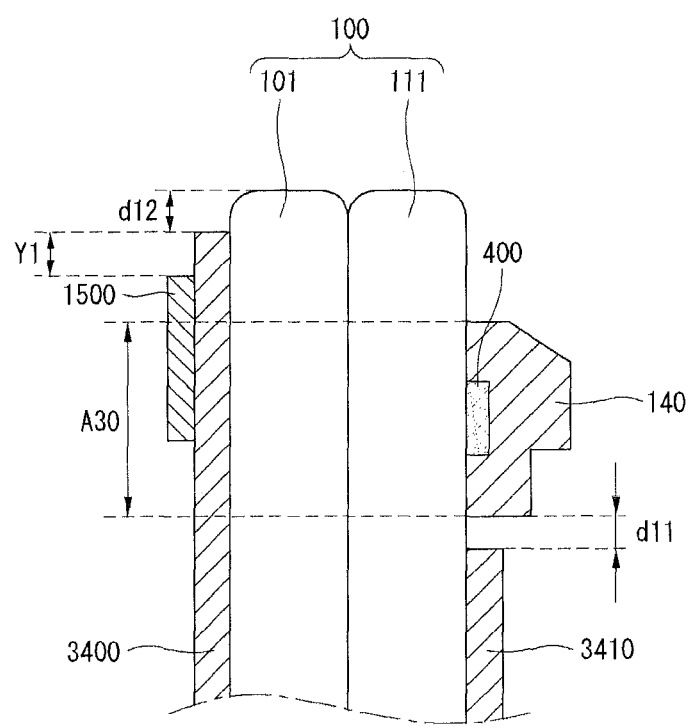

As shown in FIG. 35B, the blocking member 1500 may overlap the front polarizing film 3400. For example, the blocking member 1500 may include a portion positioned on the front polarizing film 3400.

Further, the front polarizing film 3400 may include a portion Y1 extending further than the blocking member 1500 in an outside direction of the display panel 100. FIG. 35B shows that the blocking member 1500 is positioned on the front polarizing film 3400. However, the blocking member 1500 may be positioned between the front polarizing film 3400 and the front substrate 101. Even in this case, the front polarizing film 3400 may include the portion Y1 extending further than the blocking member 1500 in the outside direction of the display panel 100.

Figure 35C:
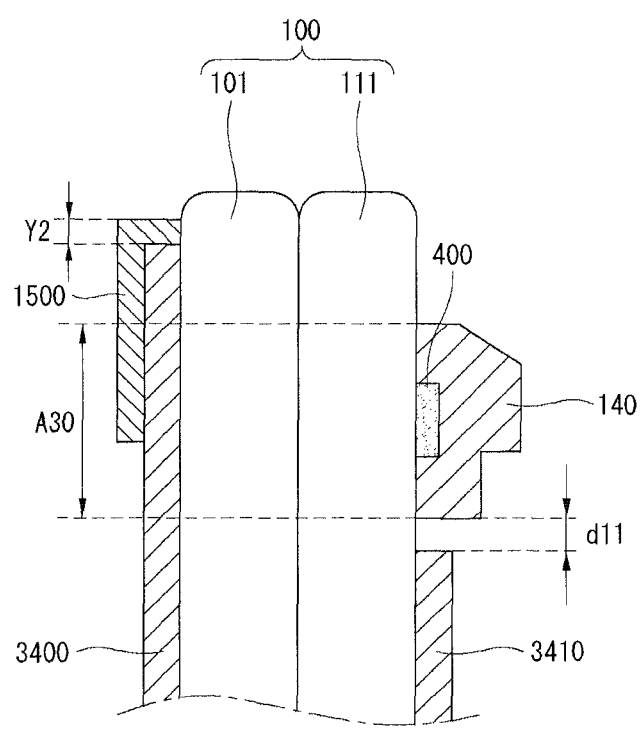
Figure 35D:
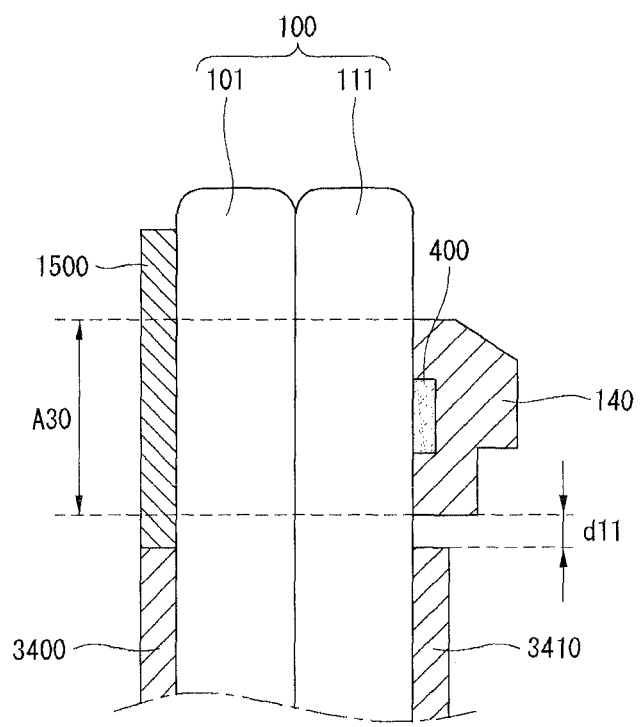

Alternatively, as shown in FIG. 35C, the blocking member 1500 may include a portion Y2 extending further than the front polarizing film 3400 in the outside direction of the display panel 100. In this case, the blocking member 1500 may contact both the front polarizing film 3400 and the front substrate 101.

FIG. 35C shows that the blocking member 1500 is positioned on the front polarizing film 3400. However, the blocking member 1500 may be positioned between the front polarizing film 3400 and the front substrate 101. Even in this case, the blocking member 1500 may include the portion Y2 extending further than the front polarizing film 3400 in the outside direction of the display panel 100.

The blocking member 1500 and the front polarizing film 3400 may be positioned on the same layer level. In this case, the blocking member 1500 may be positioned outside the front polarizing film 3400.

Figure 36:
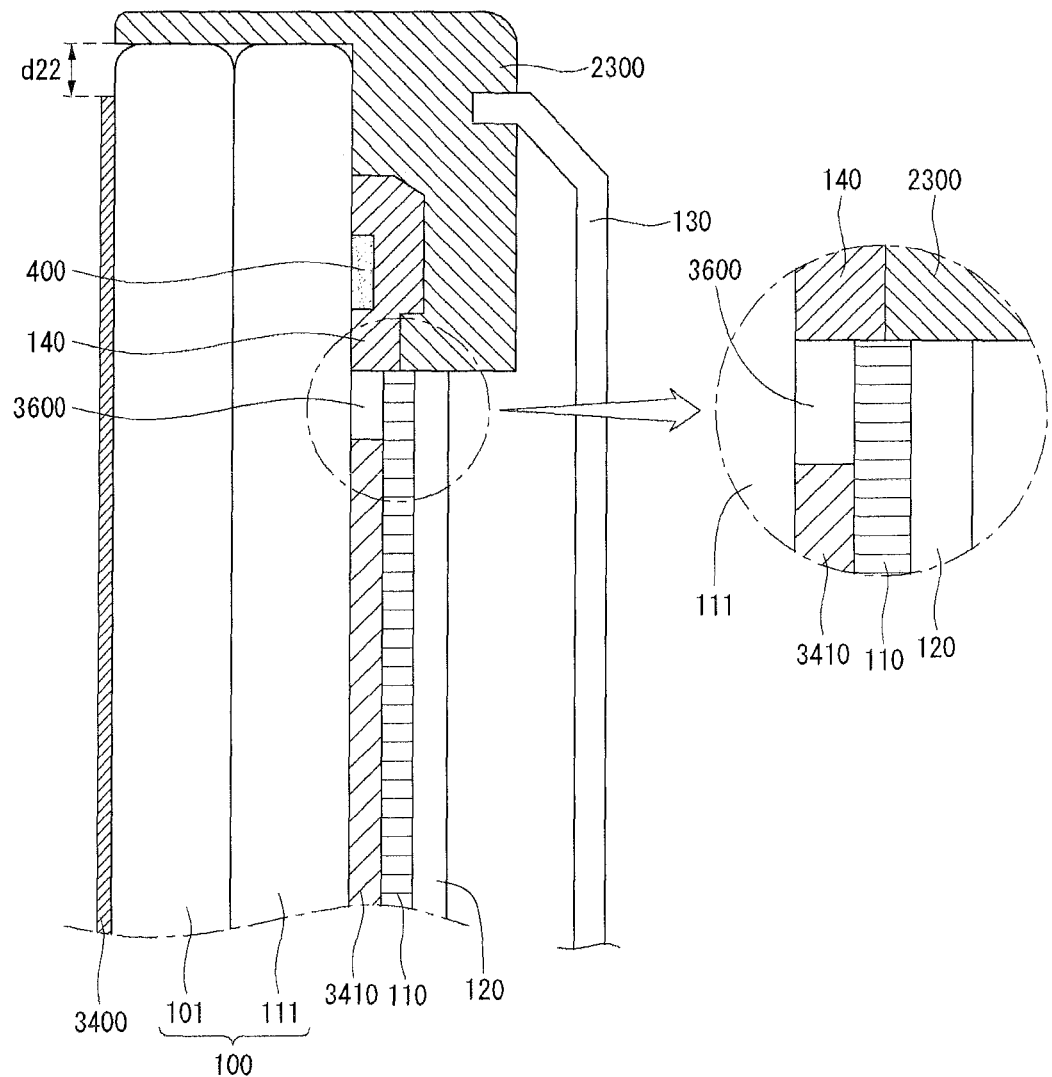
Figure 37:
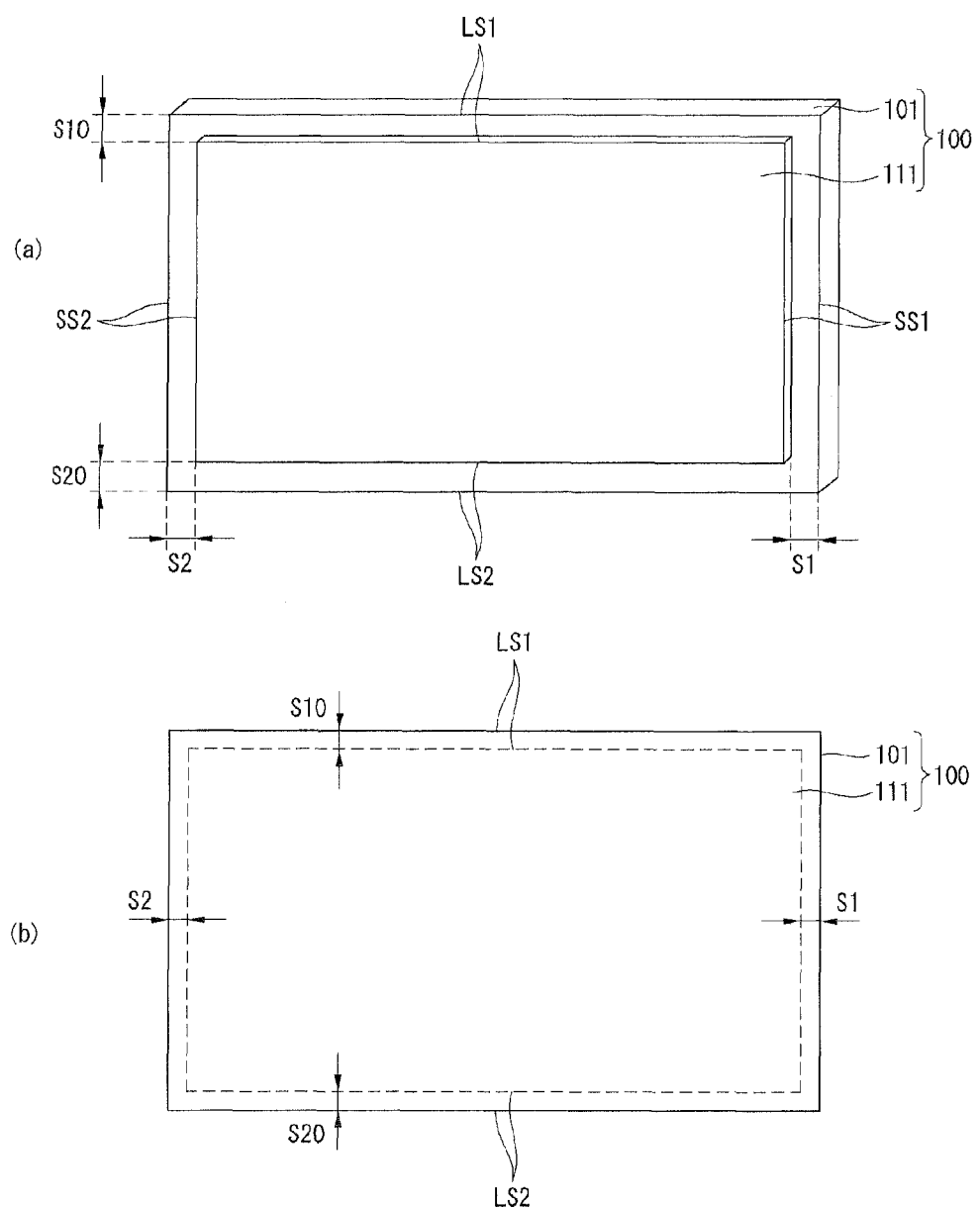

As shown in FIG. 36, when the bracket 140 is spaced apart from the back polarizing film 3410 at the predetermined distance d11 in the direction parallel to the longitudinal direction of the back substrate 111, an air layer 3600 may be formed between the bracket 140 and the front polarizing film 3400 in a state where the optical layer 110 is positioned inside the bracket 140.

When the auxiliary bracket 2300 includes a portion positioned on the side of the display panel 100, the front polarizing film 3400 and the auxiliary bracket 2300 may be spaced apart from each other at a predetermined distance d22 on the front surface of the front substrate 101. This may be equally applied to the structure in which the auxiliary bracket 2300 is not used and the bracket 140 includes a portion positioned on the side of the display panel 100.

As shown in FIGS. 37(a) and 37(b), the short sides SS1 and SS2 of the front substrate 101 may extend further than the short sides SS1 and SS2 of the back substrate 111, and the long sides LS1 and LS2 of the front substrate 101 may extend further than the long sides LS1 and LS2 of the back substrate 111.

For example, the first short side SS1 of the front substrate 101 may extend further than the first short side SS1 of the back substrate 111 corresponding to the first short side SS1 of the front substrate 101 by a first length S1. The second short side SS2 of the front substrate 101 may extend further than the second short side SS2 of the back substrate 111 corresponding to the second short side SS2 of the front substrate 101 by a second length S2.

The first length S1 may be substantially equal to the second length S2. Alternatively, the first length S1 may be different from the second length S2. In this case, the structure of the first short side SS1 of the front substrate 101 may be different from the structure of the second short side SS2 of the front substrate 101.

For example, a sufficient space may be provided in the first short side SS1 of the back substrate 111, so as to mount a gate driver on the first short side SS1 of the back substrate 111 corresponding to the first short side SS1 of the front substrate 101. In this case, the first length S1 may be less than the second length S2.

Further, the first long side LS1 of the front substrate 101 may extend further than the first long side LS1 of the back substrate 111 corresponding to the first long side LS1 of the front substrate 101 by a length S10. The second long side LS2 of the front substrate 101 may extend further than the second long side LS2 of the back substrate 111 corresponding to the second long side LS2 of the front substrate 101 by a length S20. The length S10 and the length S20 may be different from each other.

Figure 38:
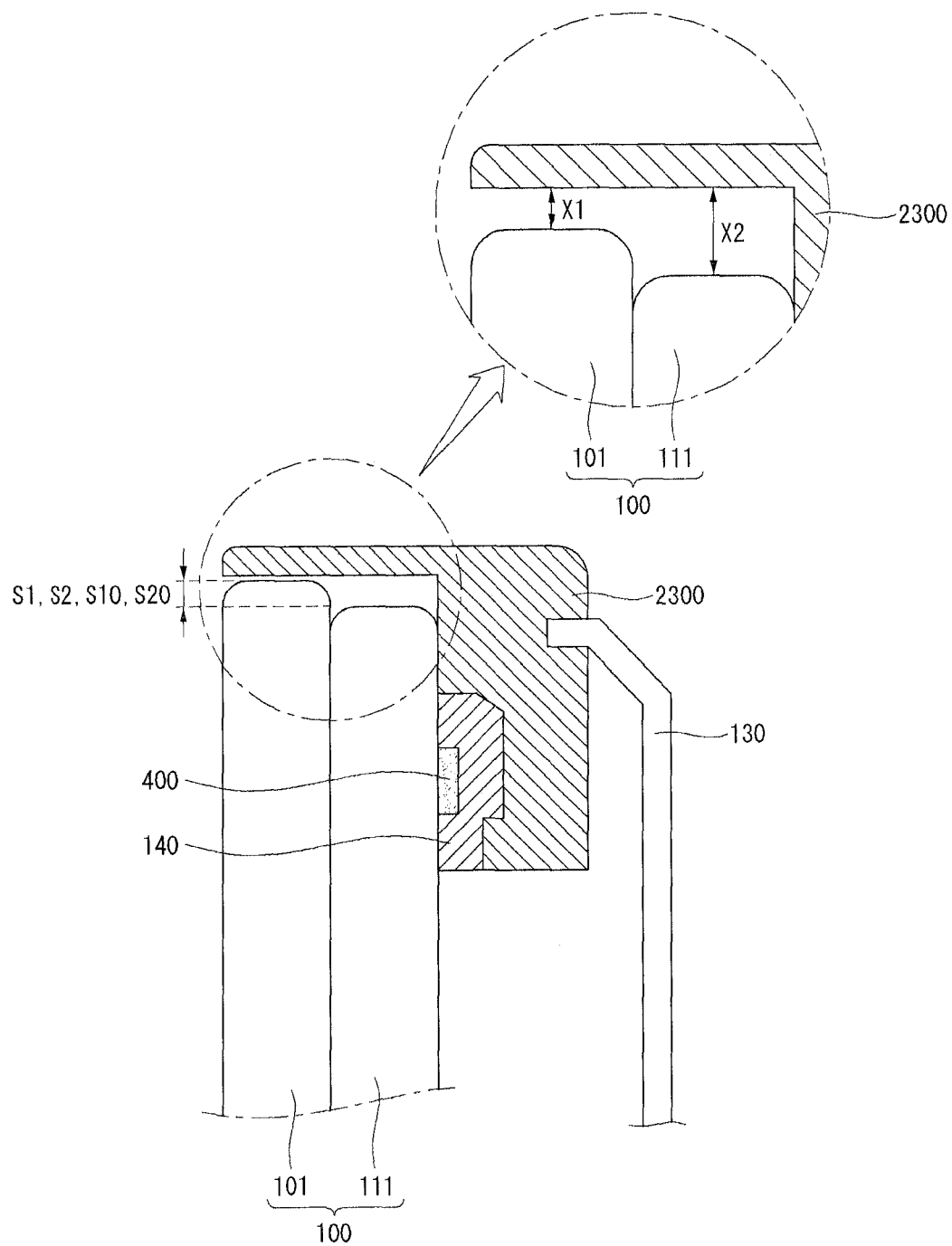

When the long sides LS1 and LS2 and the short sides SS1 and SS2 of the front substrate 101 extend further than the long sides LS1 and LS2 and the short sides SS1 and SS2 of the back substrate 111, respectively, a distance X1 between the front substrate 101 and the auxiliary bracket 2300 may be different from a distance X2 between the back substrate 111 and the auxiliary bracket 2300 as shown in FIG. 38. Preferably, the distance X1 may be less than the distance X2.

This may be equally applied to the structure in which the auxiliary bracket 2300 is not used and the bracket 140 includes the portion positioned on the side of the display panel 100.

At least one of a gate driver for supplying a driving signal to the gate lines and a data driver for supplying a driving signal to the data lines may be mounted outside the back substrate 111. The gate driver may include a plurality of gate driver integrated circuits (ICs), and the data driver may include a plurality of source driver ICs.

Figure 39:
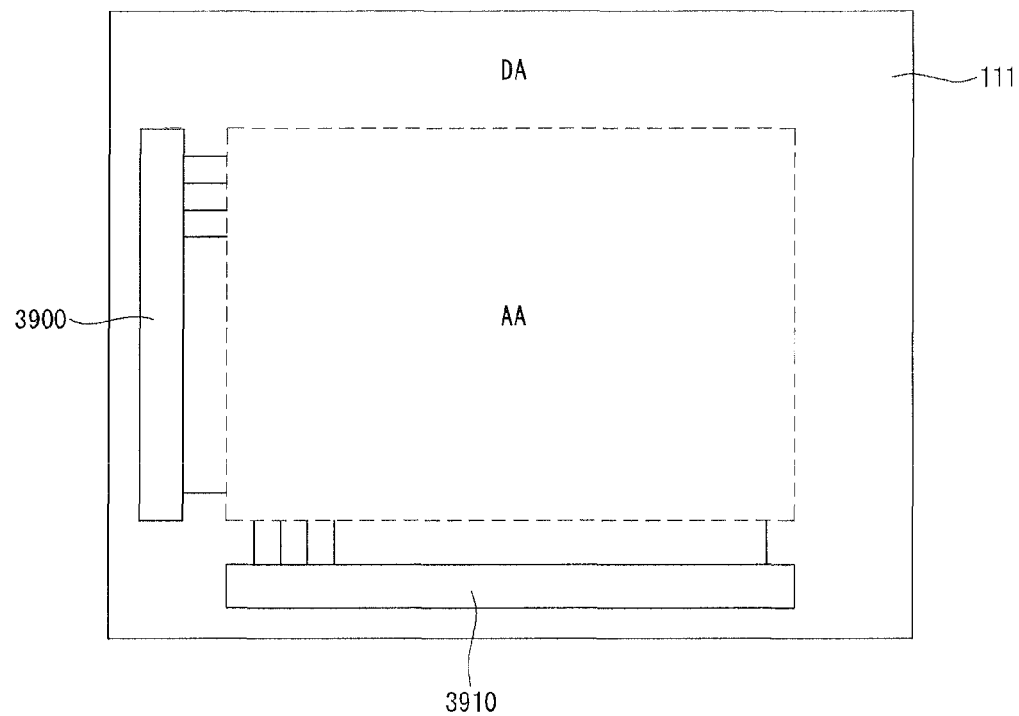

For example, as shown in FIG. 39, a gate driver 3900 and a data driver 3910 may be formed on the back substrate 111. The fact that the gate driver 3900 and the data driver 3910 are formed on the back substrate 111 may mean that circuit elements required to drive the gate driver 3900 and circuit elements required to drive the data driver 3910 are directly patterned on the back substrate 111 through semiconductor manufacturing processes.

It may be preferable that the gate driver 3900 and the data driver 3910 are formed on the back substrate 111 in a dummy area DA positioned outside an active area AA on which the image is displayed.

In this case, because circuit elements required to display the image may be directly formed on the back substrate 111, the number or the size of circuit boards positioned outside may be reduced. Hence, the size or the thickness of the display device may be further reduced.

Figure 40:
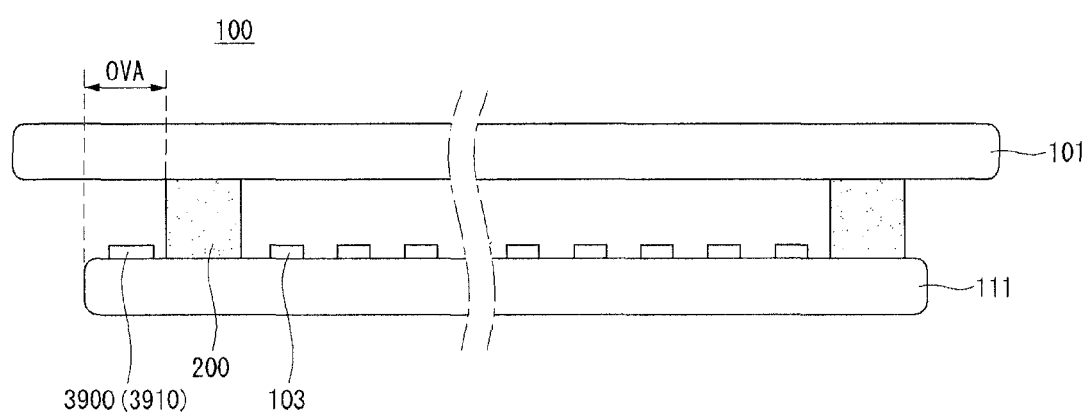

As shown in FIG. 40, when the long sides and the short sides of the front substrate 101 extend further than the long sides and the short sides of the back substrate 111, the gate driver 3900 and the data driver 3910 may be formed in an area OVA commonly overlapping the front substrate 101 and the back substrate 111.

The first transistor 103, for example, the first TFT 103 capable of turning on or off the liquid crystals in each pixel may be formed on the back substrate 111. The gate driver 3900 or the data driver 3910 may include a second transistor that is positioned in the area OVA commonly overlapping the front substrate 101 and the back substrate 111 outside the seal portion 200. Namely, the first transistor 103 may be positioned inside the seal portion 200, and the second transistor may be positioned in the area OVA commonly overlapping the front substrate 101 and the back substrate 111 outside the seal portion 200.

Figure 41:
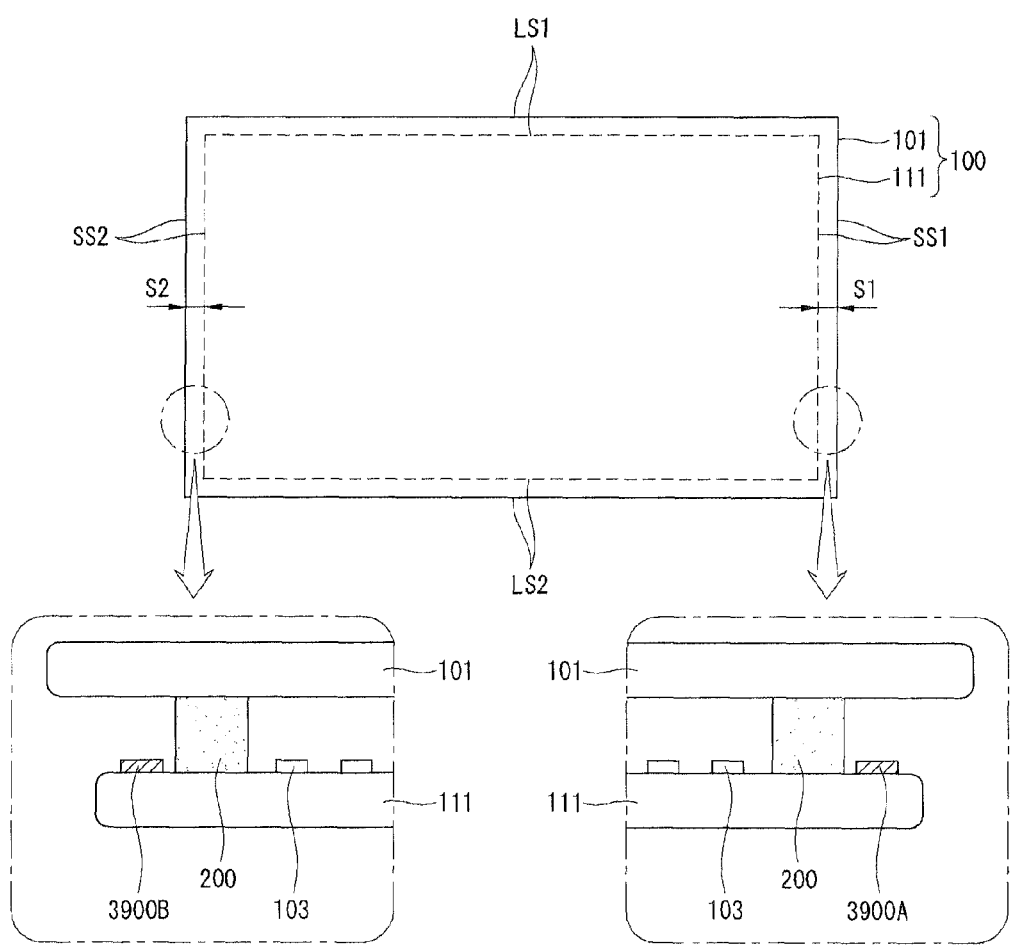

As shown in FIG. 41, a first gate driver 3900A may be positioned in an overlap area between the front substrate 101 and the back substrate 111 outside the seal portion 200 on the first short side SS1 of the back substrate 111. A second gate driver 3900B may be positioned in an overlap area between the front substrate 101 and the back substrate 111 outside the seal portion 200 on the second short side SS2 of the back substrate 111. In this case, the first length S1 may be substantially equal to the second length S2.

Figure 42:
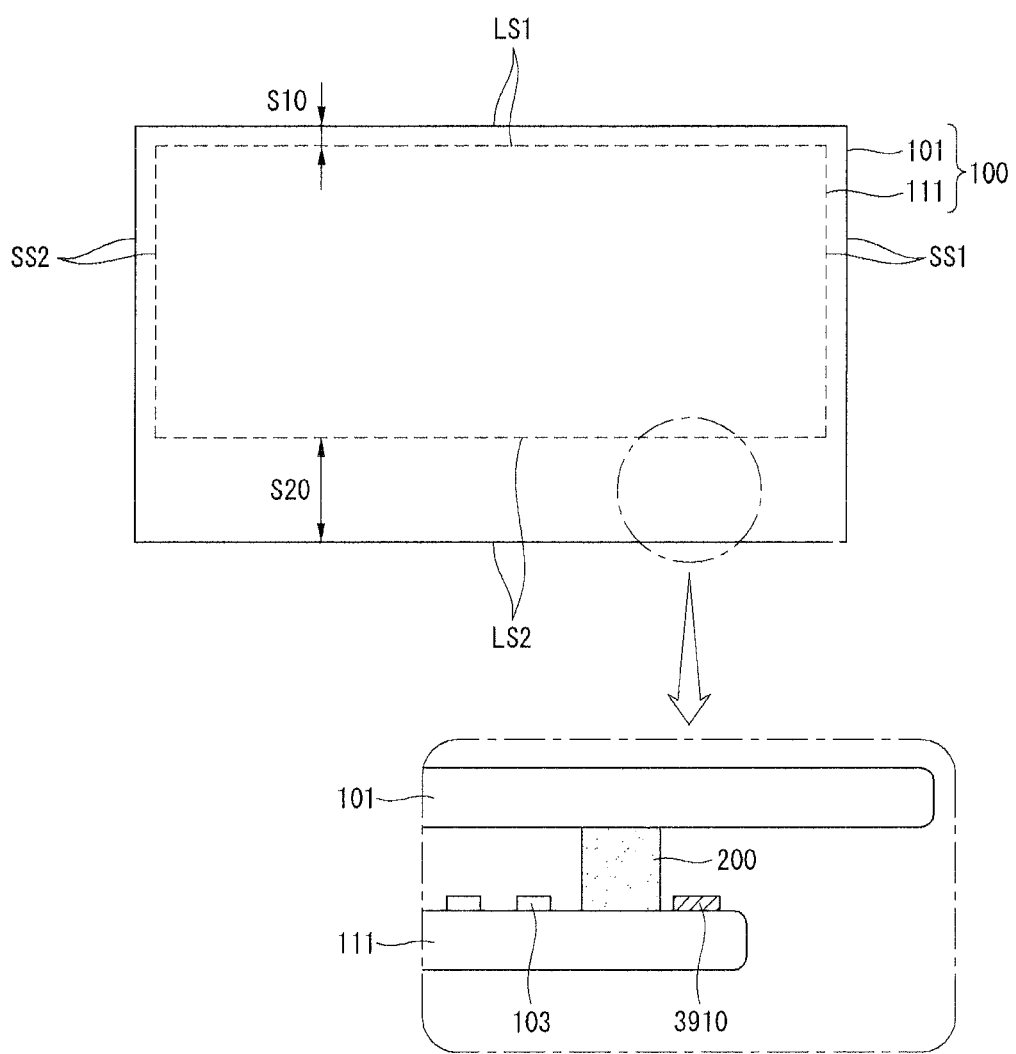

As shown in FIG. 42, the data driver 3910 may be positioned in an overlap area between the front substrate 101 and the back substrate 111 outside the seal portion 200 on the second long side LS2 of the back substrate 111. The data driver may not be positioned in an overlap area between the front substrate 101 and the back substrate 111 outside the seal portion 200 on the first long side LS1 of the back substrate 111. In this case, the length S20 may be greater than the length S10.

Figure 43:
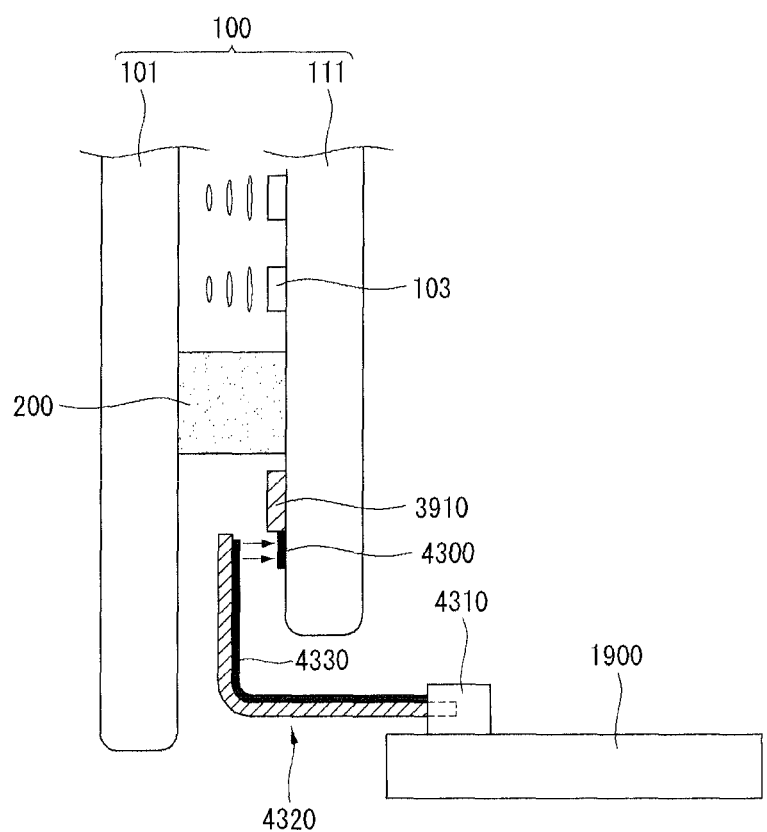

In this case, as shown in FIG. 43, a pad electrode 4300 may be formed in an overlap area between the front substrate 101 and the back substrate 111 outside the seal portion 200 on the second long sides LS2 of the front substrate 101 and the back substrate 111. The pad electrode 4300 may be used in an electrical connection of the driving board 1900 for supplying the driving signal to a transistor.

For example, as shown in FIG. 19, the driving board 1900 for supplying the driving signal to the display panel 100 may be positioned outside the display panel 100, for example, between the frame 1600 and the back cover 130.

In this case, a connector 4310 may be positioned on the driving board 1900. One terminal of a connection substrate 4320 including an electrode 4330 may be connected to the connector 4310, and the other terminal may be connected to the pad electrode 4300. Hence, the driving board 1900 and the pad electrode 4300, more specifically, the driving board 1900 and the data driver 3910 may be electrically connected to each other. The connection substrate 4320 may be a flexible substrate such as a tape carrier package (TCP) and a flexible printed circuit (FPC).

As above, the connection substrate 4320 may be connected to the pad electrode 4300 in a formation portion of the pad electrode 4300. The length of the front substrate 101 may be greater than the length of the back substrate 111, so that the connection substrate 4320 is not seen in the front of the display panel 100. In other words, when the pad electrode 4300 is formed on the second long side LS2 of the back substrate 111, the length S20 may be greater than the length S10.

Figure 44:
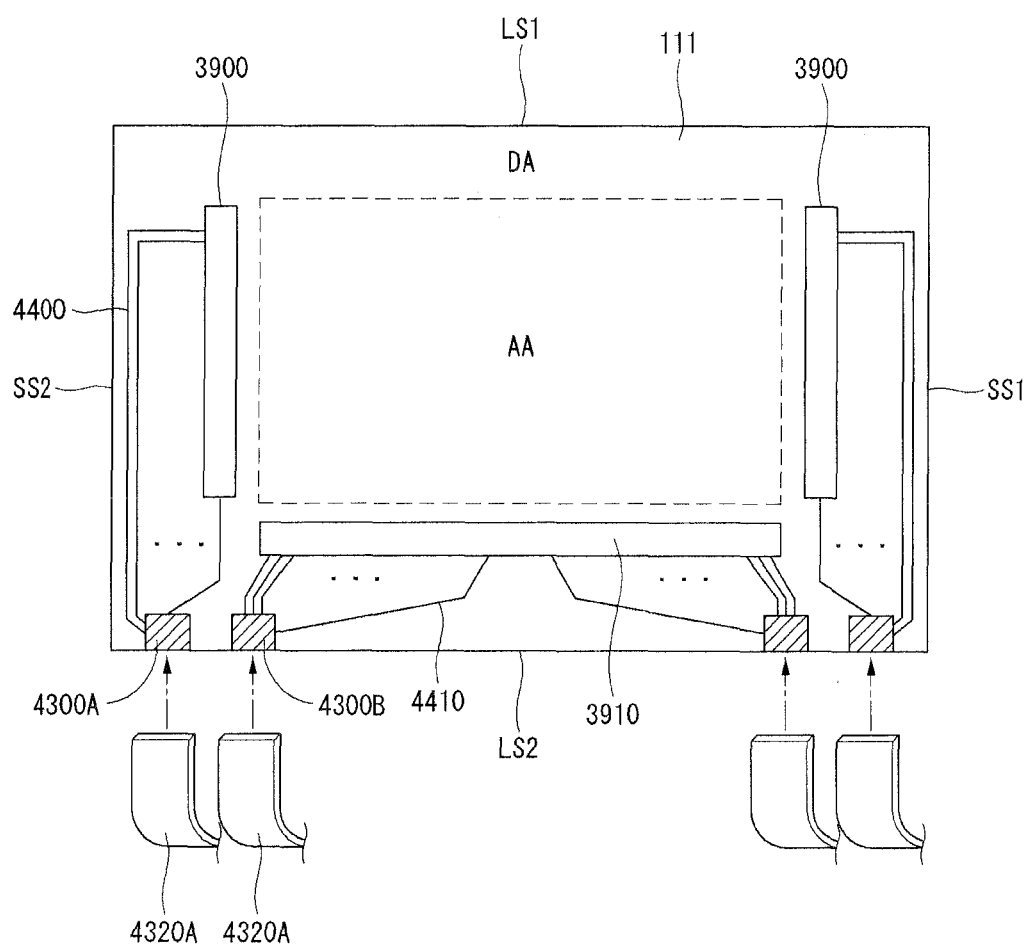

As shown in FIG. 44, a first pad electrode 4300A and a second pad electrode 4300b may be formed outside the seal portion 200 on the second long side LS2 of the back substrate 111. A first connection substrate 4320A may be electrically connected to the first pad electrode 4300A, and a second connection substrate 4320B may be electrically connected to the second pad electrode 4300B.

A first transfer line 4400 may be formed between the first pad electrode 4300A and the gate driver 3900 to transfer a driving signal, that is received from a driving board (not shown) through the first connection substrate 4320A, to the gate driver 3900. A second transfer line 4410 may be formed between the second pad electrode 4300B and the data driver 3910 to transfer a driving signal, that is received from a driving board (not shown) through the second connection substrate 4320B, to the data driver 3910.

Figure 45A:
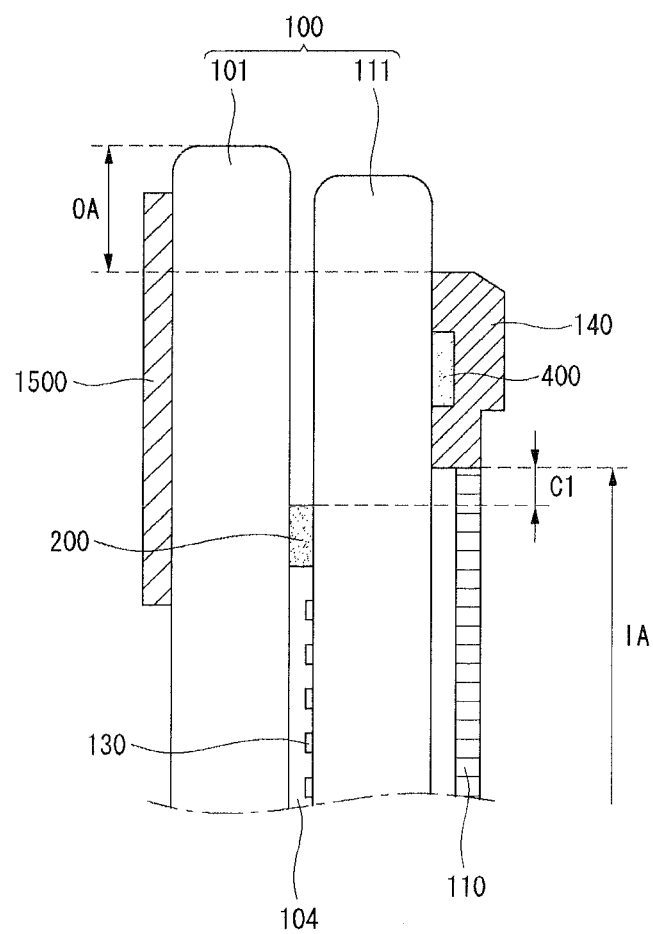

As shown in FIG. 45A, the seal portion 200 positioned between the front substrate 101 and the back substrate 111 may be formed in the dummy area positioned outside the active area AA of the display panel 100 on which the image is displayed. Hence, the seal portion 200 may overlap the blocking member 1500.

The active area AA may be formed in an area overlapping the optical layer 110 positioned in the inner area IA of the bracket 140. Hence, it may be preferable that the seal portion 200 for sealing the liquid crystal layer 104 is positioned in the inner area IA of the bracket 140. More specifically, the seal portion 200 may be spaced apart from the bracket 140 at a predetermined distance Cl in the longitudinal direction of the back substrate 111.

Figure 45B:
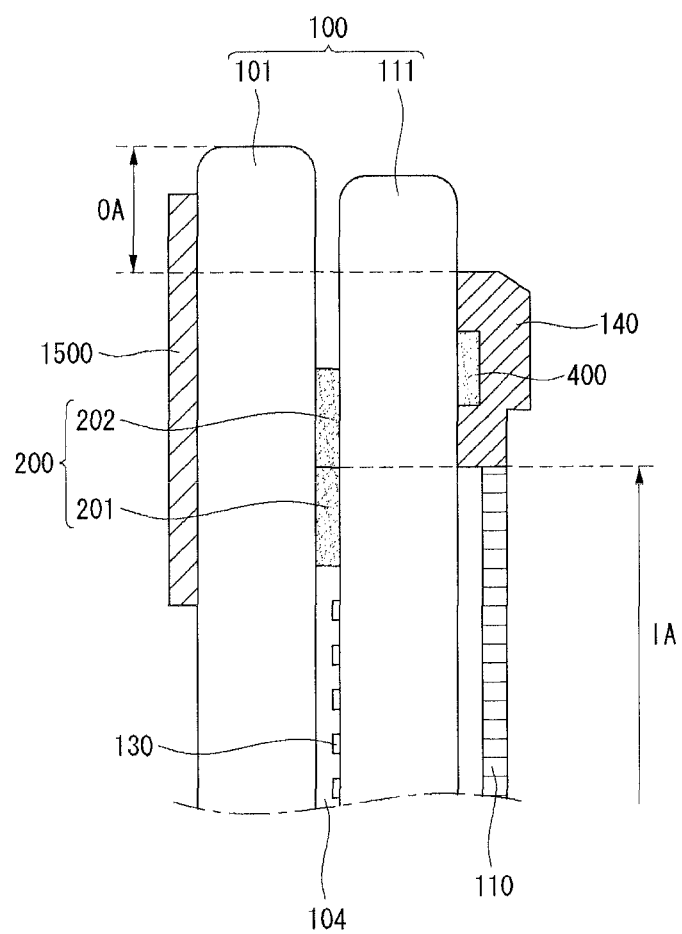

Alternatively, as shown in FIG. 45B, the seal portion 200 may include a portion 201 positioned in the inner area IA of the bracket 140 and a portion 202 overlapping the bracket 140. In this case, the liquid crystal layer 104 may be securely sealed by sufficiently increasing the width of the seal portion 200. Hence, the structure stability of the liquid crystal layer 104 may be improved.

Figure 46:
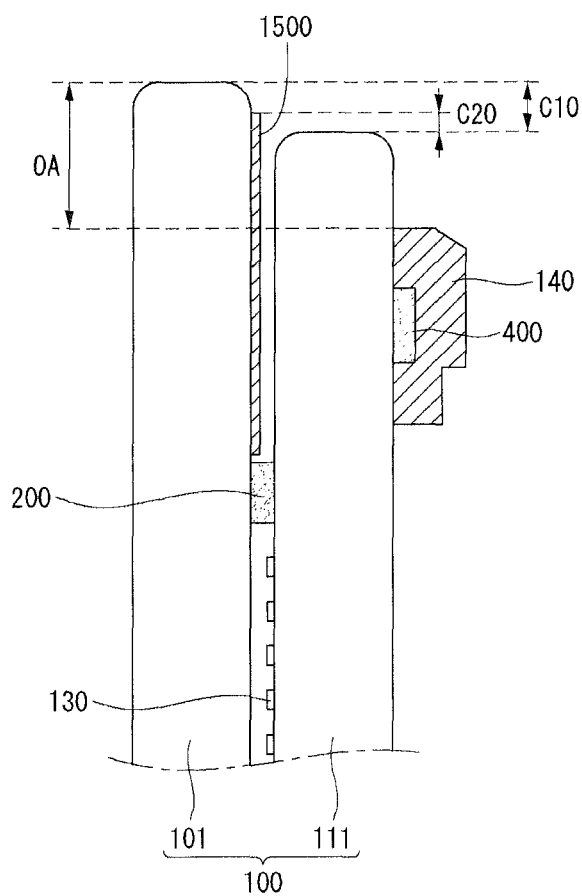

As shown in FIG. 46, the blocking member 1500 may be positioned on the back surface of the front substrate 101.

When the length of the front substrate 101 is greater than the length of the back substrate 111 by a predetermined length C10, the blocking member 1500 may be positioned on the back surface of the front substrate 101. In this case, the blocking member 1500 positioned on the back surface of the front substrate 101 may be prevented from being exposed to the front surface of the front substrate 101 while hiding the back substrate 111 positioned outside the seal portion 200. Hence, a good appearance of the display device may be provided.

The end of the front substrate 101 may extend further than the blocking member 1500 in the outside direction of the display panel 100 by a predetermined distance, so as to easily perform an attaching process of the blocking member 1500 and increase the production yield and the blocking efficiency. The blocking member 1500 may extend further than the end of the back substrate 111 by a predetermined distance C20.

The back cover 130 and the auxiliary bracket 2300 are coupled with each other using a coupling member.

Figure 47:
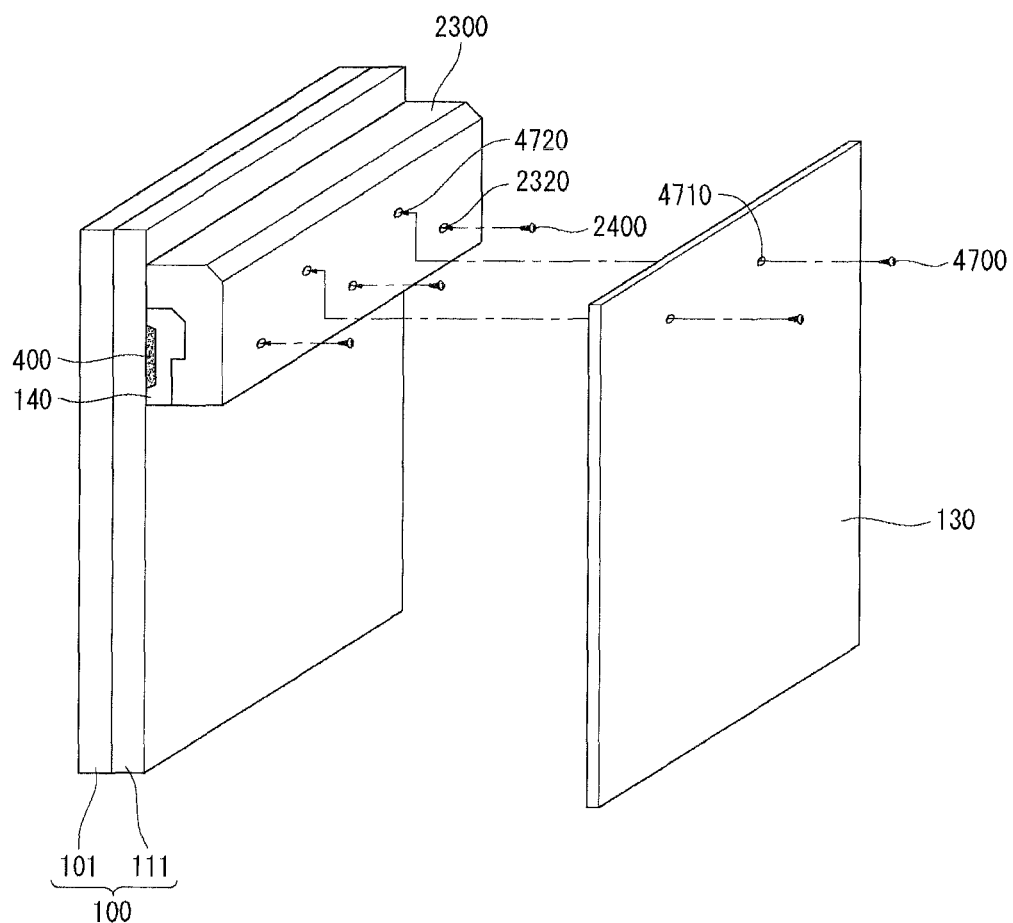

For example, as shown in FIG. 47, the bracket 140 and the auxiliary bracket 2300 are coupled with each other using the first coupling member 2400, and the back cover 130 and the auxiliary bracket 2300 are coupled with each other using a second coupling member 4700. The structure of the first coupling member 2400 and the coupling method using the first coupling member 2400 were described above with reference to FIG. 24.

A hole 4710 may be formed in the back cover 130, and a hole 4720 corresponding to the hole 4710 of the back cover 130 may be formed in the auxiliary bracket 2300. In this case, the second coupling member 4700 may pass through the hole 4710 of the back cover 130 and then may be fixed to the hole 4720 of the auxiliary bracket 2300. Hence, the back cover 130 may be fixed to the auxiliary bracket 2300.

Figure 48:
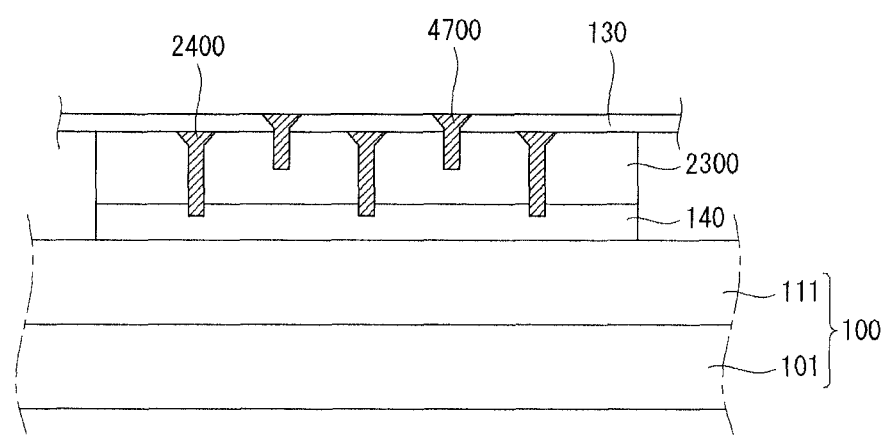

As shown in FIG. 48, the first coupling member 2400 may couple the bracket 140 with the auxiliary bracket 2300, and the second coupling member 4700 may couple the back cover 130 with the auxiliary bracket 2300.

FIGS. 49 to 60 illustrate a configuration of a display device according to another exemplary embodiment. Structures and components identical or equivalent to those illustrated in FIGS. 1 to 48 are designated with the same reference numerals, and a further description may be briefly made or may be entirely omitted.

Figure 49:
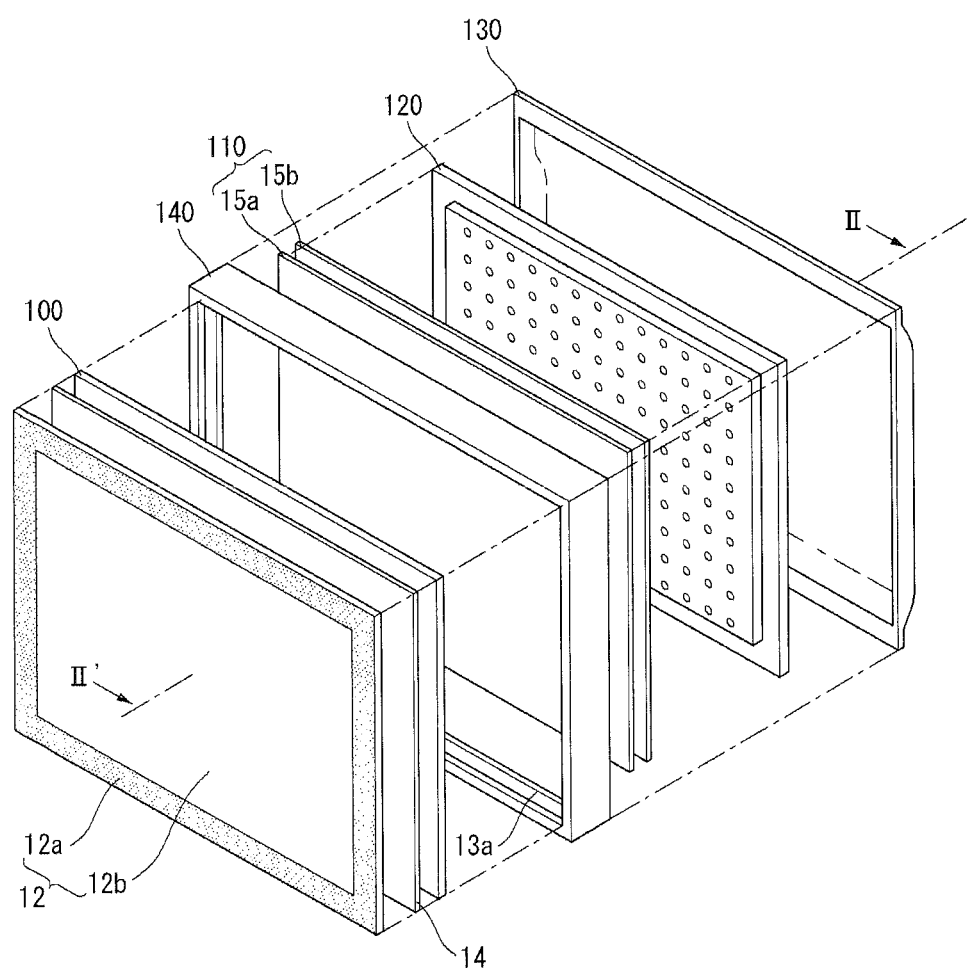
FIGS. 49 to 60 show additional embodiments of a display device.

As shown in FIG. 49, a display device according to another exemplary embodiment may include a display panel 100, a bracket 140, an optical layer 110, a backlight unit 120, and a back cover 130.

An active retarder 14 may be positioned in the front of the display panel 100, thereby causing a 3D image to be displayed on the display panel 100. The active retarder 14 may be attached to a front surface of the display panel 100 using a transparent adhesive or may be coupled with the front surface of the display panel 100 using a structure.

The active retarder 14 controls a tilting angle of liquid crystals, first-circularly polarizes light coming from the display panel 100, and transmits the first circularly polarized light. Alternatively, the active retarder 14 controls a tilting angle of liquid crystals, second-circularly polarizes light coming from the display panel 100, and transmits the second circularly polarized light. The first circularly polarized light and the second circularly polarized light are perpendicular to each other. A left eye image and a right eye image are alternately displayed on the display panel 100 every one frame. The active retarder 14 first-circularly polarizes the left eye image and second-circularly polarizes the right eye image in synchronization the display timing.

A left eye glass of glasses a viewer uses includes a first circular polarizing filter, and a right eye glass of the glasses includes a second circular polarizing filter. Hence, the viewer views only the first circularly polarized left eye image through his or her left eye and views only the second circularly polarized right eye image through his or her right eye. As a result, the display device according to one embodiment implements a binocular disparity in a time division driving manner, thereby displaying the 3D image.

A filter 12 may be positioned in the front of the display panel 100. Preferably, the filter 12 may be laminated on the front surface of the display panel 100. The filter 12 may be exposed to the outside and may protect the display panel 100 forming an external appearance from a mechanical damage such as a scratch. The filter 12 may include an opaque layer 12a positioned at an edge of the filter 12 and a transparent layer 12b positioned inside the filter 12. The opaque layer 12a is positioned at a location substantially corresponding to a non-display area (i.e., a dummy area) of the display panel 100, and the transparent layer 12b is positioned at a location substantially corresponding to an active area of the display panel 100. The transparent layer 12b may be omitted in the filter 12.

The opaque layer 12a prevents the bracket 140 from being seen outside the display panel 100. Further, because the opaque layer 12a has as the same color as the bracket 140, when the display panel 100 is turned off, the display panel 100 and the bracket 140 looks like one part. In other words, because the user perceives the display panel 100 and the bracket 140 as one part, the opaque layer 12a may make the display panel 100 look larger than its actual size. The opaque layer 12a may be the blocking member.

The bracket 140 supports the display panel 100 and receives the optical layer 110 and the backlight unit 120 inside the bracket 140. The bracket 140 has a rectangular plane shape suitable for the shape of the display panel 100 and has a groove 13a formed in an inner wall thereof. A portion (i.e., one end) of the edge of the display panel 100 is received into the groove 13a of the bracket 140 and is fixed to the bracket 140. The optical layer 110 and the backlight unit 120 are closely stacked in the rear of the bracket 140 with the bracket 140 interposed between the display panel 100 and the optical layer 110 and the backlight unit 120.

The optical layer 110 may include a prism sheet 110a and a diffusion plate 110b. The optical layer 110 transfers light from the backlight unit 120 to the display panel 100, thereby causing the image to be displayed on the display panel 100.

The back cover 130 may be formed of iron material, so as to improve the structural stability. The back cover 130 is coupled with the bracket 140 with the optical layer 110 and the backlight unit 120 interposed between the back cover 130 and the bracket 140.

Figure 50:
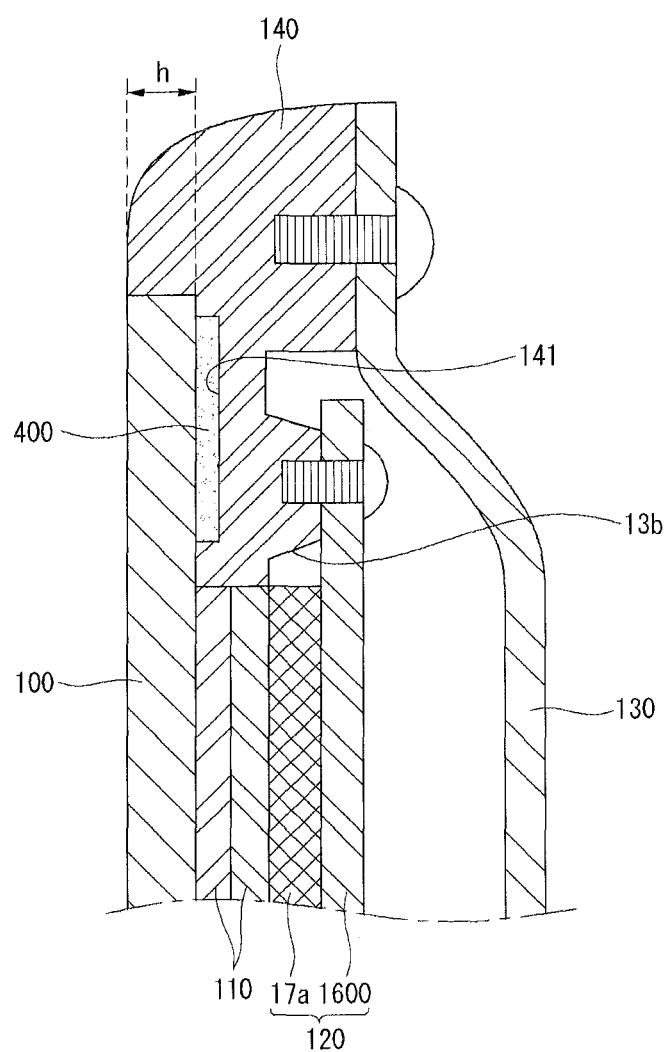

FIG. 50 is a cross-sectional view taken along line II-II' of FIG. 49. More specifically, FIG. 50 illustrates a coupling configuration of the display device. As shown in FIG. 50, one end of the display panel 100 is received in the groove of the bracket 140, and the display panel 100 is fixed to the bracket 140 using an adhesive member 16. The bracket 140 may include a groove 141 in which an adhesive member 400 is positioned. The display panel 100 may be coupled with the bracket 140 with the same height 'h'.

The backlight unit 120 may include a light emitting unit 17a and a support plate 1600. The light emitting unit 17a may have a direct type structure in which light sources, for example, light emitting diodes are mounted on a substrate. The support plate 1600 is a structure for structurally supporting the light emitting unit 17a and may be formed of aluminum with the good rigidity or iron material such as a steel sheet. The light emitting unit 17a is fixed to the support plate 1600 using an adhesive or a structure such as a bolt coupling.

One end of the support plate 1600 is fixed to the bracket 140 through a screw coupling between the support plate 1600 and a boss 13b of the bracket 140. The optical layer 110 is closely positioned and fixed between the backlight unit 120 and the display panel 100. One end of the optical layer 110 may be fixed to the bracket 140 using an adhesive or a protrusion provided in the bracket 140, so as to prevent a movement of the optical layer 110. Furthermore, a fixer (not shown) for fixing the bracket 140 and the optical layer 110 is positioned between the bracket 140 and the optical layer 110. The fixer may remove a space between the bracket 140 and the optical layer 110, thereby fixing the optical layer 110.

Figure 51:
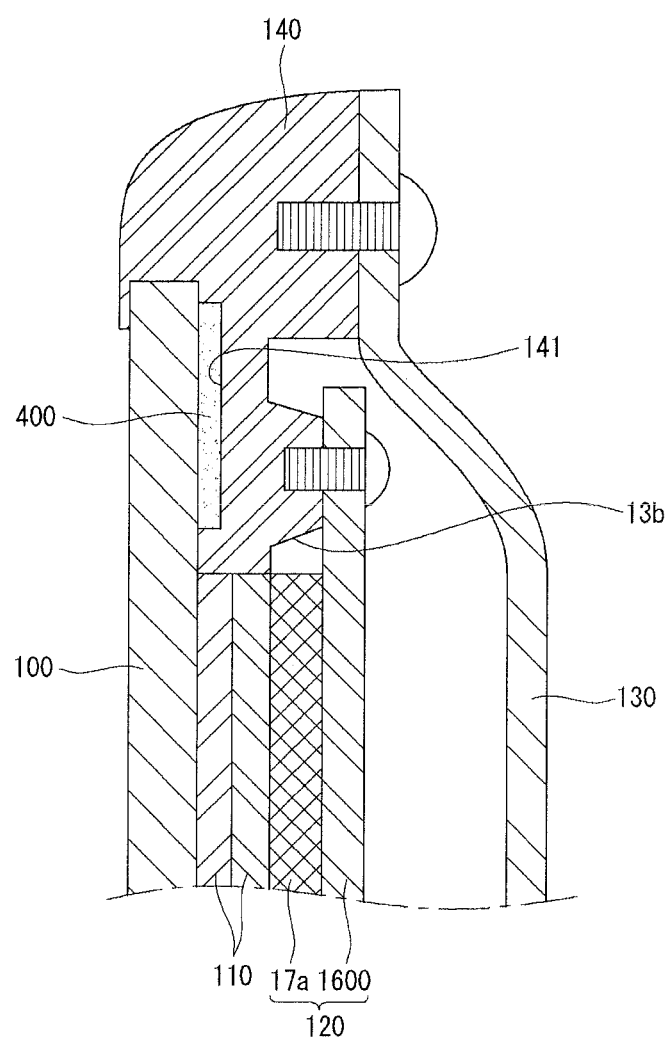

FIG. 51 illustrates another configuration of the bracket 140 in which the bracket 140 surrounds the edge of the display panel 100. As shown in FIG. 51, the bracket 140 surrounds the edge of the display panel 100 and extends to the inside of the display panel 100. In this case, it is preferable that the bracket 140 hides only the non-display area (i.e., the dummy area) of the display panel 100.

Figure 52:
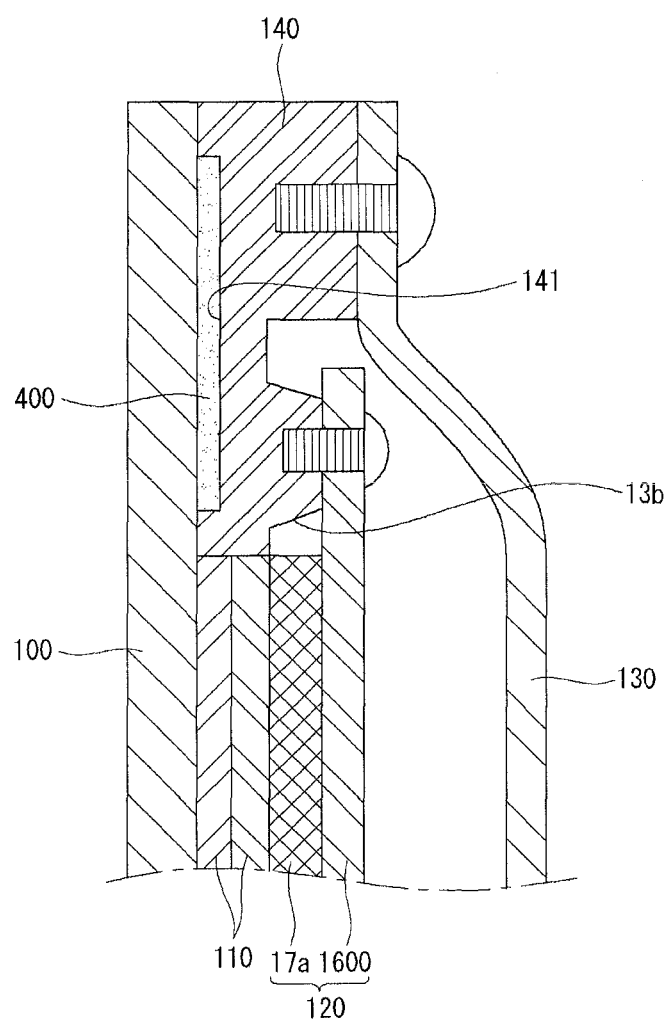

FIG. 52 illustrates that the bracket 140 and one end of the display panel 100 are disposed on the same line. As shown in FIG. 52, the bracket 140 and one end of the display panel 100 are disposed on the same line, and the bracket 140 and the display panel 100 are coupled with each other using an adhesive or a screw coupling.

Figure 53:
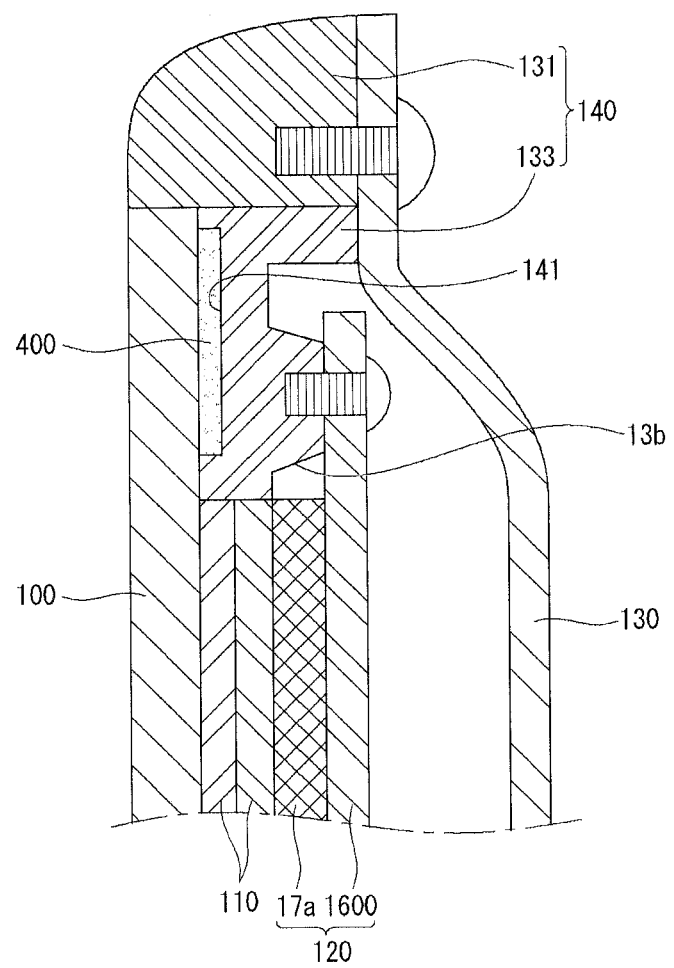

FIG. 53 illustrates that the bracket 140 is divided into a first portion 131 and a second portion 133. As shown in FIG. 53, the bracket 140 may include the first portion 131 surrounding the edge of the display panel 100 and the second portion 133 for fixing the display panel 100. The second portion 133 reduces a space between the backlight unit 120 and the optical layer 110, that are positioned inside the second portion 133, and supports the backlight unit 120 and the optical layer 110 so that the backlight unit 120 and the optical layer 110 do not move.

Figure 54:
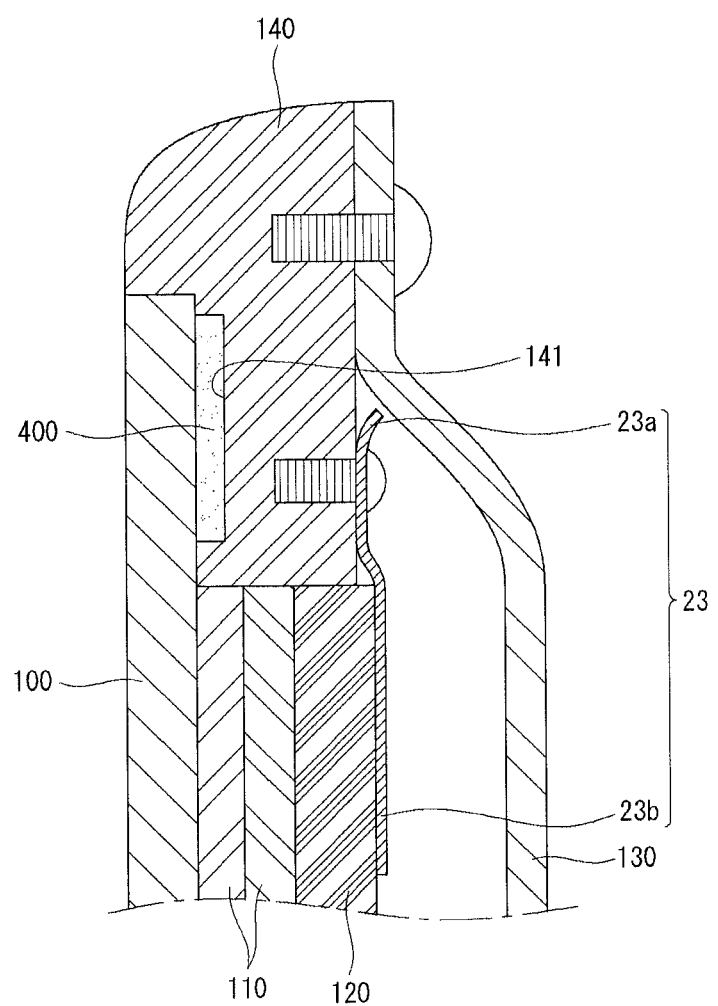

FIG. 54 illustrates that the backlight unit 120 is fixed using a support pin 23. One end 23a of the support pin 23 is fixed to the bracket 140 through a screw coupling, and the other end 23b of the support pin 23 surrounds the backlight unit 120 and extends to the bottom of the backlight unit 120. Hence, the backlight unit 120 is fixed by the elastic force of the support pin 23.

As above, when the support pin 23 is used, the support plate 1600 used to support the backlight unit 120 may be omitted. Therefore, a thickness of a module including the backlight unit 120 and the optical layer 110 may be reduced.

Figure 55:
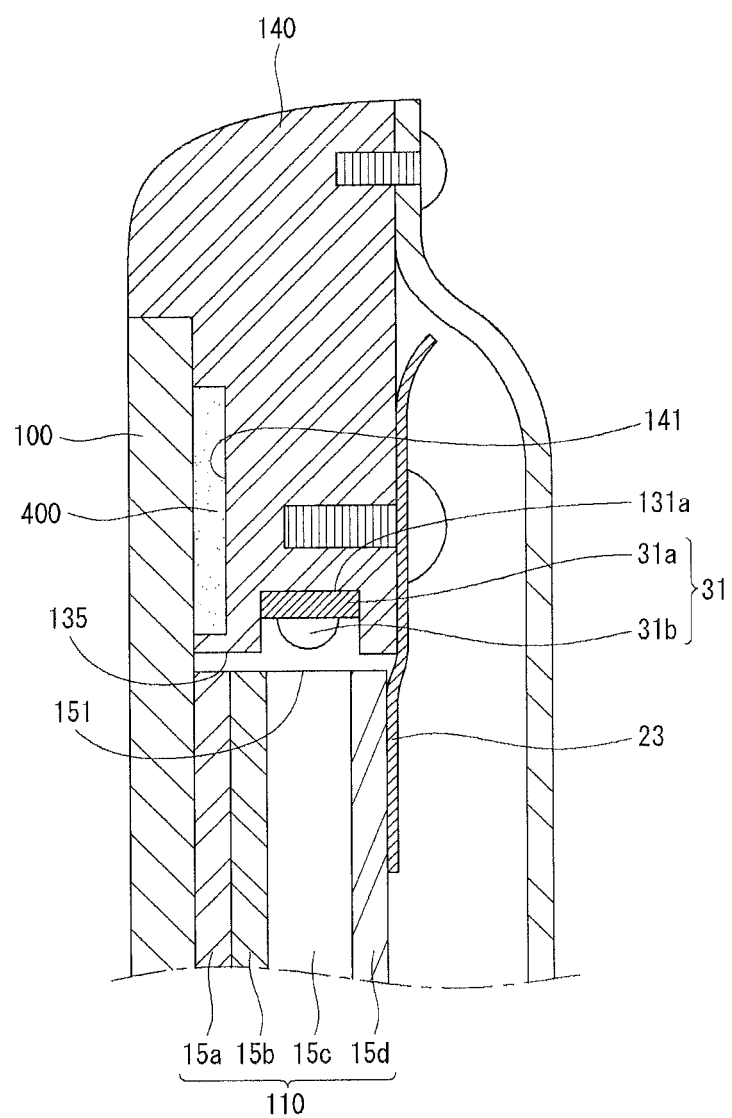

FIG. 55 illustrates an edge type backlight unit having a structure different from the above-described direct type backlight unit. As shown in FIG. 55, the optical layer 110 may further include a light guide plate 110c and a reflection plate 110d.

The light guide plate 110c guides light coming from the side of the light sources, thereby causing the light to be uniformly incident on the entire surface of the display panel 100. The reflection plate 110d reflects light travelling toward a bottom surface of the reflection plate 110d on a front surface of the reflection plate 110d on which the display panel 100 is formed.

The light guide plate 110c and the reflection plate 110d are sequentially stacked and are fixed using the support pin 23. One end of the support pin 23 is screw-coupled with the bracket 140, and the other end extends to the bottom of the reflection plate 110d. Hence, the optical layer 110 may be supported and fixed by the elastic force of the support pin 23.

Figure 56:
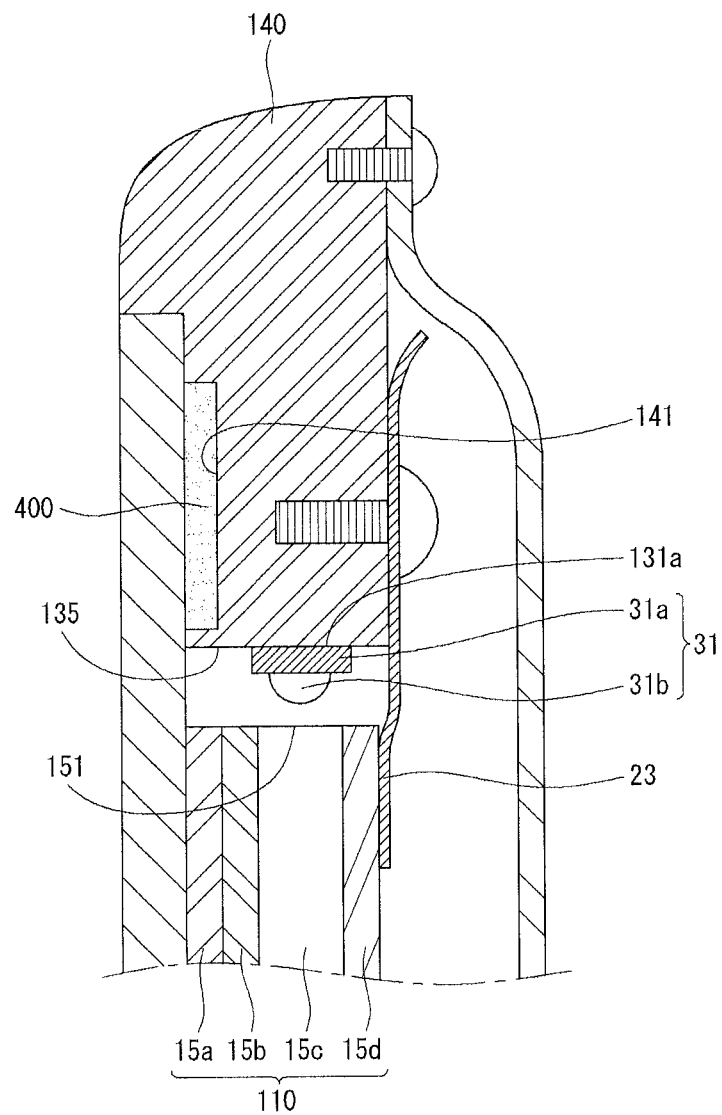

A backlight unit 31 includes a light emitting diode 31b serving as a light source and a substrate 31a on which the light emitting diode 31b is mounted. The size of the substrate 31a and the number of light emitting diodes 31b may vary. The backlight unit 31 may be fixed to a receiving groove 131a using an adhesive. The receiving groove 131*a* may prevent a leakage of light. The receiving groove 131*a* may be omitted as shown in FIG. 56.

The thickness of the module having the edge-type backlight unit may be less than the thickness of the module having the direct type backlight unit.

Figure 57:
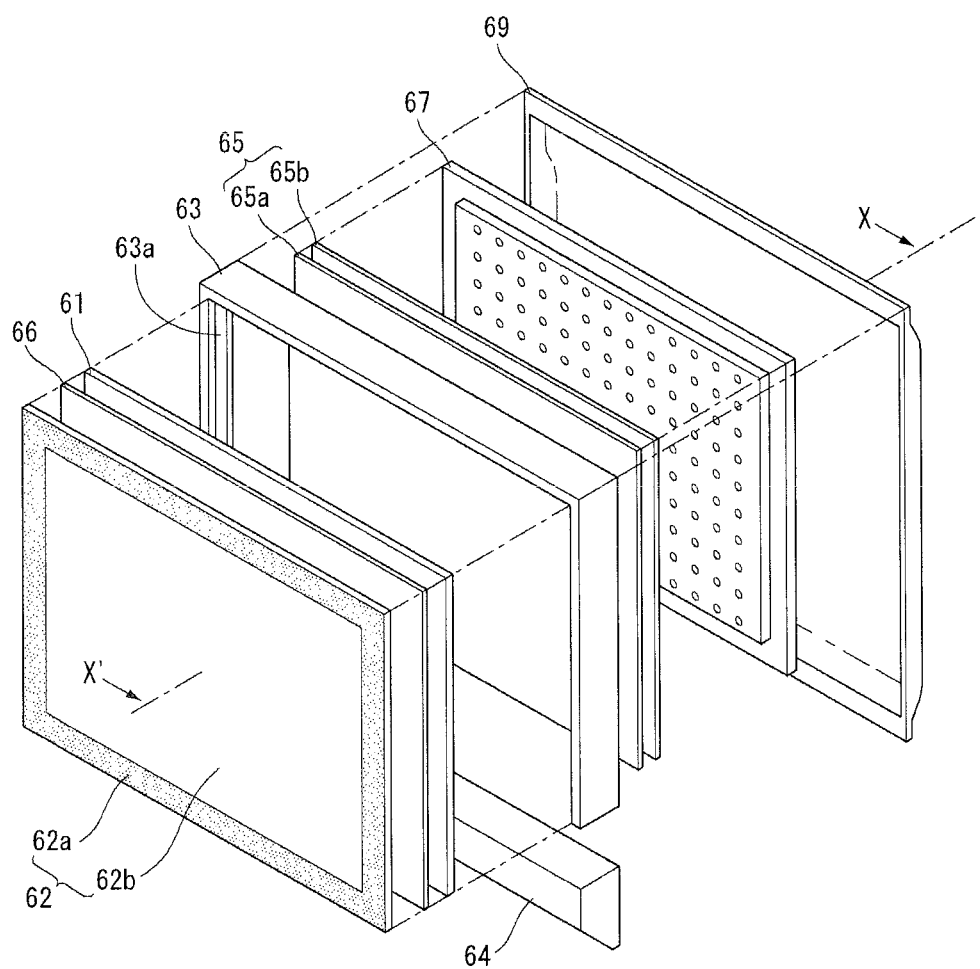

As shown in FIG. 57, a display device according to another exemplary embodiment includes a display panel 61, a first bracket 63, a second bracket 64, an optical layer 65, a backlight unit 67, and a back cover 69.

The display panel 61 displaying an image is exposed to a front surface of the display device to form an external appearance of the display device. A filter 62 including a transparent 62*a* and an opaque layer 62*b* and an active retarder 66 making a 3D image may be selectively positioned in the front of the display panel 61.

The first bracket 63 supports the display panel 61 and receives the optical layer 65 and the backlight unit 67 therein. The first bracket 63 has a ⊏ -shape in which a lower portion of the first bracket 63 is open, so that the first bracket 63 can support three portions of the display panel 61. A recess is formed in an inside wall of the first bracket 63 and supports the display panel 61.

The optical layer 65 and the backlight unit 67 are sequentially stacked and closely positioned in the rear of the display panel 61 with the first bracket 63 interposed between the display panel 61 and the optical layer 65 and the backlight unit 67. The second bracket 64 is positioned under a module.

Figure 58:
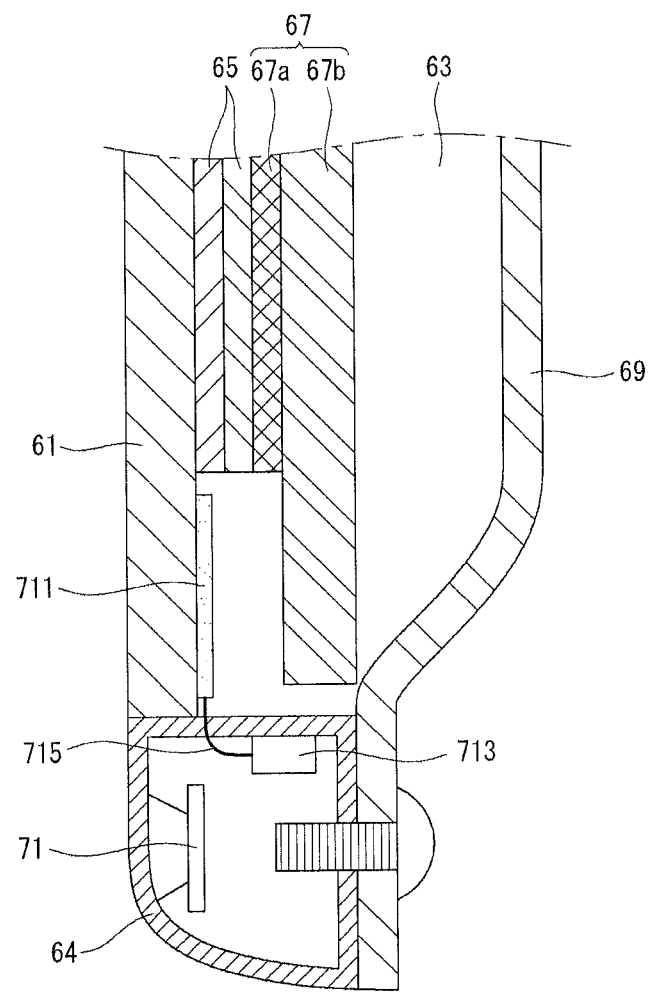
Figure 59:
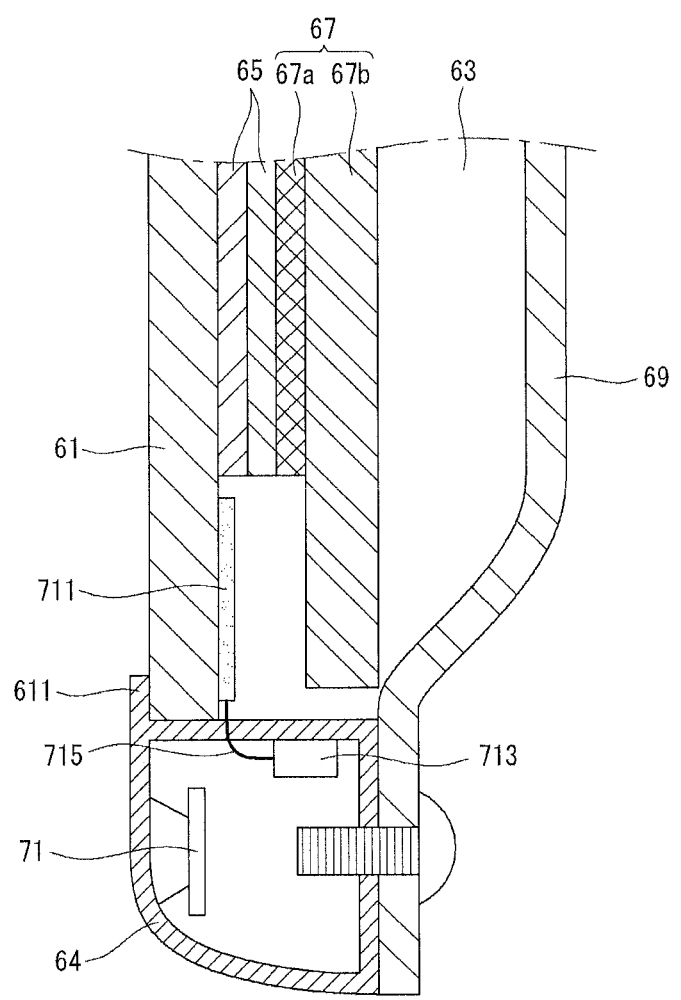

FIG. 58 is a cross-sectional view taken along line X-X' of FIG. 57. More specifically, FIG. 58 illustrates a lower coupling configuration of the display device including the second bracket 64.

As shown in FIG. 58, the second bracket 64 is positioned under the module to form an external appearance of the display device. It is preferable that the second bracket 64 under the module is positioned close to the display panel 61, and the second bracket 64 and the surface of the display panel 61 are positioned on the same line. When the second bracket 64 and the surface of the display panel 61 are positioned on the same line, a boundary between the second bracket 64 and the display panel 61 does not disappear. Hence, the display panel 100 may look larger than its actual size, and the design of the display device may be improved.

An electrode 7100 for sensing changes in a capacitance may be formed on an inside surface of one end of the display panel 61. The electrode 7100 may be formed of a transparent conductive material and may have a diamond cell structure of a lattice shape. When the user indirectly touches the electrode 7100 with the display panel 61 interposed between the user and the electrode 7100, a capacitance at a touch position varies.

The capacitance at the touch position is then transferred to a controller 7140. A row coordinate and a column coordinate of the touched electrode lattice are read, and the touch position is understood.

The controller 7140 generates a control signal corresponding to the touch position and thus may control an operation of the display device. The controller 7140 turns up or down the volume of the display device based on the touch position and thus may control an operation of the display device.

It is preferable that only one of the upper substrate and the lower substrate exists and an electrode is formed on a back surface of the remaining substrate, so as to increase a touch sensitivity of the electrode 7100.

The controller 7140 connected through above-described electrode 7100 serving as a touch sensor and a signal line 7110, a speaker 71, a remote control receiving module (not shown), etc. may be positioned inside the second bracket 64. The display device having the slim structure may be manufactured by disposing the functional modules inside the second bracket 64. Hence, the space of the display device may be efficiency used.

Figure 60:
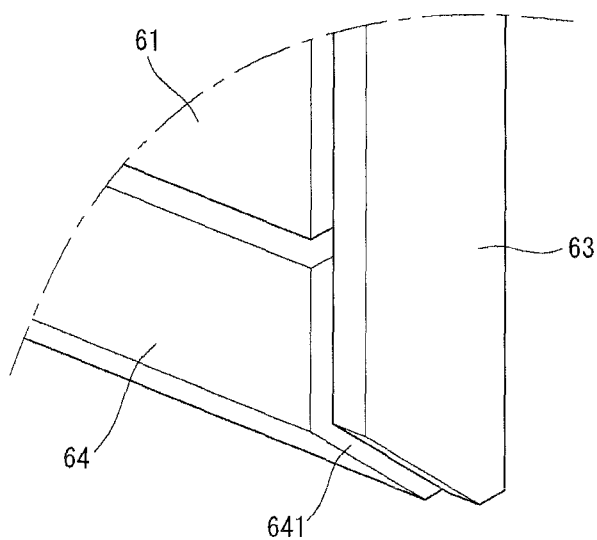

The second bracket 64 may be screw-coupled with the back cover 69 and may be fixed to the back cover 69. As shown in FIG. 60, the second bracket 64 may be fixed to the side of the first bracket 63 using an adhesive in a state where the first bracket 63 extends to the side 641 of the second bracket 64. The second bracket 64 may be coupled with the first bracket 63 and the back cover 69.

FIG. 60 illustrate that the second bracket 64 includes the protrusion 641 extending to the inner of the display panel 61. As shown in FIG. 60, the protrusion 641 extends along a longitudinal direction of the second bracket 64, surrounds a lower part of the display panel 61, and is positioned on the display panel 61. It is preferable that the protrusion 641 is positioned so as to hide only the non-display area of the display panel 61. As above, because the protrusion 641 surrounds an end portion of the display panel 61 corresponding to a structural weak portion, the protrusion 641 protects the display panel 61 and prevents a pollution material such as dust from penetrating into display panel 61.

Figure 61:
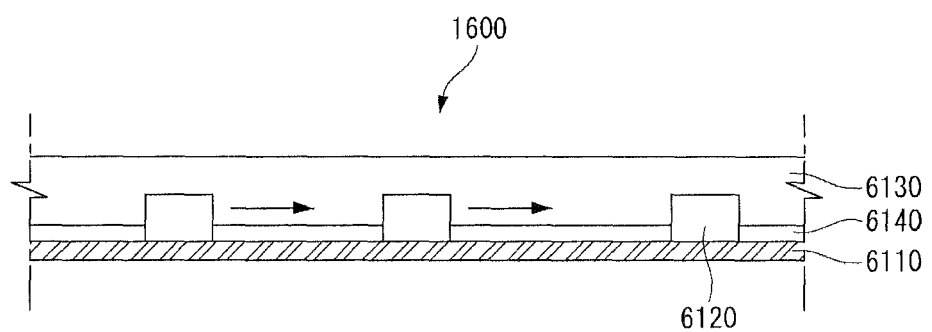
FIGS. 61 to 63 show one or more embodiments of a backlight unit which may be included in any of the aforementioned embodiments of the display device.
Figure 62:
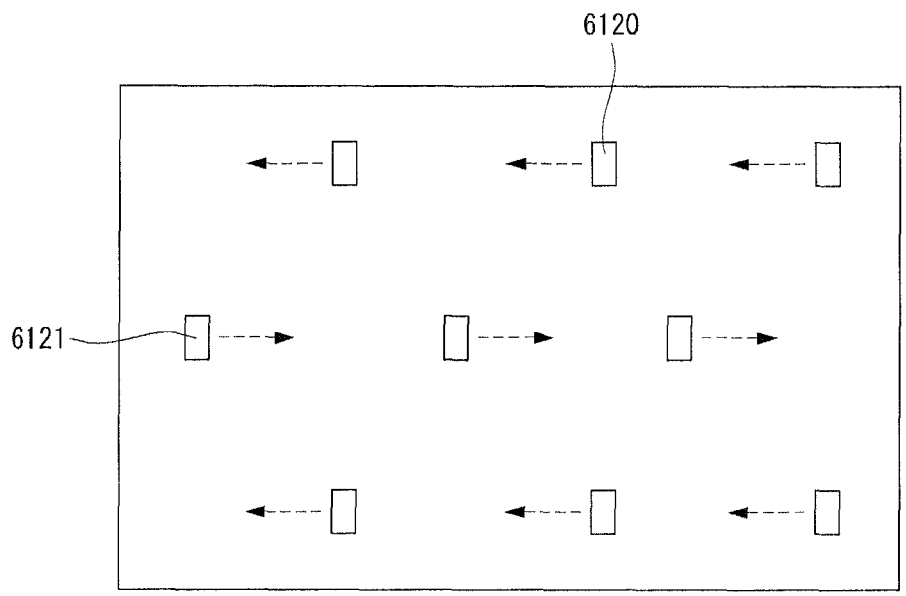
Figure 63:
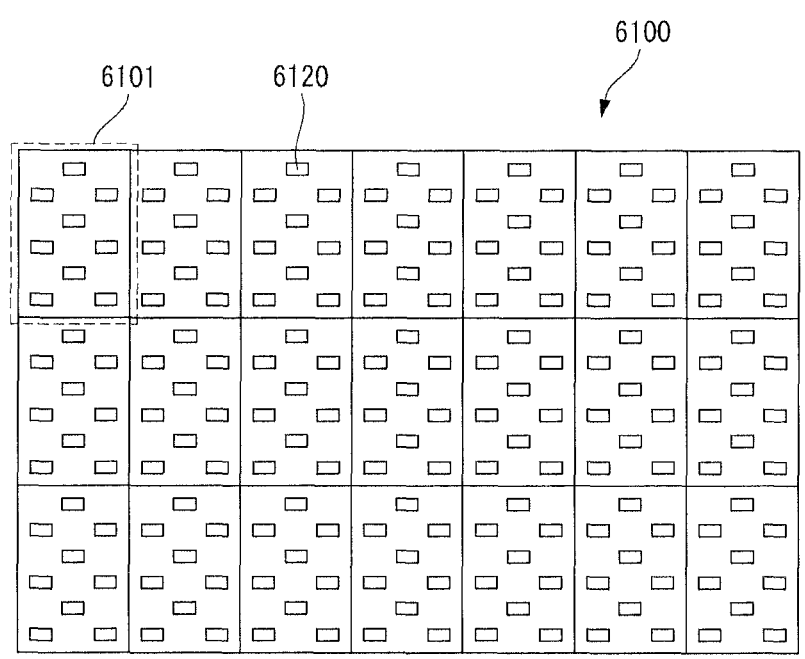

FIGS. 61 to 63 illustrate an exemplary configuration of the backlight unit.

As shown in FIG. 61, a backlight unit 6100 includes a first layer 6110, a plurality of light sources 6120, and a second layer 6130. The plurality of light sources 6120 are formed on the first layer 6110, and the second layer 6130 is formed on the first layer 6110 to cover the plurality of light sources 6120.

The first layer 6110 may be a substrate on which the light sources 6120 are mounted. An electrode pattern (not shown) for connecting the light sources 6120 is formed on the first layer 6110. The first layer 6110 may be a metal printed circuit board (PCB) formed using an insulating layer and aluminum.

The light sources 6120 may be one of a light emitting diode (LED) chip and a LED package having at least one LED chip. It is preferable that light sources 6120 are a side view type LED package in which a light emitting surface is formed to face the side surface. The light sources 6120 emit red, green, and blue light, or may emit white light.

The second layer 6130 is formed on the first layer 6110 to cover the light sources 6120. The second layer 6130 transmits and diffuses light emitted from the light sources 6120, thereby causing the light sources 220 to uniformly provide the light to the display panel.

A reflection layer 6140 for reflecting the light from the light sources 6120 may be formed between the first layer 6110 and the second layer 6130, more particularly, on the first layer 6110. The reflection layer 6140 again reflects light totally reflected from a boundary between the second layer 6130 and the reflection layer 6140, thereby more widely diffusing the light emitted from the light sources 6120.

The reflection layer 6140 may use a sheet in which a white pigment, for example, titanium oxide is dispersed, a sheet in which a metal deposition layer is stacked on the surface of the sheet, a sheet in which bubbles are dispersed so as to scatter light, etc. among various types of sheets formed of synthetic resin material. The surface of the reflection layer 6140 may be coated with silver (Ag) so as to increase a reflectance. The reflection layer 6140 may be coated on the first layer 6110. The second layer 6130 may be formed of a light transmissive material, i.e., silicon or an acrylic resin. Other materials may be used for the second layer 6130.

The second layer 6130 may be formed of a resin, that is capable of diffusing the light from the light sources 6120 and has a refractive index of approximately 1.4 to 1.6, so that the backlight unit 6100 has the uniform luminance.

The second layer 6130 may be formed by applying and curing a liquid or gel-type resin on the first layer 6110 and the plurality of light sources 6120. Alternatively, the second layer 6130 may be separately fabricated and then may be attached on the first layer 6110.

As a thickness of the second layer 6130 increases, the second layer 6130 more widely diffuses the light emitted from the light sources 6100. Hence, the backlight unit 6100 may provide the light having the uniform luminance to the display panel. On the other hand, as the thickness of the second layer 6130 increases, an amount of light absorbed in the second layer 6130 increases. Hence, the luminance of light which the backlight unit 6100 provides to the display panel may entirely decrease. Accordingly, the thickness of the second layer 6130 may be approximately 0.1 mm to 4.5 mm, so that the backlight unit 6100 can provide light having the uniform luminance to the display panel without a reduction in the luminance.

As shown in FIG. 62, the side view type LEDs 6120 are positioned. The LEDs 6120 emit light in a side direction. Thus, the LEDs 6120 are arranged in two or more lines, so that the backlight unit 6100 provides the light having the uniform luminance. The LEDs 6120 arranged on the same line emit light in the same direction.

For example, the adjacent light sources 6120 positioned on the left and right sides of the first light source 6120 emit light in the same direction (in an arrow direction in FIG. 62) as the first light source 6120. The adjacent light sources 6121 positioned on the left and right sides of the second light source 6121 emit light in the opposite direction of the first light source 6120.

As above, because the LEDs 6120 and 6121 emit light in the opposite directions along the line, the luminance of light may be prevented from being concentrated or reduced in a predetermined region of the backlight unit 6100.

The backlight unit 6100 thus formed may be driven in a global dimming method, a local dimming method, an impulsive driving method, or other driving methods.

For example, the backlight unit 6100 being divided into a plurality of driving regions is driven. The display quality, for example, the contrast ratio and the clarity of the image may be improved by driving the backlight unit 6100 so that luminances of the plurality of driving regions of the backlight unit 6100 are equal to a luminance of an image signal. Accordingly, the backlight unit 6100 may be fabricated by assembling the plurality of driving regions into one assembly. For example, as shown in FIG. 63, a plurality of optical assemblies 6101 may make one backlight unit 6100. In this case, only some of the optical assemblies 6101 may be independently driven to provide light. For this, light sources 6120 included in each of the optical assemblies 6101 may be independently controlled.

A region of the display panel corresponding to one optical assembly 6101 may be divided into two or more blocks, and the display panel and the backlight unit 6100 may be separately driven by the unit of a block. As above, when the backlight unit 6100 is configured using the plurality of optical assemblies 6101, a manufacturing process of the backlight unit 6100 may be simplified and a loss generated in the manufacturing process may be minimized. Further, the backlight unit 6100 has an advantage applicable to backlight units having various sizes through mass production by standardizing the optical assemblies 6101.

Furthermore, when some of the LEDs included in the backlight unit 6100 have a failure, only the optical assembly having the failure has only to be replaced without replacing the backlight unit 6100. Therefore, a replacing work may be easily performed and the part replacement cost may be saved.

Figure 64:
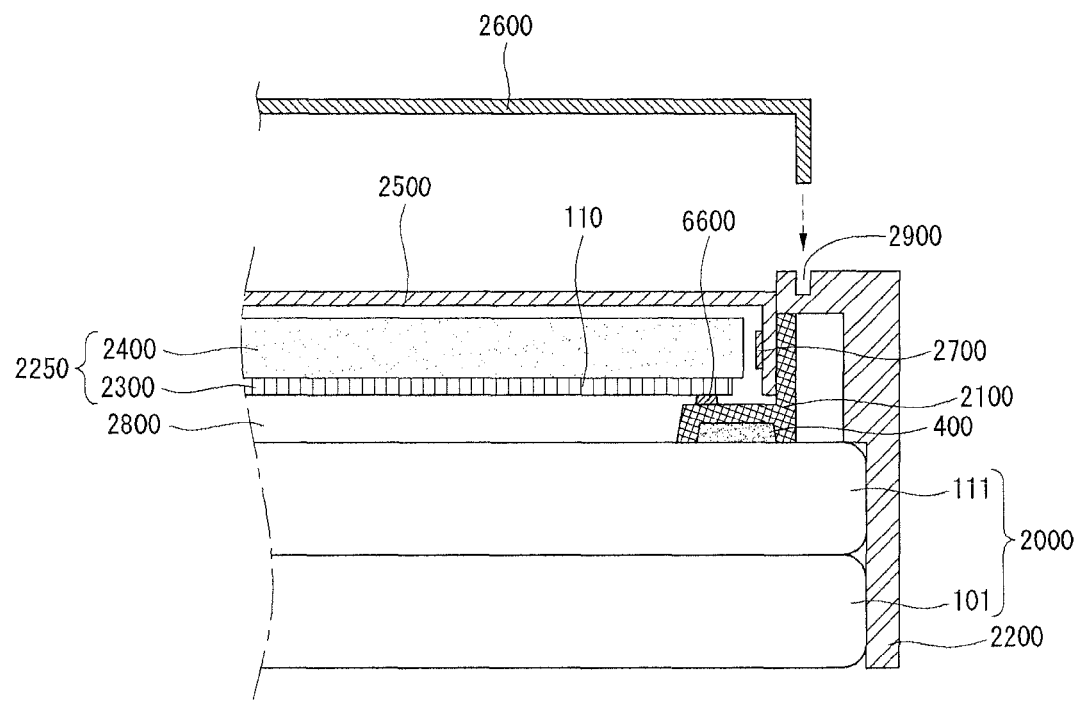
FIG. 64 shows another embodiment of a display device.

FIG. 64 shows another embodiment of a display device which includes a display panel 2000, a first bracket 2100, a second bracket 2200, a backlight 2250, a bottom cover 2500, and a back cover 2600. The backlight 2250 includes one or more optical sheets 2300, a light guide plate 2400, and an LED 2700 formed between one side surface of the light guide plate 2400 and a side surface of the bottom cover 2500. The LED emits light into the side surface of the light guide panel where it is dispersed and redirected through the one or more optical sheets for backlighting an image on the panel.

In addition to these features, an air gap 2800 is located between the one or more optical sheets 2300 and the panel 2000. This air gap may be used, for example, to accommodate one or more circuits including but not limited to driver circuits. Also, a blocking member according to one or more of the aforementioned embodiments may be included on a front surface of the panel, in non-overlapping relationship relative to the active region of the panel.

As shown, a portion of the first bracket is located between the one or more optical sheets and the panel, and the second bracket is formed along at least one side of the display device, at a position adjacent the first bracket, the bottom cover. The second bracket may also have a recess 2900 into which the back cover is inserted. Although not shown, one or more additional members may enclose the side of the display device opposite the second bracket.

One or more embodiments described herein, therefore, provide a frameless display device comprising a display panel; a backlight adjacent a first surface of the panel; a blocker adjacent a second surface of the panel; and at least one bracket between the panel and backlight, wherein: a) the first and second surfaces are substantially parallel, b) the bracket is coupled to the first surface without overlapping a peripheral edge of the panel or and without overlapping an active region of the panel that displays an image, and c) the blocker does not overlap the active region of the panel and overlaps the bracket along an axis passing through the panel.

The blocker may have a width greater than the bracket and a thickness less than the bracket, and the blocker may surround at least a portion of the active region of the panel. In addition, the display device may include a least one driver board, wherein the driver board is aligned with the blocker and bracket and does not overlap the active region of the panel.

Additional features include a back cover attached to the bracket, wherein an edge of the back cover is inserted into a groove in the bracket. Further, the panel may include a first substrate, a second substrate coupled to the first substrate, and a liquid crystal display (LCD) layer between the first and second substrates. A driver board may be coupled to at least one of the first or second substrates at a location which does not overlap the active region.

In addition, at least one seal may be between the first and second substrates, wherein the driver board is coupled to at least one of the first or second substrates outside of a sealed area between the first and second substrates. Additionally, an extension may be coupled to the bracket, the extension overlapping peripheral edges of the first and second substrates. Also, the extension may overlap the second surface of the panel without overlapping the active region.

Also, the extension may at least partially overlap the blocker adjacent the second surface of the panel, and the extension may be integrally formed with the bracket.

In addition, the bracket may be disposed along at least one side of the panel. In another embodiment, the bracket may continuously extend around the active region of the panel. Additionally, a first bracket may be located along a first side of the panel; and a second bracket may be located along a second opposing side of the panel.

Additionally, a polarizing layer may be adjacent to the second surface of the panel and overlapping the active region of the panel, and the blocker may overlap the polarizing layer. Also, the blocker may be adjacent to but does not overlap the polarizing layer.

Additionally, the display device may include an optical layer between the panel and backlight, wherein the optical layer is coupled to the bracket and overlaps the active region of the panel. The embodiments of the display device described herein may be a television, monitor, screen of a laptop or notebook computer, or any other display device.

In accordance with another embodiment, a display device comprises a display panel; a backlight adjacent a first surface of the panel; a first bracket adjacent the backlight; a second bracket between the panel and backlight; and a back cover to cover the backlight, wherein the first bracket is adjacent a side surface of the backlight, the second bracket is adjacent a surface of the backlight which is substantially parallel to the panel, and the first and second brackets do not overlap an active region of the panel that displays an image. In addition, the back cover may be coupled to a recess in the first bracket.

The backlight may include a light guide and a light source to emit light through a first surface of the light guide, wherein the light emitted through the first surface is redirected to exit a second surface of the light guide, the first and second surfaces of the light guide not substantially parallel to one another. Also, the first bracket couples the back cover to the panel and the second bracket couples a bottom cover of the backlight to the panel, the first and second brackets coupled to the panel at different locations.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

A liquid crystal display panel is discussed as one example of a display panel. However, the embodiments described herein may include or otherwise be alternatively applied to a plasma display panel (PDP), a field emission display (FED) panel, and an organic light emitting display (OLED) display panel may be used in an exemplary embodiment of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with the features of one or more other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
   a display panel;
   a backlight adjacent a first surface of the panel;
   a blocker adjacent a second surface of the panel; and
   at least one bracket between the panel and backlight, wherein:
   a) an edge of the second surface of the panel is exposed;
   b) the first and second surfaces are substantially parallel,
   c) at least one bracket is coupled to the first surface without overlapping an active region of the panel that displays an image, and
   d) the blocker does not overlap the active region of the panel and overlaps the bracket along an axis passing through the panel; and
   e) the blocker is visible at a position in front of the panel.

2. The display device of claim 1, wherein the blocker has a width greater than the bracket and a thickness less than the bracket.

3. The display device of claim 1, wherein the blocker surrounds at least a portion of the active region of the panel.

4. The display device of claim 1, further comprising:
   a least one driver board,
   wherein the driver board is aligned with the blocker and bracket and does not overlap the active region of the panel.

5. The display device of claim 1, further comprising:
   a back cover attached to the bracket.

6. The display device of claim 5, wherein an edge of the back cover is inserted into a groove in the bracket.

7. The display device of claim 1, wherein the panel includes:
   a first substrate;
   a second substrate coupled to the first substrate; and
   a liquid crystal display (LCD) layer between the first and second substrates.

8. The display device of claim 7, further comprising:
   a driver board coupled to at least one of the first or second substrates at a location which does not overlap the active region.

9. The display device of claim 8, further comprising:
   at least one seal between the first and second substrates,
   wherein the driver board is coupled to at least one of the first or second substrates outside of a sealed area between the first and second substrates.

10. The display device of claim 7, further comprising:
    an extension coupled to the bracket,
    the extension overlapping peripheral edges of the first and second substrates.

11. The display device of claim 10, wherein the extension is integrally formed with the bracket.

12. The display device of claim 1, wherein the bracket is disposed along at least one side of the panel.

13. The display device of claim 12, wherein the bracket continuously extends around the active region of the panel.

14. The display device of claim 1, wherein the at least one bracket includes:
a first bracket located along a first side of the panel; and
a second bracket located along a second opposing side of the panel.

15. The display device of claim 1, further comprising:
a polarizing layer adjacent to the second surface of the panel and overlapping the active region of the panel.

16. The display device of claim 15, wherein the blocker is adjacent to but does not overlap the polarizing layer.

17. The display device of claim 1, further comprising:
an optical layer between the panel and backlight,
wherein the optical layer is coupled to the bracket and overlaps the active region of the panel.

18. The display device of claim 1, wherein the blocker is located between first and second substrates of the panel.

19. The display device of claim 1, wherein the at least one bracket includes:
a first bracket coupled to the first surface of the panel; and
a second bracket overlapping the first bracket and a side of the panel, wherein the side is substantially perpendicular to the second surface of the panel.

20. The display device of claim 1, wherein the display device is a television.

21. The display device of claim 1, wherein the bracket is attached to the first surface of the panel by an adhesive layer.

22. A display apparatus, comprising:
a front panel and a rear panel attached to each other and having a plurality of liquid crystals provided in a gap between the first and rear panels;
a plurality of first brackets adhered to the rear panel by an adhesive, each first bracket having a recess on a first surface where the adhesive is applied, and a first protrusion extending from a second surface, the first and second surfaces being opposite surface;
a plurality of second brackets provided adjacent to the plurality of first brackets;
a first polarizing film provided on the front panel having a first prescribed width;
a second polarizing film provided on the rear panel and between the plurality of first brackets and having a second prescribed width which is smaller than the first prescribed width;
a light source having at least an optical sheet, a light guide and a plurality of light emitting diodes (LEDs), the light source being provided between the plurality of second brackets.

23. The display apparatus of claim 22, wherein a frame is provided over the light source.

24. The display apparatus of claim 23, wherein the frame is connected to the second bracket.

25. The display apparatus of claim 22, further comprising a side cover provided to cover sides of the front and rear panels.

* * * * *